(12) United States Patent
Du

(10) Patent No.: US 7,917,292 B1
(45) Date of Patent: Mar. 29, 2011

(54) SYSTEMS AND METHODS FOR FLOOD RISK ASSESSMENT

(75) Inventor: Wei Du, Springfield, VA (US)

(73) Assignee: JPMorgan Chase Bank, N.A., Houston, TX (US)

( * ) Notice: Subject to any disclaimer, the term of this patent is extended or adjusted under 35 U.S.C. 154(b) by 456 days.

(21) Appl. No.: 11/974,911

(22) Filed: Oct. 16, 2007

Related U.S. Application Data

(60) Provisional application No. 60/852,379, filed on Oct. 17, 2006.

(51) Int. Cl.
G01V 3/38 (2006.01)

(52) U.S. Cl. ............... 702/5; 702/2; 702/3; 702/179; 702/181

(58) Field of Classification Search .......... 702/2, 3, 702/5, 1, 12, 50, 179–181, 183, 187; 701/207, 701/208; 703/3; 705/4, 313
See application file for complete search history.

(56) References Cited

U.S. PATENT DOCUMENTS

| | | | |
|---|---|---|---|
| 4,766,539 A | 8/1988 | Fox | |
| 4,831,526 A | 5/1989 | Luchs et al. | |
| 4,876,648 A | 10/1989 | Lloyd | |
| 4,885,706 A | 12/1989 | Pate et al. | |
| 4,975,840 A | 12/1990 | DeTore et al. | |
| 5,546,107 A | 8/1996 | Deretsky et al. | |
| 5,559,707 A | 9/1996 | DeLorme et al. | |
| 5,796,634 A | 8/1998 | Craport et al. | |
| 5,839,113 A | 11/1998 | Federau et al. | |
| 5,848,373 A | 12/1998 | DeLorme et al. | |
| 5,873,066 A | 2/1999 | Underwood et al. | |
| 5,913,210 A | 6/1999 | Call | |
| 5,946,687 A | 8/1999 | Gehani et al. | |
| 5,953,722 A | 9/1999 | Lampert et al. | |
| 5,968,109 A | 10/1999 | Israni et al. | |
| 6,101,496 A | 8/2000 | Esposito | |
| 6,115,669 A | 9/2000 | Watanabe et al. | |
| 6,118,404 A | 9/2000 | Fernekes et al. | |
| 6,119,065 A | 9/2000 | Shimada et al. | |
| 6,163,770 A | 12/2000 | Gamble et al. | |
| 6,263,343 B1 | 7/2001 | Hirono | |
| 6,308,177 B1 | 10/2001 | Israni et al. | |

(Continued)

OTHER PUBLICATIONS

Yang et al., Development of GIS-Based Flood Information System for Floodplain Modeling and Damage Calculation, Jun. 2000, Journal of the American Water Resources Association, vol. 36 No. 3, pp. 567-577.*

(Continued)

*Primary Examiner* — Michael P Nghiem
*Assistant Examiner* — Ricky Ngon
(74) *Attorney, Agent, or Firm* — Oblon, Spivak, McClelland, Maier & Neustadt, L.L.P.

(57) ABSTRACT

In various embodiments, points from flood maps (e.g., geospatial flood risk zoning maps) may be used in generating a flood frequency versus flood elevation curve for reducing the uncertainty in the flood risk assessment. In some embodiments, geospatial flood elevation lines for flood elevation lines at different flood frequency levels may be defined based on elevation datasets where there are inconsistencies between the elevation datasets and flood maps that were generated. The flood frequency versus flood loss curve may be derived based on the computed flood frequency versus flood elevation curve, digital elevation datasets, and collected damage curve. In some embodiments, the flood risk rating may also be derived and a flood risk assessment report may be generated.

20 Claims, 42 Drawing Sheets

U.S. PATENT DOCUMENTS

| | | | |
|---|---|---|---|
| 6,467,994 B1 | 10/2002 | Ankeny et al. |
| 6,498,982 B2 | 12/2002 | Bellesfield et al. |
| 6,529,824 B1 | 3/2003 | Obradovich et al. |
| 6,539,080 B1 | 3/2003 | Bruce et al. |
| 6,591,270 B1 | 7/2003 | White |
| 6,631,326 B1 | 10/2003 | Howard et al. |
| 6,678,615 B2 | 1/2004 | Howard et al. |
| 6,684,219 B1 | 1/2004 | Shaw et al. |
| 6,711,554 B1 | 3/2004 | Salzmann et al. |
| 6,829,690 B1 | 12/2004 | Ashby |
| 6,836,270 B2 | 12/2004 | Du |
| 6,842,698 B2 | 1/2005 | Howard et al. |
| 6,889,141 B2 | 5/2005 | Li et al. |
| 6,934,634 B1 | 8/2005 | Ge |
| 6,947,842 B2 | 9/2005 | Smith et al. |
| 6,950,519 B2 | 9/2005 | Rhoads |
| 6,996,507 B1 * | 2/2006 | Myr ................................. 703/2 |
| 7,038,681 B2 | 5/2006 | Scott et al. |
| 7,042,470 B2 | 5/2006 | Rhoads et al. |
| 7,054,741 B2 | 5/2006 | Harrison et al. |
| 7,061,510 B2 | 6/2006 | Rhoads |
| 7,082,443 B1 | 7/2006 | Ashby |
| 7,085,650 B2 | 8/2006 | Anderson |
| 7,092,957 B2 | 8/2006 | Klein |
| 7,099,492 B2 | 8/2006 | Rhoads |
| 7,099,882 B2 | 8/2006 | McDonough |
| 7,114,050 B2 | 9/2006 | Ashby |
| 7,117,199 B2 | 10/2006 | Frank et al. |
| 7,127,107 B2 | 10/2006 | Kubota et al. |
| 7,142,217 B2 | 11/2006 | Howard et al. |
| 7,161,604 B2 | 1/2007 | Higgins et al. |
| 7,167,187 B2 | 1/2007 | Scott et al. |
| 7,184,572 B2 | 2/2007 | Rhoads et al. |
| 7,190,377 B2 | 3/2007 | Scott et al. |
| 7,197,160 B2 | 3/2007 | Rhoads et al. |
| 7,254,249 B2 | 8/2007 | Rhoads et al. |
| 7,383,125 B2 | 6/2008 | de Silva et al. |
| 7,395,157 B2 * | 7/2008 | Feyen et al. .................. 702/2 |
| 2001/0028348 A1 | 10/2001 | Higgins et al. |
| 2001/0032050 A1 | 10/2001 | Howard et al. |
| 2001/0033292 A1 | 10/2001 | Scott et al. |
| 2001/0034579 A1 | 10/2001 | Howard et al. |
| 2001/0047326 A1 | 11/2001 | Broadbent et al. |
| 2002/0035432 A1 | 3/2002 | Kubica et al. |
| 2002/0145617 A1 | 10/2002 | Kennard et al. |
| 2002/0147613 A1 | 10/2002 | Kennard et al. |
| 2003/0052896 A1 | 3/2003 | Higgins et al. |
| 2004/0019517 A1 | 1/2004 | Sennott |
| 2004/0034666 A1 | 2/2004 | Chen |
| 2004/0046774 A1 | 3/2004 | Rhoads et al. |
| 2004/0128170 A1 | 7/2004 | MacKethan et al. |
| 2004/0138817 A1 | 7/2004 | Zoken et al. |
| 2004/0172264 A1 | 9/2004 | Fletcher et al. |
| 2004/0199410 A1 | 10/2004 | Feyen et al. |
| 2004/0263514 A1 | 12/2004 | Jin et al. |
| 2005/0034074 A1 | 2/2005 | Munson et al. |
| 2005/0075911 A1 | 4/2005 | Craven |
| 2005/0091193 A1 | 4/2005 | Frank et al. |
| 2005/0091209 A1 | 4/2005 | Frank et al. |
| 2005/0100220 A1 | 5/2005 | Keaton et al. |
| 2005/0119824 A1 | 6/2005 | Rasmussen et al. |
| 2005/0159882 A1 | 7/2005 | Howard et al. |
| 2005/0177529 A1 | 8/2005 | Howard et al. |
| 2005/0203768 A1 | 9/2005 | Florance et al. |
| 2005/0203778 A1 | 9/2005 | Chen et al. |
| 2005/0209867 A1 | 9/2005 | Diesch et al. |
| 2005/0273346 A1 | 12/2005 | Frost |
| 2005/0283503 A1 | 12/2005 | Hancock et al. |
| 2005/0288957 A1 | 12/2005 | Eraker et al. |
| 2005/0288958 A1 | 12/2005 | Eraker et al. |
| 2006/0036588 A1 | 2/2006 | Frank et al. |
| 2006/0041375 A1 | 2/2006 | Witmer et al. |
| 2006/0041573 A1 | 2/2006 | Miller et al. |
| 2006/0045351 A1 | 3/2006 | Jin et al. |
| 2006/0072783 A1 | 4/2006 | Rhoads |
| 2006/0075422 A1 | 4/2006 | Choi et al. |
| 2006/0100912 A1 | 5/2006 | Kumar et al. |
| 2006/0125828 A1 | 6/2006 | Harrison et al. |
| 2006/0126959 A1 | 6/2006 | Padwick et al. |
| 2006/0262963 A1 | 11/2006 | Navulur et al. |
| 2006/0265350 A1 | 11/2006 | Klein |
| 2007/0124328 A1 | 5/2007 | Klein |
| 2007/0257235 A1 | 11/2007 | Park et al. |
| 2007/0261517 A1 | 11/2007 | Lee et al. |
| 2008/0055096 A1 | 3/2008 | Aylward |
| 2008/0133462 A1 | 6/2008 | Aylward et al. |

OTHER PUBLICATIONS

Hunter et al., A New Model for Handling Vector Data Uncertainty in Geographic Information Systems, 1995, URISA Proceedings, pp. 410-419.*

Peucker et al., The Triangulated Irregular Network, Nov. 1979, pp. 96-103.*

Werner et al., A Comparison of Methods for Generating Cross Sections for Flood Modelling Using Detailed Floodplain Elevation Models, 2000, pp. 73-84.*

Du, Estimating Statistical Parameters for an N-Segment Discrete Hydrological Data Series, 1989, Journal of Hydrology, pp. 3-15.*

Galy et al., Using SAR Imagery for Flood Modeling, Jan. 2000, RGS-IBG Annual Conference, pp. 1-14.*

Busby et al., Flood-Hazard Study—100-Year Flood Stage for Apple Valley Dry Lake San Bernardino County, California, Jun. 1975, pp. 1-40.*

* cited by examiner

| Flood Event | Annual Probability of Occurrence | Flood Elevation | Exceedance Probability |
|---|---|---|---|
| 1 | 0.002 | 124.5 | 0.002 |
| 2 | 0.005 | 117.35 | 0.007 |
| 3 | 0.01 | 112.75 | 0.017 |
| 4 | 0.02 | 110.12 | 0.037 |
| 5 | 0.03 | 107.45 | 0.067 |
| 6 | 0.04 | 103.11 | 0.107 |
| 7 | 0.05 | 100.5 | 0.157 |
| 8 | 0.06 | 98.33 | 0.217 |
| 9 | 0.07 | 96.52 | 0.287 |
| 10 | 0.08 | 93.61 | 0.357 |
| 11 | 0.09 | 92.23 | 0.447 |
| 12 | 0.1 | 90.76 | 0.547 |
| 13 | 0.12 | 87.67 | 0.647 |
| 14 | 0.15 | 84.85 | 0.797 |
| 15 | 0.2 | 81.66 | 0.997 |

*FIG. 8b*

**Flood Frequency –
Flood Depth Relationship at the Property**

| Flood Frequency | Flood Depth at the Property |
|---|---|
| 2yr | 0 |
| 5yr | 0 |
| 10yr | 0 |
| 50yr | 1 |
| 100yr | 3 |
| 200yr | 6 |
| 500yr | 10 |
| 1000yr | 16 |

*FIG. 17a*

**Flood Damage Curve
Building Type: IND3 –
Chemical Plant, contents (Equipment)**

| Flood Depth | % Damage |
|---|---|
| 1 | 38 |
| 2 | 44 |
| 3 | 52 |
| 4 | 92 |
| 5 | 92 |
| 6 | 92 |
| 7 | 92 |
| 8 | 92 |

*FIG. 17b*

**Flood Frequency –
Flood Damage Relationship at the Property**

| Flood Frequency | Flood Depth at the Property |
|---|---|
| 2yr | $0 |
| 5yr | $0 |
| 10yr | $0 |
| 50yr | $1,435,000 |
| 100yr | $2,475,000 |
| 200yr | $3,345,000 |
| 500yr | $3,345,000 |
| 1000yr | $3,345,000 |

*FIG. 17c*

| Flood Frequency | Return Period | Flood Elevation | Flood Water Depth | Loss Value |
|---|---|---|---|---|
| 0.04 | 25 | 120 | 0 | 0 |
| 0.02 | 50 | 122 | 0.5 | $180,000 |
| 0.01 | 100 | 124 | 2.5 | $200,000 |
| 0.004 | 250 | 126 | 4.5 | $230,000 |
| 0.002 | 500 | 128 | 6.5 | $250,000 |

*FIG. 17d*

| Event | Annual Probability of Occurrence | Loss | Exceedance Probability | P * L |
|---|---|---|---|---|
| 1 | 0.002 | $25,000,000 | 0.0020 | $50,000 |
| 2 | 0.005 | $15,000,000 | 0.0070 | $105,000 |
| 3 | 0.01 | $10,000,000 | 0.0170 | $170,000 |
| 4 | 0.02 | $5,000,000 | 0.0370 | $185,000 |
| 5 | 0.03 | $3,000,000 | 0.0670 | $201,000 |
| 6 | 0.04 | $2,000,000 | 0.1070 | $214,000 |
| 7 | 0.05 | $1,000,000 | 0.1570 | $157,000 |
| 8 | 0.06 | $800,000 | 0.2170 | $173,600 |
| 9 | 0.07 | $700,000 | 0.2870 | $200,900 |
| 10 | 0.08 | $600,000 | 0.3570 | $214,200 |
| 11 | 0.09 | $500,000 | 0.4470 | $223,500 |
| 12 | 0.1 | $400,000 | 0.5470 | $218,800 |
| 13 | 0.12 | $300,000 | 0.6470 | $194,100 |
| 14 | 0.15 | $200,000 | 0.7970 | $159,400 |
| 15 | 0.2 | $100,000 | 0.9970 | $99,700 |
| | | Average Annual loss (AAL) = | | $2,266,200 |

FIG. 18b

| Impacted by Flood Events | Base | Levee | Dam | Hurricane | Landslide | Tsunami | Flash Flooding | Total Score |
|---|---|---|---|---|---|---|---|---|
| | | | | Risk Adjustments | | | | |
| 2-10yr Flood | 6 | 1 | 0.5 | 1 | 0.5 | 0.5 | 0.5 | 10 |
| 10-50yr Flood | 5 | 1 | 0.5 | 1 | 0.5 | 0.5 | 0.5 | 9 |
| 50-100yr Flood | 4 | 1 | 0.5 | 1 | 0.5 | 0.5 | 0.5 | 8 |
| 100-200yr Flood | 3 | 1 | 0.5 | 1 | 0.5 | 0.5 | 0.5 | 7 |
| 200-500yr Flood | 2 | 1 | 0.5 | 1 | 0.5 | 0.5 | 0.5 | 6 |
| 500-1000yr Flood | 1 | 1 | 0.5 | 1 | 0.5 | 0.5 | 0.5 | 5 |
| Non-Flood Zone | 0 | 0 | 0 | 0 | 0.5 | 0 | 0.5 | 1 |

FIG. 19

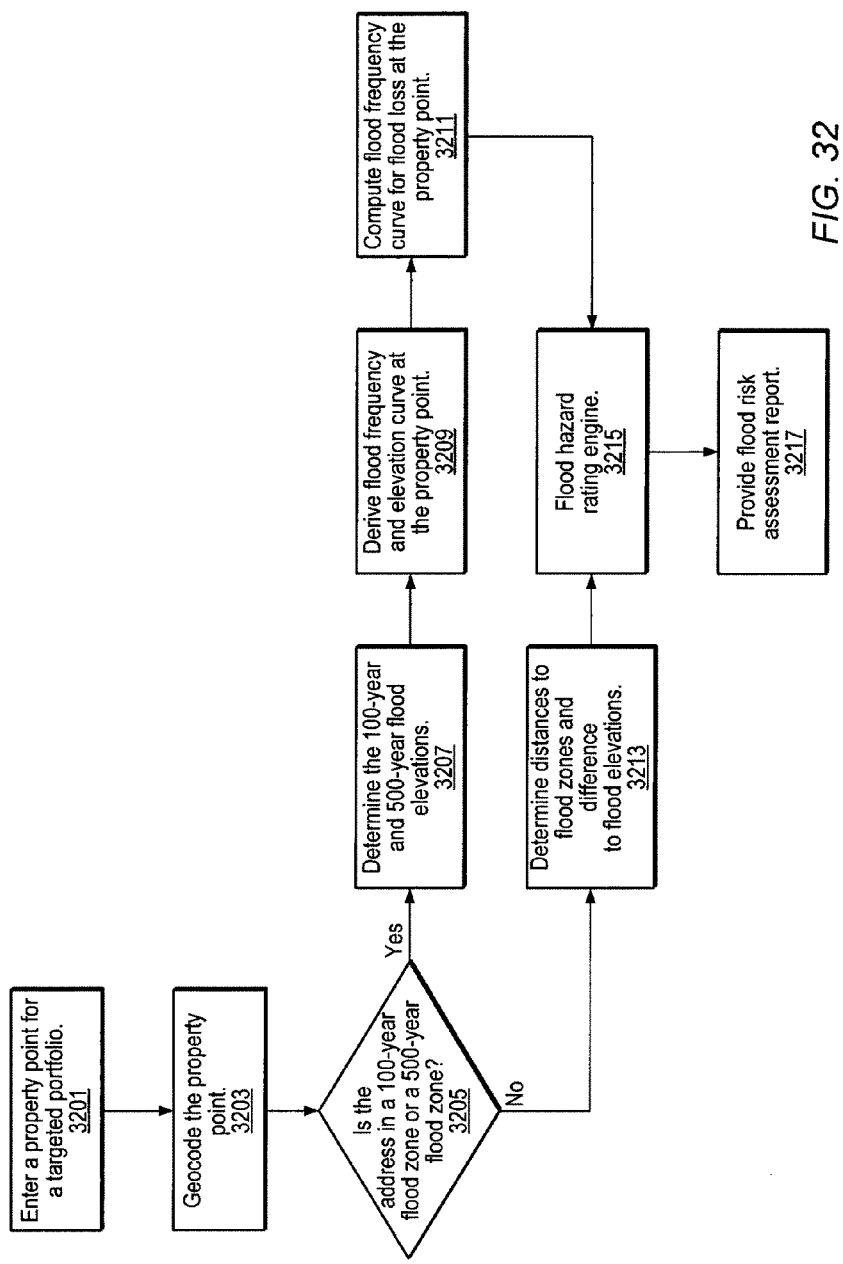

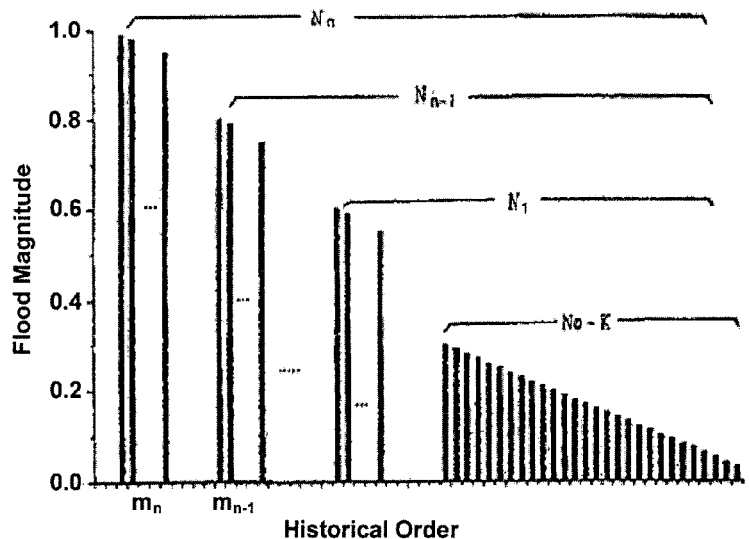

$N_i$ = number of years in the ith time period from the right to the left, i = 0, 1, 2, ..., n; and, $M_i$ = number of flood in the ith discrete segment from the right to the left, i = 1, 2, ...., n K = number of the floods which were taken to an extreme flood segment

FIG. 38a

| Frequency | Date | Discharge | Height | Elevation | Event Type |
|---|---|---|---|---|---|
| 0.001 | 5/1/1973 | 1030000 | 48.28 | 424.71 | Extreme Event |
| 0.002 | 6/9/1923 | 1018000 | 37 | 413.43 | Extreme Event |
| 0.003 | 6/21/1842 | 1000000 | 40.22 | 416.65 | Extreme Event |
| ..... | ..... | ..... | ..... | ..... | ..... |
| 0.012 | 1/23/1924 | 887300 | 35.1 | 411.53 | Significant Event |
| 0.022 | 7/12/1919 | 861500 | 34.25 | 410.68 | Significant Event |
| 0.031 | 7/28/1977 | 854000 | 44.83 | 421.26 | Significant Event |
| 0.041 | 6/5/1918 | 851000 | 33.85 | 410.28 | Significant Event |
| 0.05 | 4/26/1964 | 843000 | 37.24 | 413.67 | Significant Event |
| 0.059 | 3/24/1948 | 836000 | 37.84 | 414.27 | Significant Event |
| 0.069 | 2/24/1992 | 810000 | 40.69 | 417.12 | Significant Event |
| ..... | ..... | ..... | ..... | ..... | ..... |
| 0.079 | 4/21/1922 | 784500 | 32.85 | 409.28 | Continuous |
| 0.089 | 7/18/1948 | 783100 | 39.76 | 416.19 | Continuous |
| 0.099 | 7/22/1921 | 781000 | 40.38 | 416.81 | Continuous |
| 0.109 | 4/29/1984 | 776600 | 33.5 | 409.93 | Continuous |

FIG. 38b

SYSTEMS AND METHODS FOR FLOOD RISK ASSESSMENT

PRIORITY

This application claims benefit of priority of U.S. Provisional Patent Application Ser. No. 60/852,379 titled "Systems and Methods for Flood Risk Assessment", filed on Oct. 17, 2006, whose inventor is Wei Du, which is hereby incorporated by reference in its entirety as though fully and completely set forth herein.

BACKGROUND OF THE INVENTION

1. Field of the Invention

The present invention relates generally to risk assessment and, more specifically, to flood risk assessment.

2. Description of the Related Art

Worldwide, floods may be the number one cause of losses from natural events. Flood risk may be a function of flood hazards (e.g., hurricanes and/or damage to a levee or dam), property exposure to these hazards, and the damage vulnerability of properties during a flood. Comprehensive flood risk assessment and flood loss mitigation planning may need to address these three aspects. In addition, some flood planners may consider alternatives for coping with flood hazards including land-use planning, upstream watershed treatment, flood-proofing buildings, insurance and reinsurance measures, emergency evacuation, and building levees/dams and other structures.

In the United States, floods may account for significant property and business interruption losses affecting thousands of enterprises each year, which may cost more in property damages than other natural disasters. In 2005, the flooding from Hurricane Katrina alone caused over $40 billion in property damage, led to over 1600 deaths, and affected over 250,000 businesses according to the United States Census Bureau. Among federal, public, and private measures on flood loss mitigation, insurance and reinsurance may be a key factor in reducing the financial risk to individuals, enterprises and even whole societies. Mortgage companies, public sector (from the Federal Emergency Management Agency (FEMA) to municipalities), capital markets, insurance, and reinsurance companies may need knowledge about frequencies of floods, flood elevations, and frequencies of flood inundation losses at different property locations in order to underwrite sufficient and comprehensive policies for these properties.

Traditionally flood risk for both residential and commercial properties may have been determined by whether the properties were inside or outside FEMA special flood hazard areas (SFHAs). Whether the property is inside or outside of an SFHA may have been the principle risk factor considered in determining whether to purchase flood insurance. Flood risks associated with properties within and beyond SFHAs may be different. In an SFHA, properties located near flood sources with lower elevations may have a higher flood risk than properties near SFHAs boundaries at a higher elevation. Repetitive loss may occur more often in properties at lower elevations because the flood frequencies at lower elevations may be much higher. Beyond the 100 yr flood zone, properties may also suffer flood damage. For example, based on FEMA records, 30% of claims were from the outside of 100 yr flood zones.

SUMMARY OF THE INVENTION

In various embodiments, a flood frequency versus flood elevation curve for a property point may be derived using points of flood elevation for corresponding flood frequency derived from flood maps (e.g., geospatial flood risk zoning maps). The points may be statistically determined points that are verifiably discrete. The derived flood frequency versus flood elevation curves may be used to reduce the uncertainty in flood risk assessment (e.g., for insurance companies calculating policy premiums).

In some embodiments, points may be generated using geospatial point/line/polygon/surface features (e.g., flood elevation lines) for flood elevations at different flood frequency levels. The geospatial point/line/polygon/surface features may be defined and created based on elevation datasets (e.g., digital elevation maps) and flood maps. The geospatial point/line/polygon/surface features may be created/redefined in locations where there previously were inconsistencies between the elevation datasets and the flood maps that were generated, for example, from computer models and field surveys. In some embodiments, the elevation datasets and flood maps may be digital. In some embodiments, a manual method may be used to overlay the flood map with the elevation datasets (e.g., an elevation map) and flood elevation lines may be determined and/or digitized for flood elevations (e.g., determined using hydraulic modeling). In some embodiments, a flood source line feature (e.g., a waterway centerline or a coastal line) may be used to determine flood elevation lines. In some embodiments, pre-existing flood elevation lines (e.g., base flood elevation lines) may be extended to form additional flood elevation lines (e.g., for other flood frequency boundaries). In some embodiments, slopes of new flood elevation lines may be determined based on slopes of other flood elevation lines. In various embodiments, flood elevation lines may thus be created for points between or near existing flood elevation lines.

In various embodiments, flood elevation lines and/or flood boundaries (e.g., pre-existing or derived) may be adjusted to improve the accuracy of the derived points. For example, flood elevation lines may be adjusted on top of digital elevation maps to correlate the endpoints of the flood elevation line with points on the digital elevation map with similar elevations as the elevation associated with the flood elevation line. In some embodiments, other points on the flood elevation lines and/or other points on the flood map may be adjusted using the digital elevation map. In some embodiments, flood boundaries may also be corrected (e.g., by using the endpoints of corrected flood elevation lines).

In some embodiments, the flood elevation lines (e.g., pre-existing and/or derived) and flood boundary lines may be used to calculate flood frequency versus flood elevation curves, flood frequency versus damage curves, and flood risk ratings. In some embodiments, these curves and flood risk ratings may be derived for a specific property, a geocoded point location, or a point of interest (POI). For example, base flood risk ratings may be derived from the computed flood frequency versus flood elevation curve. As another example, flood risk adjustments (risk load) may be made to the base flood risk rating for flood related hazards (e.g., hurricanes, landslides, tsunamis, flash flooding, damage to a levee, or damage to a dam).

In some embodiments, a limited number of statistically and geospatially known flood elevations (such as 100-year and 500-year flood elevations) that may have been verified by detailed hydrologic and hydraulic (HH) studies may be used to predict and extrapolate unknown flood elevations by using accurate digital elevation data, hydrologic methods, and GIS (Geographic Information System) technology at any given geospatial location in a flood risk area.

In some embodiments, FEMA's Flood Insurance Rate Maps may have 100-year flood elevation lines printed on them for some areas. In some embodiments, FEMA maps may have the 500-year flood boundary printed on them for some areas, but may not have 500-year flood elevation lines printed on them. In some embodiments, the 100-year and/or 500-year flood elevation lines may be determined or provided from other flood map sources (e.g., a FEMA Flood Insurance Study (FIS)).

In some embodiments, a property point for analysis may be provided by a user. The property point may correspond to an address, a geocoded point, a point of interest, a building on a property, etc. In some embodiments, the property point may include the address of a targeted portfolio from a mortgage company, public sector entity (e.g., FEMA, municipalities, states, etc.), capital market entity, insurance company, or reinsurance company. The property point may be geocoded by the system. For example, an x,y coordinate (such as a latitude/longitude) may be determined for the property point. In some embodiments, the 100-year base flood elevation and the 500-year flood elevation may be determined for the property point. A determination may be made as to whether the property point is within a 100-year flood zone, a 500-year flood zone, or neither. If the property point is within the 100-year flood zone and/or the 500-year flood zone, the 100-year and 500-year flood elevation lines for the property point may be determined. If the 100-year base flood elevation lines exist near the property point, the 100-year base flood elevation for the point may be interpolated from the existing 100-year base flood elevation lines (e.g., from two adjacent 100-year base flood elevation lines). If the 100-year base flood elevation lines are not provided near the point, the 100-year base flood elevation lines may be created near the point and the 100-year base flood elevation line for the point may be interpolated. If the 500-year flood elevation lines exist near the property point, the 500-year flood elevation for the point may be interpolated from the existing 500-year flood elevation lines. If the 500-year flood elevation lines are not provided near the point, the 500-year flood elevation lines may be created near the point and the 500-year flood elevation line for the point may be interpolated. If the property point is outside the 100-year and 500-year flood elevation lines, the 100-year and 500-year flood elevation lines may be determined for the point using various methods.

The flood frequency versus elevation curve may then be determined at the property point. Using the 100-year and 500-year flood elevation points, a distribution may be calculated which may provide the flood elevations at other flood frequencies (e.g., 10 year, 50 year, 1000 year, etc.). A flood frequency curve versus flood loss may be determined for the property point using the flood frequency versus elevation curve and additional data (e.g., provided by the user about the property point). The information may be used to provide a flood risk assessment report to the user.

BRIEF DESCRIPTION OF THE DRAWINGS

A better understanding of the present invention may be obtained when the following detailed description is considered in conjunction with the following drawings, in which:

FIGS. 8a-b illustrate an embodiment of a map and chart used to determine missing flood elevation lines using gage station data.

FIGS. 17a-d illustrate various flood data charts used in calculating a flood frequency versus damage curve, according to an embodiment.

FIG. 18b illustrates an embodiment of a chart calculating an average annual loss.

FIG. 19 illustrates a chart of risk scores, according to an embodiment.

FIG. 32 illustrates an embodiment of a web-based method for providing a flood risk assessment for a point.

FIG. 38a illustrates an embodiment of a plot of N-segment discrete hydrological data series.

FIG. 38b illustrates an embodiment of sorted gage station data for use in determining the N-segment discrete hydrological data series.

Figure 1:
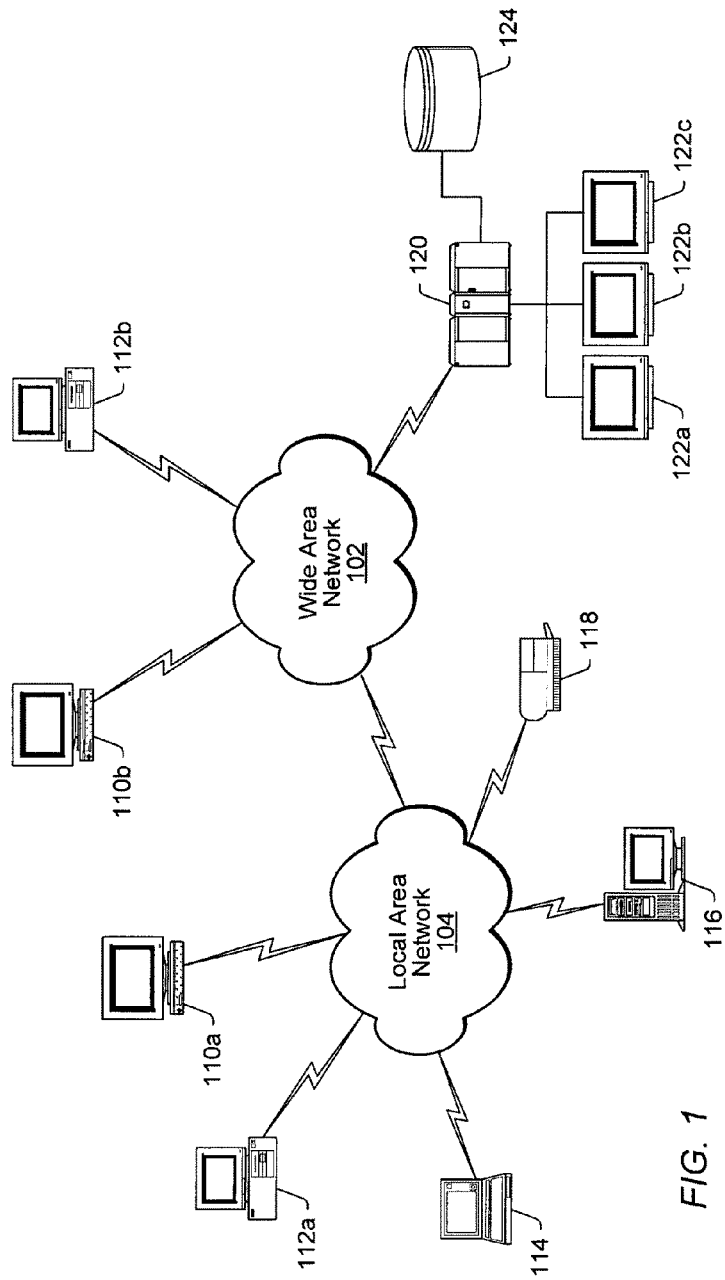
FIG. 1 illustrates an embodiment of a wide area network ("WAN").

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

In various embodiments, a flood frequency versus flood elevation (flood depth) curve may be computed for a property point (e.g., a geocoded point location defined using geospatial coordinates, such as a latitude and a longitude, a georeferenced point (e.g., referenced to a coordinate system), an address, a building at an address, or other points of interest (POI)) in a flood risk area. In some embodiments, the flood frequency versus flood elevation curves may be determined for several property points in a portfolio. While FEMA is suggested as a possible source of flood maps herein, it is to be understood that the methods described herein may be used for property points worldwide (e.g., not constrained to the United States). For example, other flood map sources may be used to assist in analyzing property points located outside the United States. The flood frequency may refer to a flood level that has a specified percent chance of being equaled or exceeded in a given year. For example, a 100-year flood may occur on average once every 100 years and thus may have a 1-percent chance of occurring in a given year. In some embodiments, the flood frequency may be in decimal format (e.g., 0.01 for the 100 year flood (0.01=1/100 years) or a maximum flood event occurring statistically once every 100 years, 0.002 for the 500 year flood (0.002=1/500 years) or a maximum flood event occurring statistically once every 500 years). In some embodiments, exceedance probability may be used instead of or in addition to flood frequency. Exceedance probability may refer to a probability of a value exceeding a specified magnitude in a given time period. For example, the data on a flood frequency curve may also be plotted as an exceedance probability curve. Other flood frequencies and flood frequency formats are also contemplated. Flood elevation may indicate an elevation of the surface of flood waters during the corresponding flood event. For example, if the flood water surface rises to an elevation of 180 m (e.g., above sea level) at a property point during a flood event occurring statistically once every 100 years, the 100 year flood elevation for the property point may be 180 m. Other flood elevation formats are also contemplated (e.g., the flood elevation may be represented as a flood depth of the flood waters above the ground surface (e.g., 10 feet above the ground surface), etc.).

Initial flood datasets may be provided by several sources. For example, datasets may be provided from flood maps such as digital flood zoning maps (for example, Digital Flood Insurance Rate Maps (DFIRM) (e.g., from the Federal Emergency Management Agency (FEMA)). Flood maps may include flood risk zoning maps adopted by communities that participate in the National Flood Insurance Program. Other flood maps are also contemplated. Flood maps may be stored in geospatial databases. Other sources of initial flood map datasets are also contemplated (e.g., datasets may originate from flood elevation lines or from flood elevation raster images). Additional data may be derived from 1-10 m Digital Elevation datasets ("1-10 m" may indicate a resolution of the maps), USGS (United States Geological Survey) gage station records, and flood source features from USGS National Hydrologic Datasets. Other resolution (e.g., higher resolution) digital elevation datasets are also contemplated. These initial datasets may only provide a single point at a flood frequency versus flood elevation curve for a given geographic location (e.g., a given property point) in a flood risk area (e.g., the 100-year base flood elevation). For example, these datasets may provide the flood elevation line for a 100-year (and/or 500-year) flood (100-year and 500-year refer to flood frequency) for a set of points. In some embodiments, the flood frequency versus flood elevation curve may be computed for geospatial points (e.g., property points) based on, for example, two statistically determined discrete points (such as 100-year and 500-year flood elevations) derived from a flood map (e.g., a digital flood risk boundary map), flood elevation lines for flood elevations, and digital elevation data. In some embodiments, the two points may not be statistically determined discrete points. Based on these determined points, flood frequency versus damage curves may be calculated to assist in flood risk assessment (e.g., to assist in insurance premium determinations for a property point). In some embodiments, prior to calculating the two points, missing data (e.g., missing flood elevation lines and/or flood boundaries) may be computed (e.g., using the methods described herein). In some embodiments, existing or derived flood elevation lines and/or flood boundaries may also be corrected (e.g., using the methods described herein).

FIG. 1 illustrates an embodiment of a WAN 102 and a LAN 104. WAN 102 may be a network that spans a relatively large geographical area. The Internet is an example of a WAN 102. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more LANs 104 may be coupled to WAN 102. LAN 104 may be a network that spans a relatively small area. Typically, LAN 104 may be confined to a single building or group of buildings. Each node (i.e., individual computer system or device) on LAN 104 may have its own CPU with which it may execute programs. Each node may also be able to access data and devices anywhere on LAN 104. LAN 104, thus, may allow many users to share devices (e.g., printers) and data stored on file servers. LAN 104 may be characterized by a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, and/or radio waves).

Each LAN 104 may include a plurality of interconnected computer systems and optionally one or more other devices. For example, LAN 104 may include one or more workstations 110a, one or more personal computers 112a, one or more laptop or notebook computer systems 114, one or more server computer systems 116, and one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs through WAN 102.

One or more mainframe computer systems 120 may be coupled to WAN 102. As shown, mainframe 120 may be coupled to a storage device or file server 124 and mainframe terminals 122a, 1226, and 122c. Mainframe terminals 122a, 122b, and 122c may access data stored in the storage device or file server 124 coupled to or included in mainframe computer system 120.

WAN 102 may also include computer systems connected to WAN 102 individually and not through LAN 104. For example, workstation 110b and personal computer 112b may be connected to WAN 102. For example, WAN 102 may include computer systems that may be geographically remote and connected to each other through the Internet.

Figure 2:
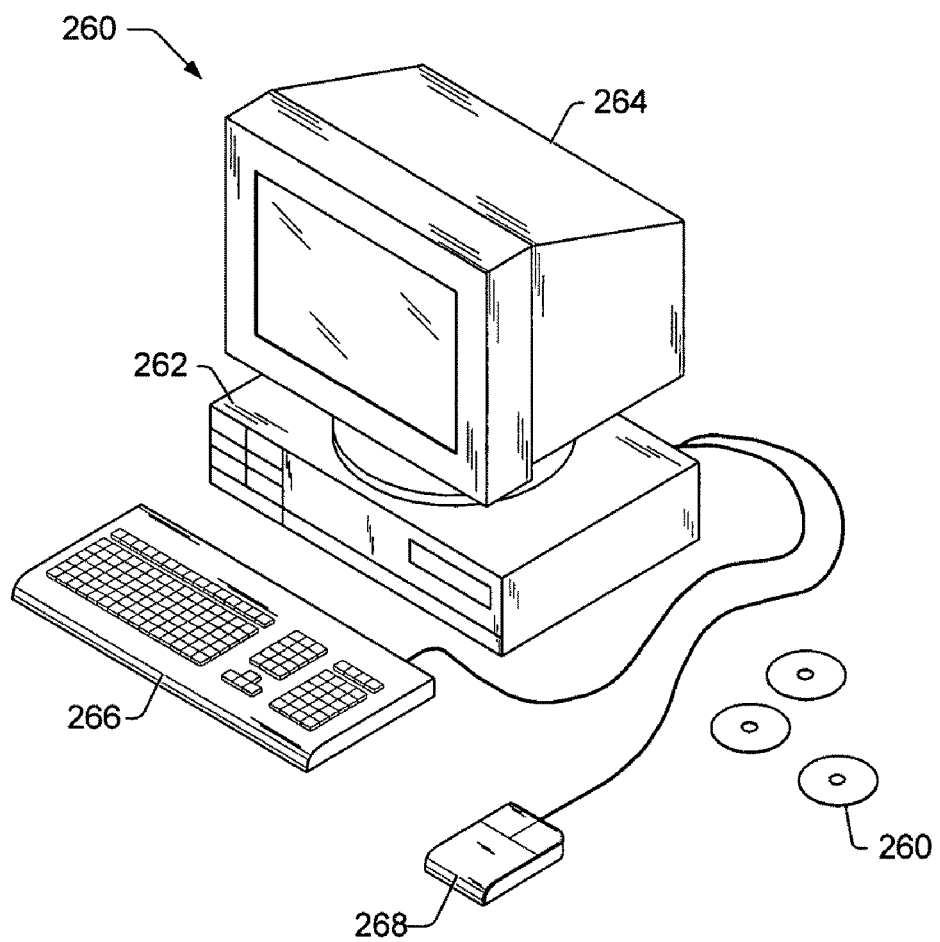
FIG. 2 illustrates an embodiment of computer system that may be suitable for implementing various embodiments of a system and method for flood risk assessment.

FIG. 2 illustrates an embodiment of computer system 250 that may be suitable for implementing various embodiments of a system and method for flood risk assessment. Each computer system 250 typically includes components such as CPU 252 with an associated memory medium such as CD-ROMs 260. The memory medium may store program instructions for computer programs. The program instructions may be executable by CPU 252. Computer system 250 may further include a display device such as monitor 254, an alphanumeric input device such as keyboard 256, and a directional input device such as mouse 258. Computer system 250 may be operable to execute the computer programs to implement computer-implemented systems and methods for flood risk assessment.

Computer system 250 may include a memory medium on which computer programs according to various embodiments may be stored. The term "memory medium" is intended to include an installation medium, e.g., floppy disks or CD-ROMs 260, a computer system memory such as DRAM, SRAM, EDO RAM, Rambus RAM, etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. Computer system 250 may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement a method for flood risk assessment. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes ("MFC"), browser-based applications (e.g., Java applets), traditional programs, or other technologies or methodologies, as desired. A CPU such as host CPU 252 executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

Figure 3:
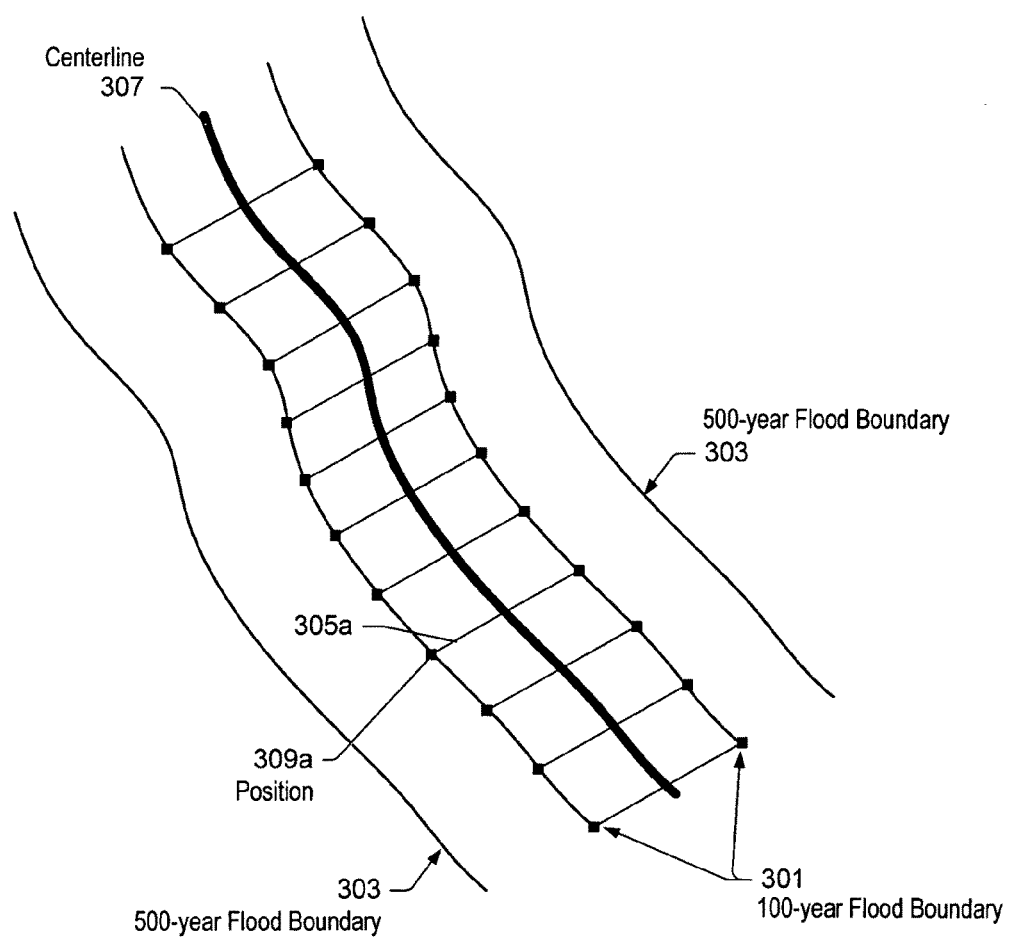
FIG. 3 illustrates an embodiment of an example flood map.
Figure 4A:
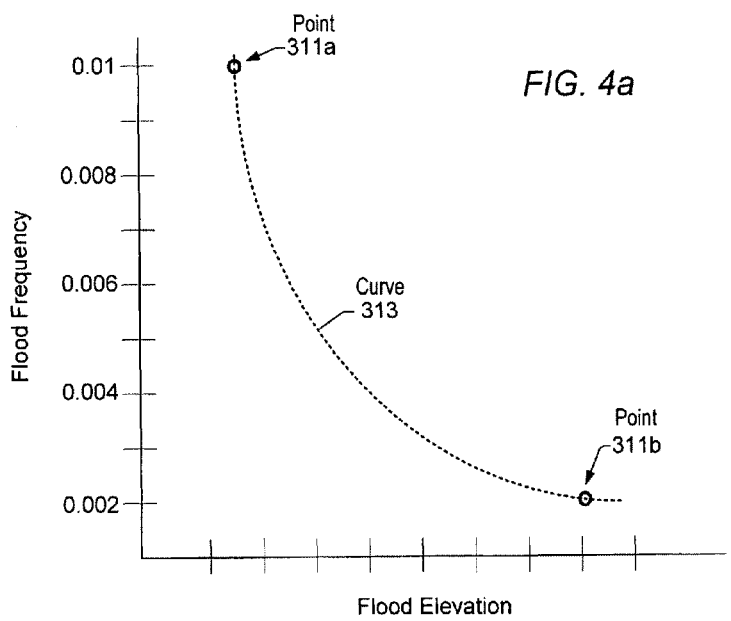
FIGS. 4a-b illustrate embodiments of a plot for a flood elevation point on the example map.
Figure 4B:
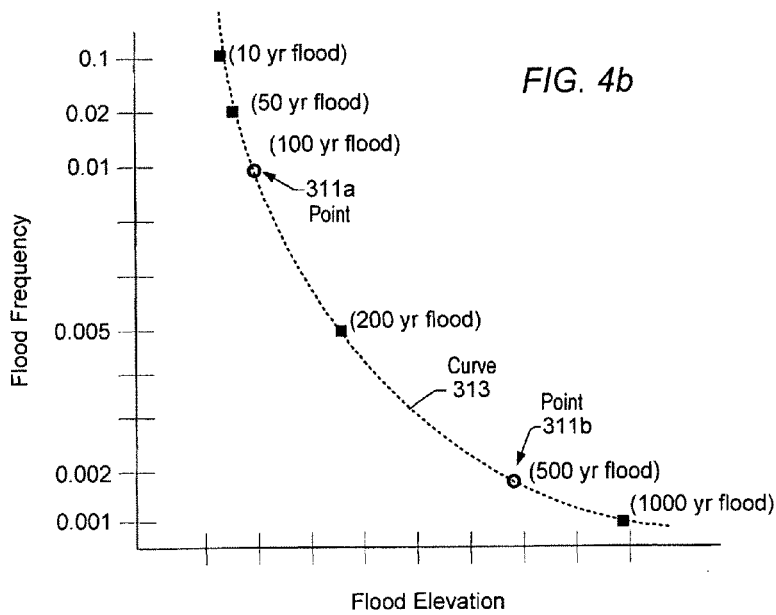

FIGS. 3, 4a, and 4b illustrate an embodiment of an example flood map and plotted curves of a flood elevation versus flood frequency points on the example flood map. As seen in FIG. 3, flood elevation lines 305 (e.g., base flood elevation (BFE) line 305a) may be provided for a position (e.g., position 309a corresponding to a property point) on the 100-year flood boundary 301 from a flood source line feature (for example, a waterway centerline 307 (e.g., a river centerline)). For example, plot point 311a (see FIGS. 4a-b) may represent the flood elevation for position 309a for the 0.01 flood frequency (100-year flood frequency). To build a curve for flood frequency versus flood elevation for a position (e.g., position 309a), a second point 311b (e.g., for the 0.002 flood frequency (at the 500-year flood boundary 303)) on the curve 313 may be needed (several embodiments for determining the first point 311a and/or second point 311b are described herein). For example, if second point 311b is known or calculated, the curve 313 for flood frequency versus flood elevation may be calculated, using a curve fitting algorithm, for position 309a that may show other flood frequency versus flood elevations for position 309a (several embodiments for calculating the curve 313 are also described herein). FIG. 4b also shows other points on the flood frequency versus flood elevation curve 313 (with modified axis to show additional flood frequencies versus flood elevations).

As defined by the National Flood Insurance Program (NFIP), base flood elevation (BFE) is "the elevation shown on the Flood Insurance Rate Map for Zones AE, AH, A1-A30 V1-V30 and VE that indicates the water surface elevation resulting from a flood that has a one percent chance of equaling or exceeding that level in any given year." The BFE is the elevation of the water projected to occur in association with the base flood, which by definition is a "flood having a one percent chance of being equaled or exceeded in any given year" see 44 C.F.R. 59.1. As used herein "flood elevations" and "flood elevation lines" are used to refer to the elevation of floods and lines representing these elevations for various flood frequencies (e.g., 500-year flood). "Flood elevation line" for the 100-year flood frequency may be used interchangeably with the term "BFE".

Figure 5:
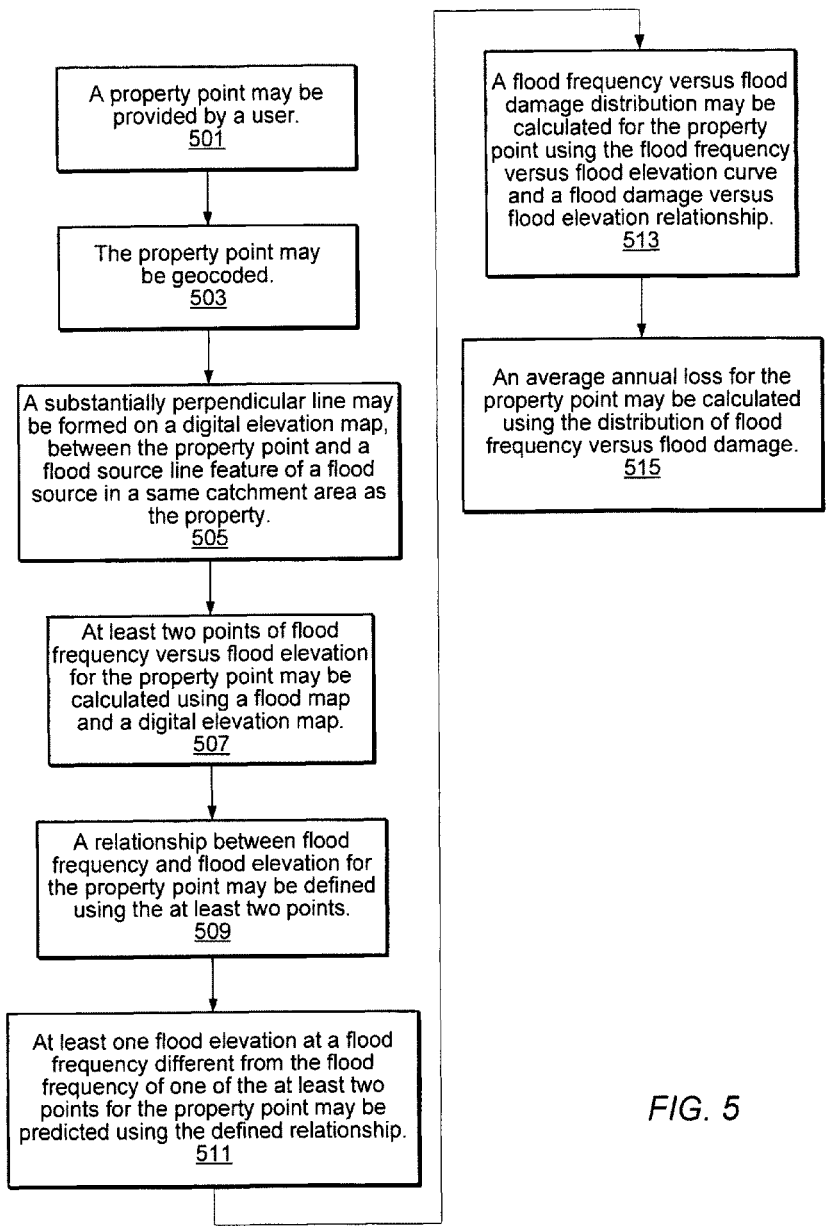
FIG. 5 illustrate an embodiment of a method for providing a flood risk assessment for a property point.

FIG. 5 illustrate an embodiment of a method for providing a flood elevation and flood risk assessment for a property point. It should be noted that in various embodiments of the methods described below, one or more of the elements described may be performed concurrently, in a different order than shown, or may be omitted entirely. Other additional elements may also be performed as desired.

At 501, a property point may be provided by a user (e.g., the address of a targeted portfolio from a mortgage company, public sector entity (e.g., FEMA, municipalities, states, etc.), capital market entity, insurance company, or reinsurance company).

At 503, the property point may be geocoded (e.g., an x,y coordinate (such as a latitude/longitude) may be determined by the system).

At 505, a substantially perpendicular line may be formed on a digital elevation map, between the property point and a flood source line feature of a flood source in a same catchment area as the property. The substantially perpendicular line may be used to associate the property point with the flood source line feature and one or more flood boundaries. The perpendicular line may also be formed as a cross section through the property point (e.g., in three dimensional space). Other uses of the perpendicular line/cross section are also contemplated.

At 507, at least two points of flood frequency versus flood elevation for the property point may be calculated using a flood map and a digital elevation map. As described herein, calculating the at least two points may include statistically determining the at least two flood frequency versus flood elevation points. For example, the 100-year flood elevation and the 500-year flood elevations may be determined for the property point (e.g., according to flood elevation lines, corresponding to flood frequency boundaries, crossing through the property point). In some embodiments, other flood elevations may be determined for the property point in addition to or instead of the 100-year base flood elevation and the 500-year flood elevation. Flood maps may include maps of flood zones (defined by flood boundaries) and a plurality of pre-existing flood elevation lines. For example, FEMA Flood Insurance Rate Maps may have 100-year flood elevation lines printed on them for some areas. In some embodiments, FEMA maps may have the 500-year flood boundary printed on them for some areas, but may not have 500-year flood elevation lines printed on them. In some embodiments, the 100-year and/or 500-year flood elevation lines may be determined or provided from other flood map sources (e.g., a FEMA Flood Insurance Study (FIS)). Digital elevation maps may include digital elevation models and/or digital elevation datasets. Other maps and datasets may also be used for elevation.

Figure 6:
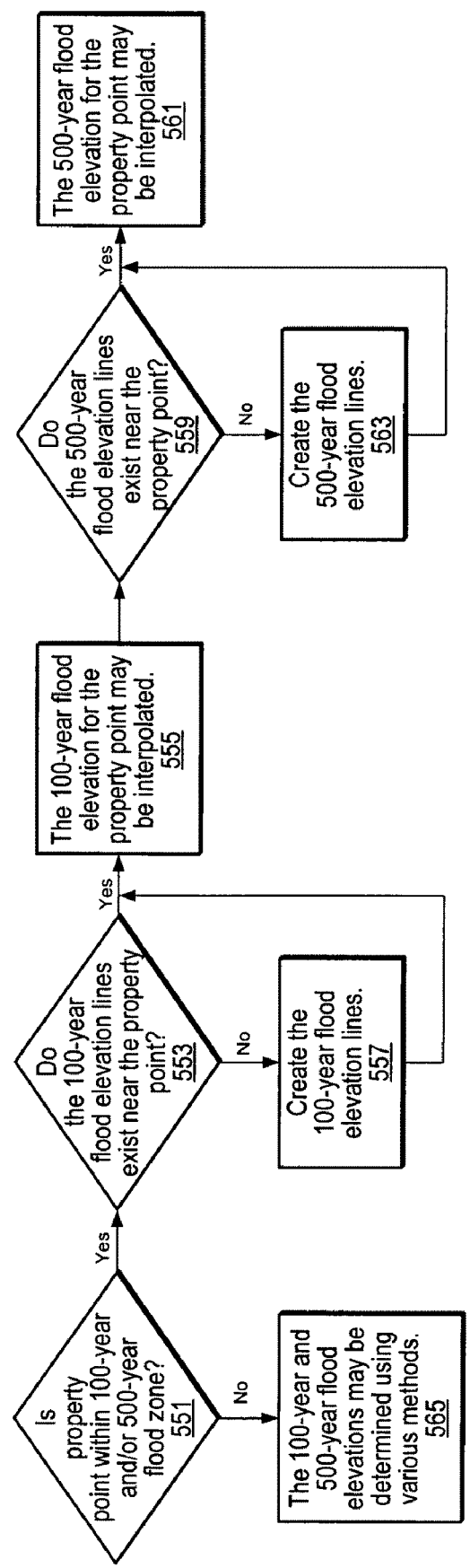
FIG. 6 illustrates an embodiment of a method for interpolating/extrapolating flood elevations for a property point.
Figure 36A:
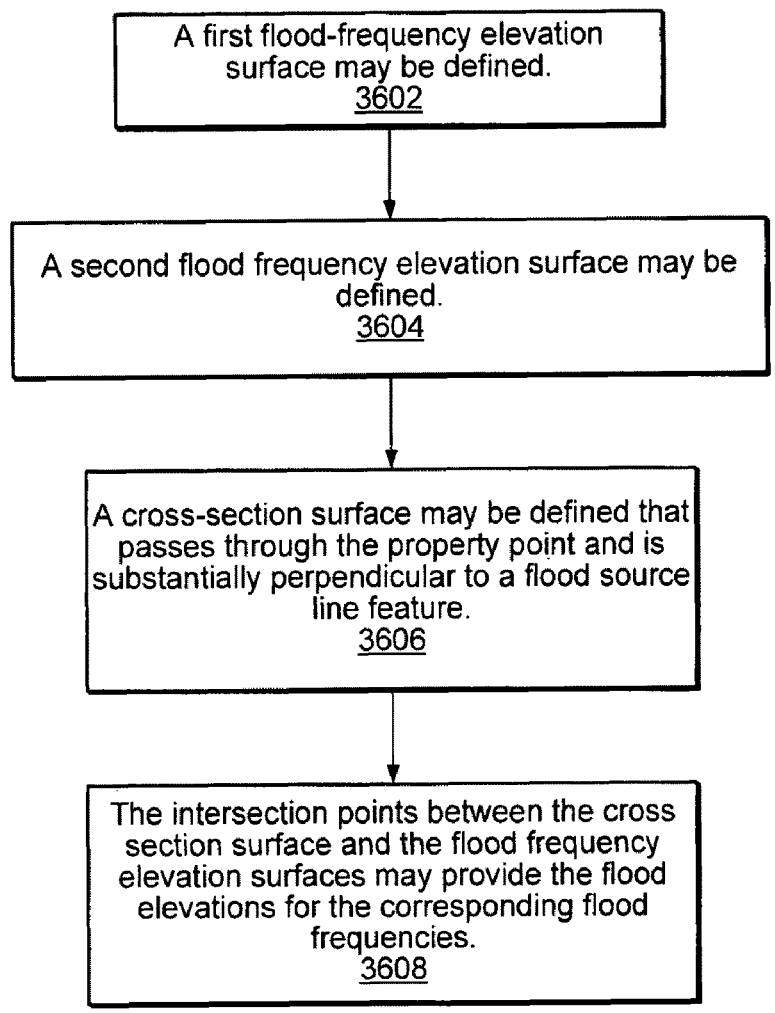
FIGS. 36a-b illustrate an embodiment of a method for determining flood frequency versus flood elevation points using three dimensional surfaces.

In some embodiments, the 100-year and 500-year flood elevations/flood elevation lines for a region (e.g., a state or the nation) may be determined using, for example, the process designated in FIG. 6 prior to receiving the property point request. These predetermined flood elevations may be stored in 100-year and 500-year flood elevation layers. These layers may then be queried after the property point request is received. In some embodiments, the 100-year and 500-year flood elevations may be determined during runtime (e.g., after the property point request is received) using the process designated, for example, in FIG. 6. Determining the 100-year and 500-year flood elevation lines may be automated or may be manual. Again, while several examples are provided using the 100-year and 500-year flood elevations, it is to be understood that other flood elevations may be used instead. Other methods are also contemplated and described herein. For example, at least two points of flood frequency versus flood elevation for the property point may be determined at the intersection of a cross section, through the property point, and flood frequency surfaces (e.g., the 100 year flood surface and the 500 year flood surface) (e.g., see FIGS. 36a-b). As another example, corresponding flood elevations for flood frequencies may be determined at an intersection of a line (through the property point and substantially perpendicular to a flood source line feature) and the corresponding flood boundaries (e.g., see FIGS. 13-14). As yet another example, the at least two points of flood frequency versus flood elevation for the property point may be calculated using cross section data on a flood profile (e.g., see FIG. 37). Other method are also contemplated.

Figure 4C:
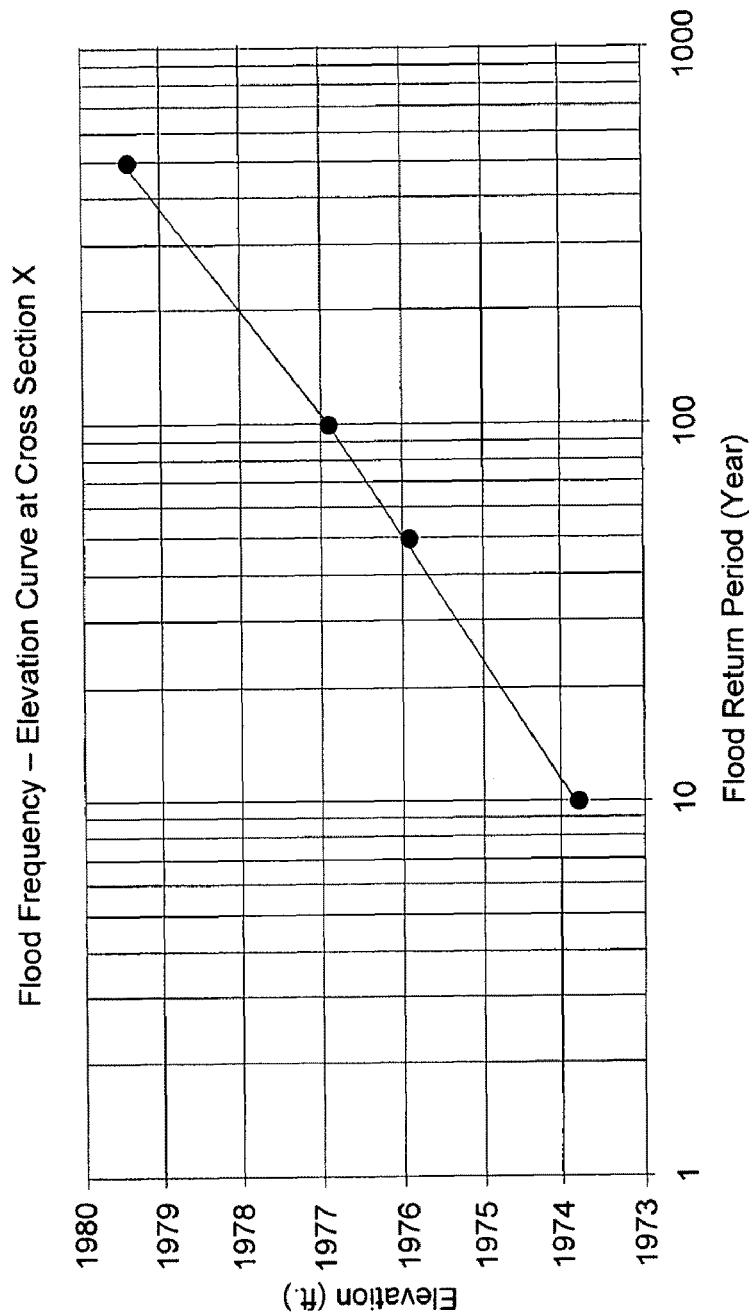
FIG. 4c illustrates an embodiment of a flood elevation versus flood return period for a property point.

At 509, a relationship between flood frequency and flood elevation for the property point may be defined using the at least two points. For example, a flood frequency versus flood elevation curve may be determined at the property point. Using the 100-year and 500-year flood elevation points, a distribution may be calculated. The distribution may provide the flood elevation at other flood frequencies (e.g., 10 year, 50 year, 1000 year, etc.). For example, the distribution may be a logarithmic relationship (e.g., see FIG. 4c). One logarithmic relationship that may be used is:

$$\text{Flood Elevation} = a \, \text{Log}(\text{flood return period}) + b$$

where flood return period=1/flood frequency and where a and b are defined by solving the equation for the at least two calculated points of flood frequency versus flood elevation. To develop this linear relationship (e.g., see FIG. 4c), several data sets for different areas were analyzed. Other logarithmic relationships are also contemplated (e.g. see below).

At 511, at least one flood elevation at a flood frequency different from the flood frequency of one of the at least two points for the property point may be predicted using the defined relationship. For example, if the relationship is represented as a curve, a flood elevation at a corresponding flood frequency may be determined from the curve. If the relationship is defined as an equation, a flood elevation for a corresponding flood frequency may be determined using the defined equation. Other relationships are also contemplated.

At 513, a flood frequency versus flood damage distribution may be calculated for the property point using the flood frequency versus flood elevation curve and a flood damage versus flood elevation relationship (e.g., a vulnerability curve provided by the user). Additional data may also be used (e.g., provided by the user about the property point).

At 515, an average annual loss for the property point may be calculated using the distribution of flood frequency versus flood damage (e.g., by interpolation). In some embodiments, information may be used to provide a flood risk assessment report to the user. In some embodiments, a flood elevation versus percent damage relationship may be defined (e.g., using one or more flood studies for the property area) and the average annual loss for the property point may be determined using the flood elevation versus percent damage relationship.

As seen in FIG. 6, at 551, a determination may be made as to whether the property point is within a 100-year flood zone, a 500-year flood zone, or neither. Other flood frequency flood zones may also be used. If the property point is within the 100-year flood zone and/or the 500-year flood zone, the 100-year and 500-year flood elevations for the property point may be determined. Other flood elevations are also contemplated. At 553, a determination may be made whether the 100-year base flood elevation lines exist near the property point. At 555, if the 100-year base flood elevation lines exist near the property point, the 100-year base flood elevation for the point may be interpolated from the existing 100-year base flood elevation lines (e.g., see FIG. 13). At 557, if the 100-year base flood elevation lines are not provided near the point, the 100-year base flood elevation lines may be created near the point (e.g., see FIGS. 7a-8b, and 11-12) and the 100-year base flood elevation for the point may be interpolated. At 559, a determination may be made whether the 500-year flood elevation lines exist near the property point. At 561, if the 500-year flood elevation lines exist near the property point, the 500-year flood elevation for the point may be interpolated from the existing 500-year flood elevation lines (e.g., see FIG. 14). At 563, if the 500-year flood elevation lines are not provided near the point, the 500-year flood elevation lines may be created near the point (e.g., see FIGS. 10-12) and the 500-year flood elevation for the point may be interpolated. At 565, if the property point is outside the 100-year and 500-year flood elevation lines, the 100-year and 500-year flood elevations may be determined for the point using various methods such as extrapolation/interpolation (e.g., see FIG. 16) and/or using the nearest 100-year/500-year flood elevation lines. In some embodiments, the 100-year and 500-year flood elevation lines may be determined for an area (e.g., a nationwide area) at one time. The 100-year and 500-year flood elevations may then be interpolated for the property points as needed. In some embodiments, existing or derived flood elevation lines and/or flood boundaries may also be corrected (e.g., see FIGS. 33-36).

Referring back to FIG. 3, in some embodiments, different probability distributions may be used to calculate the curve 313 with two or more points 311a and 311b (which may be statistically determined flood elevation points). For example, the Log Pearson Type III distribution, the Log Normal distribution, and/or the Extreme Value Type I distribution may be used. Other distributions may also be used. The magnitude of a flood event (flood elevation) and the corresponding flood frequency may have a non-linear relationship. The flood elevation in the relationship may change more significantly during smaller flood frequencies (e.g., 5, 10-year return periods) than longer flood frequencies (e.g., 500 year return periods). In some embodiments, the relationship between flood elevations and flood frequency in a range of flood frequency between approximately 50 years to 1000 years may be near-linear after applying a logarithm transform on the flood frequency base. In some embodiments, a logarithm relationship between flood elevation and flood frequency may be defined at a cross section through the property point (and perpendicular to the flood source line feature) as:

Flood Elevation=a Log(flood return period)+b

In this relationship "a" may be the slope and "b" may be a constant that may be determined by solving the relationship with two flood elevation/flood frequency point pairs. In some embodiments, for a 100 year flood frequency point and a 500 year flood frequency, the relationship may be:

Flood Elevation=1.431*(Elev500−Elev100)*Log(flood return period)+3.862*(Elev100)−2.862*Elev500 where Elev100 is the flood elevation at flood frequency of 0.01 (the 100 year flood) and Elev500 is the flood elevation at the 0.002 flood frequency (500 year flood). The relationship may provide a flood elevation for a given flood frequency at the property point. The relationship may account for hydrologic, hydraulic, and statistical characteristics of flood elevation versus flood frequency. In some embodiments, the cross section through the property point (and perpendicular to the flood source line feature) may associate the property point with the flood source based on characteristics of watershed, elevation, and/or flow direction.

In some embodiments, the curve 313 may be calculated using the Log Pearson Type III distribution. The Log Pearson Type III distribution may include two parameters (a scale parameter and a shape parameter) and an initial hydrologic condition factor (such as initial discharge or a reference elevation). The Log Pearson Type III distribution may be calculated as follows:

$$P(y) := \frac{\lambda^{\beta*}(y)^{\beta-1*}\exp[-\lambda^*(y)]}{\Gamma(\beta)} \quad \Gamma(\beta+1) = \beta!$$

where $\lambda$ is a scale parameter and $\beta$ is a shape parameter. The scale and shape parameters may be determined using the two points 311a and 311b (for example, the two points may provide two sets of values for (P(y),y) resulting in two equations (with specified initial conditions) of two unknowns (the scale parameter and shape parameter)). In some embodiments, P(y) may represent, for example, the flood frequency and y may represent the flood elevation (e.g., P(y)=0.01, y=120 ft). The determined scale parameter and shape parameter may then be used to calculate the curve 313 (for a specified initial condition).

In some embodiments, the Lognormal Distribution may be used to calculate the curve 313. A variable X may be log-normally distributed if Y=LN(X) is normally distributed with "LN" denoting the natural logarithm. The general formula for the probability density function of the lognormal distribution may be:

$$f(x) = \frac{e^{-((ln((x-\theta)/m))^2/(2\sigma^2))}}{(x-\theta)\sigma\sqrt{2\pi}} \quad x \geq \theta; m, \sigma > 0$$

where $\sigma$ is the scale parameter, $\theta$ is the location parameter and m is the shape parameter. In some embodiments, points 311a and 311b may be used to solve for at least two of $\theta$, $\sigma$, and m. The case where $\theta$ equals zero may be referred to as the 2-parameter log-normal distribution. In some embodiments, additional points of flood frequency versus flood elevation may be used. The points 311a and 311b may be used to solve for $\sigma$ and m to calculate the curve 313 (e.g., by providing two sets of values for (f(x),x) resulting in two equations of two unknowns.) In some embodiments, f(x) may represent the probability and x may represent the flood elevation. The case where $\theta=0$ and m=1 may be referred to as the standard log-normal distribution. The equation for the standard lognormal distribution may be:

$$f(x) = \frac{e^{-((\ln x)^2/(2\sigma^2))}}{x\sigma\sqrt{2\pi}} \quad x \geq 0; \sigma > 0$$

In some embodiments, either point 311a and 311b may be used to solve for a in the standard lognormal distribution to calculate the curve 313. The general form of probability functions may be expressed in terms of the standard distribution.

In some embodiments, the Extreme Value Type I distribution may be used:

$$f(x) = \frac{1}{\beta} e^{\frac{x-\mu}{\beta}} e^{-e^{\frac{x-\mu}{\beta}}} \quad -\infty < x < \infty, \beta > 0$$

$$F(x) = 1 - e^{-e^{\frac{x-\mu}{\beta}}} \quad -\infty < x < \infty, \beta > 0$$

In some embodiments, points 311a and 311b may be used to solve for β and μ to calculate the curve 313 (e.g., by providing two sets of values for (f(x),x) resulting in two equations of two unknowns.) In some embodiments, f(x) may represent the probability and x may represent the flood elevation.

In some embodiments, the Log Pearson Type III distribution, the Log Normal distribution, and/or the Extreme Value Type I (or another distribution) may be used to calculate the curve 313. Once the parameters are solved for the distribution (e.g., using the points 311a and/or 311b), flood elevations at different flood frequency levels (e.g., 2 year, 5 year, 10 year, 50 year, 100-year, 200 year, 500-year, and 1000 year) may be determined using the distribution.

For example, in some embodiments, discrete values of the flood frequency versus flood elevation relationship at two known points (e.g., (FF1, Elev1), (FF2, Elev2)) may be entered into the selected probability distribution with two unknown parameters (e.g., shape parameter and scale parameter) to form two equations with two unknown variables:

FF1=F(Elev1, Shape Parameter, Scale Parameter)   (40)

FF2=F(Elev2, Shape Parameter, Scale Parameter)

The equations may be solved mathematically for deriving the values of those parameters (e.g., the shape parameter and scale parameter). After those two parameters are determined, the flood frequency versus elevation relationship may be presented as the following:

FF=F(Elev, Shape Parameter, Scale Parameter)

With this equation, the flood elevation at different flood frequencies (e.g., 2 yr, 10 yr, 50 yr, 200 yr, 1000 yr . . . ) may be computed.

In some embodiments, other relationships may be used. For example, as seen in FIG. 38a, hydrological parameters may be calculated using N-segment discrete hydrological data series derived from hydrologic gage station data. Gage station data may include date, gage height, and stream flow data. The average discharge and coefficient of variation (a normalized standard deviation) for an n-segment hydrologic dataset may be calculated using the following formulas:

$$\bar{Q}_n = \frac{1}{N_n} \left[ \sum_{z=1}^{m_n} Q_z + (N_n - m_n)\bar{Q}_{n-1} \right]$$

-continued $$C_{V_n} = \left\{ \frac{1}{N_n - 1} \left[ \sum_{z=1}^{m_n} \left( \frac{Q_z}{\bar{Q}_n} - 1 \right)^2 + (N_n - m_n - 1)C_{V_{n-1}}^2 \right] \right\}^{\frac{1}{2}}$$

$$S_n = \bar{Q}_n C_{V_n}$$

$N_i$=number of years in the ith time period from right to left, i=0, 1, 2, . . . n; and,
$m_i$=number of floods in the ith discrete segment from right to the left i=0, 1, 2, . . . n
Where $\bar{Q}_n$=mean discharge of the hydrologic dataset; $C_{V_n}$=coefficient of river discharge; and $S_n$=standard deviation. Curve fitting on the standard probability distributions may be used to determine three key hydrologic parameters by using hydrologic datasets: mean discharge ($\bar{Q}_n$), standard deviation ($S_n$), and skew coefficient. The skew coefficient may be derived from the mean discharge and its standard deviation. The Log-Pearson Type III deviate may be obtained by using the skew coefficient. Using the mean discharge, coefficient of river discharge and standard deviation, the scale parameter λ and shape parameter β of the Log Pearson Type III distribution may be determined (e.g., from statistical look-up tables). The derived probability distribution may present a relationship between the flood frequency and discharge. By using the relationship between the discharge and flood elevation (rating curve) from the gage station data (see FIG. 38b), the flood frequency versus flood elevation relationship may be derived.

In some embodiments, gage station data over a series of years may be sorted by discharge and/or gage height in order of largest flood event first, second event second, etc. (e.g., see FIG. 38b with a partial listing). The number of years covered by the gage station may be used to determine probability of a flood event happening in a given flood frequency. For example, the conditional probability (corresponding to flood frequency) may be provided by the following formulas:

$$P_n = \frac{m}{N_n - 1}, m = 1, 2, \ldots, m_n$$

$$P_{n-1} = P_n \bigg| m_n + \frac{Nn - mn}{N_n} * \frac{m}{N_{n-1} + 1}, m = 1, 2, \ldots, m_{n-1}$$

$$P_1 = P_2 \bigg| m_2 + \frac{N2 - m2}{N_2} * \frac{m}{N_1 + 1}, m = 1, 2, \ldots, m_1$$

$$P_0 = P_1 \bigg| m_1 + \frac{N1 - m1}{N_1} * \frac{m}{N_0 - K + 1}, m = 1, 2, \ldots, m_0$$

$N_i$=number of years in the ith time period from right to left, i=0, 1, 2, . . . n; and,
$m_i$=number of floods in the ith discrete segment from right to the left i=0, 1, 2, . . . n
K=number of the floods which were taken to a extreme flood segment FIG. 38b illustrates a partial listing of flood frequencies computed using the above formulas. The gage height may be converted into flood elevation by adding the gage datum (which may be the elevation of the gage station above sea level). In some embodiments, two or more points of flood frequency versus flood elevation may thus be computed using gage station data for a property point.

In some embodiments, these hydrologic parameters may be computed to be used in detailed HH studies and modeling in areas where flood mapping and flood engineering data may be missing. HH studies may include hydrologic studies (e.g., using water cycles and water movement modeling) and hydraulic studies (e.g., using gravity and water flow modeling) to determine approximate locations of flood boundaries, flood source line features, and/or flood elevation lines.

In some embodiments, data may be used (e.g., from DFIRM studies) to evaluate which of the three distributions may be best for a specific region or regions. In some embodiments, one distribution may be used.

In some embodiments, different distributions may be used for different regions. The algorithm to derive the parameters for the distributions by using the two points (e.g., at the 100-year and the 500-year flood elevations) may be performed by a computer system or performed manually. The output of the distribution (e.g., the flood elevation at the 2 year, 5 year, 10 year, 50 year, 100-year, 200 year, 500-year, and 1000 year, etc. flood frequencies) may be provided for additional flood analysis.

Figure 7A:
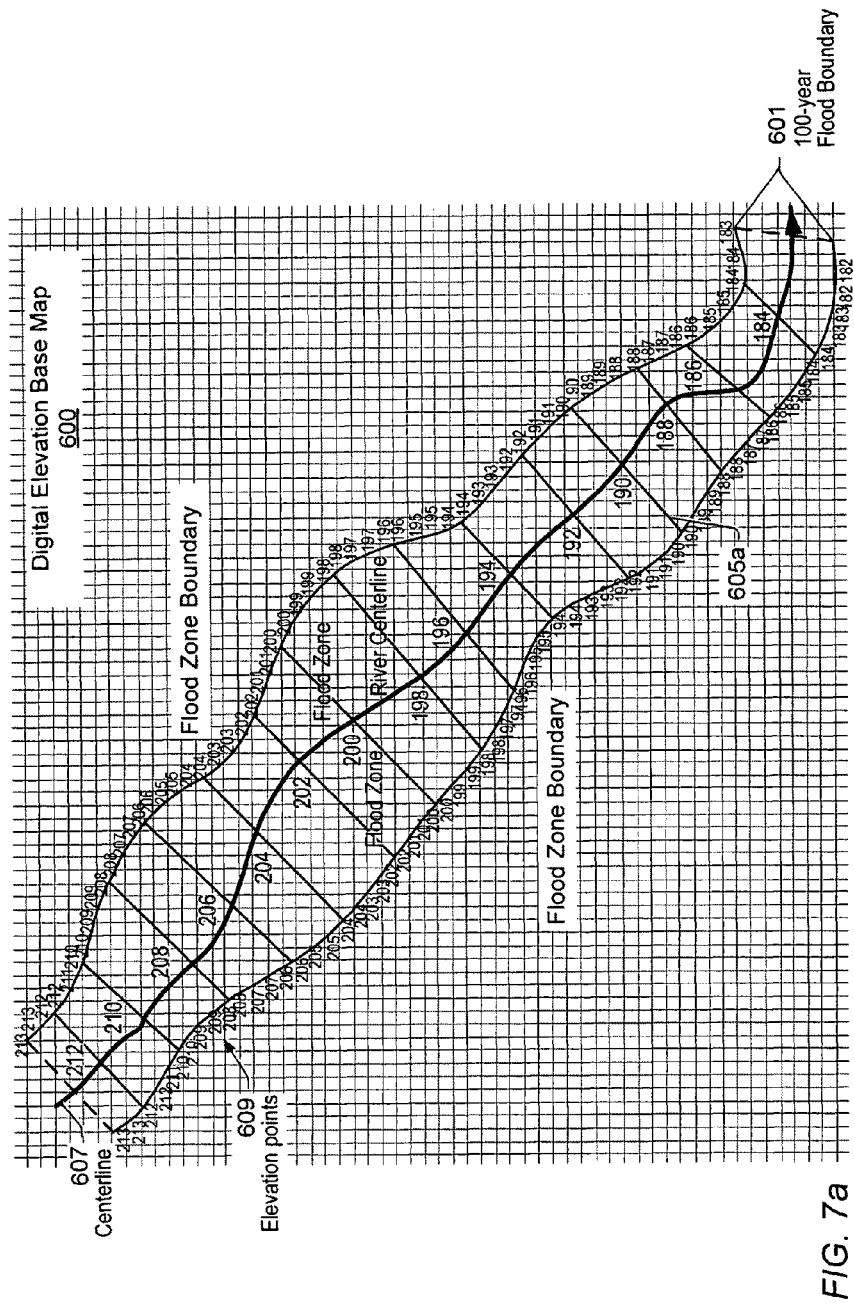
FIG. 7a illustrates a digital elevation base map with a river centerline and a 100-year flood boundary with flood elevation lines and elevation labels.

In various embodiments, the data for points 311a and 311b may be derived from flood elevation lines on flood maps from various datasets. For example, FIG. 7a illustrates a digital elevation base map 600 (which may have a resolution of 10 m (other resolutions are also contemplated)) with a river centerline 607, 100-year flood boundary 601 with flood elevation lines 605 (e.g., flood elevation line 605a) and elevation labels 609. The flood elevation lines 605 may be drawn by connecting points of similar elevations on the flood zone boundaries. For example, flood elevation line 605a is drawn connecting 190 ft elevations on the 100-year flood boundary 601. This may be drawn manually by physically drawing the lines or drawing the lines manually using a computer, or may be done automatically (e.g., software implemented). In some embodiments, the line may not actually be drawn, but instead data associated with the lines may be stored (e.g., in a database). In some embodiments, the elevations at the flood zone boundary may be labeled to assist in the flood elevation line 605 formation.

Figure 7B:
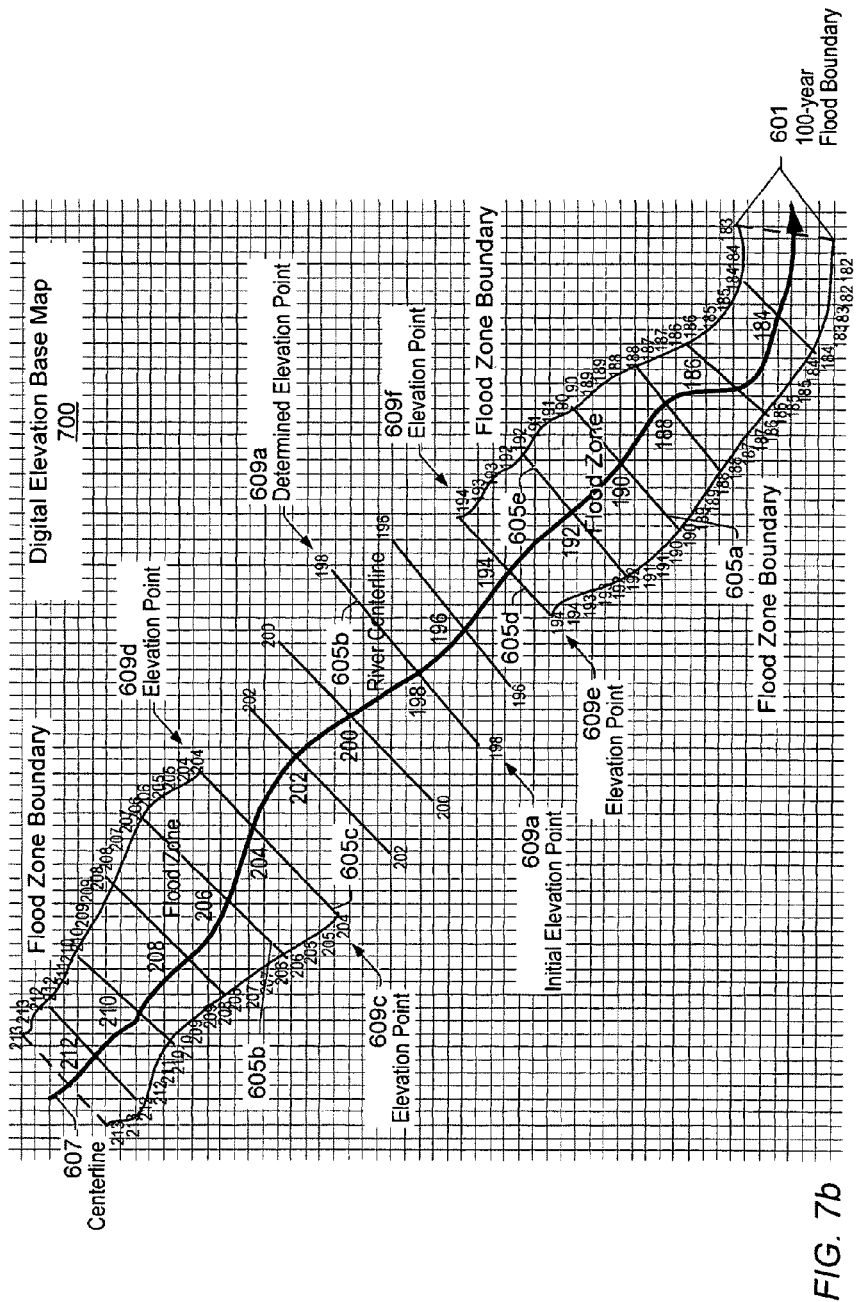
FIG. 7b illustrates an embodiment of a map used to determine missing flood elevation lines between pre-existing flood elevation lines.

As seen in FIG. 7b, in some embodiments, several flood elevation lines and/or portions of the 100-year flood boundary 601 (or other corresponding flood boundary) may be missing. In some embodiments, these data gaps in the flood risk zoning datasets may be filled (e.g., to build national coverage of flood elevation lines). Gaps may include data gaps between adjacent communities, large gaps between upstream communities and downstream communities, and no data areas. In some embodiments, the missing flood elevation lines and/or flood boundary may be created/redefined to assist in determination of the two points of flood frequency versus flood elevation for a property point (e.g., a property point in the region of missing flood elevation lines and/or flood boundary). In some embodiments, existing flood elevation lines (e.g., flood elevation lines 605b-e) on flood map 700 may be used to guide the orientation and/or size of the missing flood elevation lines (e.g., flood elevation line 605f). In addition, the last known upstream elevation points 609c,d of the 100-year flood boundary 601 and the first known downstream elevation points 609e,f of the 100-year flood boundary 601 may be used to determine the approximate initial elevation points for the missing flood elevation lines. For example, elevation point 609c may be 204 ft and elevation point 609e may be 194 ft. The placement of missing flood elevation lines may be based on the general slope of the flood profile in from upstream or downstream areas where HH studies exist. Initial elevation points every 2 ft between these two points could be used (e.g., elevation points at 202 ft, 200 ft, 198 ft, 196 ft) for the missing elevations needed for the missing flood elevation lines. Other elevation intervals may also be used. In some embodiments, a flood map may be overlaid (e.g., geographically aligned using one or more similar geographic features or coordinates between the two maps) on an elevation map (e.g., a digital elevation map). In some embodiments, the flood map and the elevation map may be digital maps. In some embodiments, overlaying the maps may include aligning digital coordinates of the maps (e.g., on graphical maps and/or respective data sets). In some embodiments, drawing, connecting, moving, adjusting points/lines on the digital maps may include drawing, connecting, moving, adjusting points/lines on one or both the digital elevation map and flood map. The placements of the indicated elevations (e.g., elevation points 202 ft, 200 ft, 198 ft, 196 ft) on both sides of the centerline 607 may be, for example, highlighted and connected (e.g., flood elevation line 605f may be drawn connecting elevation points 198 ft on either side of the centerline 607). The slope and size of existing flood elevation lines (e.g., flood elevation lines 605c and 605d) may be used to search for corresponding elevation points on opposing sides of the centerline 607 to connect. For example, an area approximately the length of flood elevation line 605c away from (and at a slope of 605c) the initial elevation point 609a may be searched for a similar elevation point (e.g., elevation point 609b) for creating the missing flood elevation line 605f. This may be helpful especially if there are several similar elevation points on the opposing side of the centerline 607.

In some embodiments, the slope and length of a temporary line used to search for a matching elevation point may be determined based on a weighted average of the length and slope of flood elevation line 605c and 605d. For example, the closer the initial elevation point 609a is to flood elevation line 605c, the more a temporary line may resemble the flood elevation line 605c in length and slope. In some embodiments, a length of the temporary line (length_temp) may be determined as follows (with distance to flood elevation line 605c=dist605c; distance to flood elevation line 605d=dist605d; length of flood elevation line 605d=length605d; and length of flood elevation line 605c=length605c):

$$\text{length\_temp} = \frac{dist605c}{dist605c + dist605d} * length605d + \frac{dist605d}{dist605c + dist605d} * length605c$$

The distance between the point and the flood elevation line may equal the shortest distance between the initial elevation point 609a and the flood elevation line. Other distances are also contemplated. In some embodiments, the slope of the temporary line (slope_temp) may be determined as follows (with slope of flood elevation line 605c=slope605c and slope of flood elevation line 605d=slope605d):

$$\text{slope\_temp} = \frac{dist605c}{dist605c + dist605d} * slope605d + \frac{dist605d}{dist605c + dist605d} * slope605c$$

Other methods of determining ratios for slopes and/or lengths are also possible. The temporary line may be drawn using the calculated slope and length. The elevation points on the other side of the flood elevation line may then be searched for an elevation point approximately the same as the initial elevation point 609a. The flood elevation line 605f from the initial elevation point 609a to the determined elevation point 609b may then replace the temporary line. The flood elevation line 605f may be assigned an elevation approximately equal to the average of the initial elevation point 609a and the determined elevation point 609b.

In some embodiments, (e.g., at the 100 year flood frequency) the placement of new BFE lines may be based on a general slope (e.g., based on hydraulic principles) between upstream BFEs, downstream BFEs, and the elevation data. For example:

Slope=(Upstream BFE−Downstream BFE)/Distance between the two BFE lines

Figure 37:
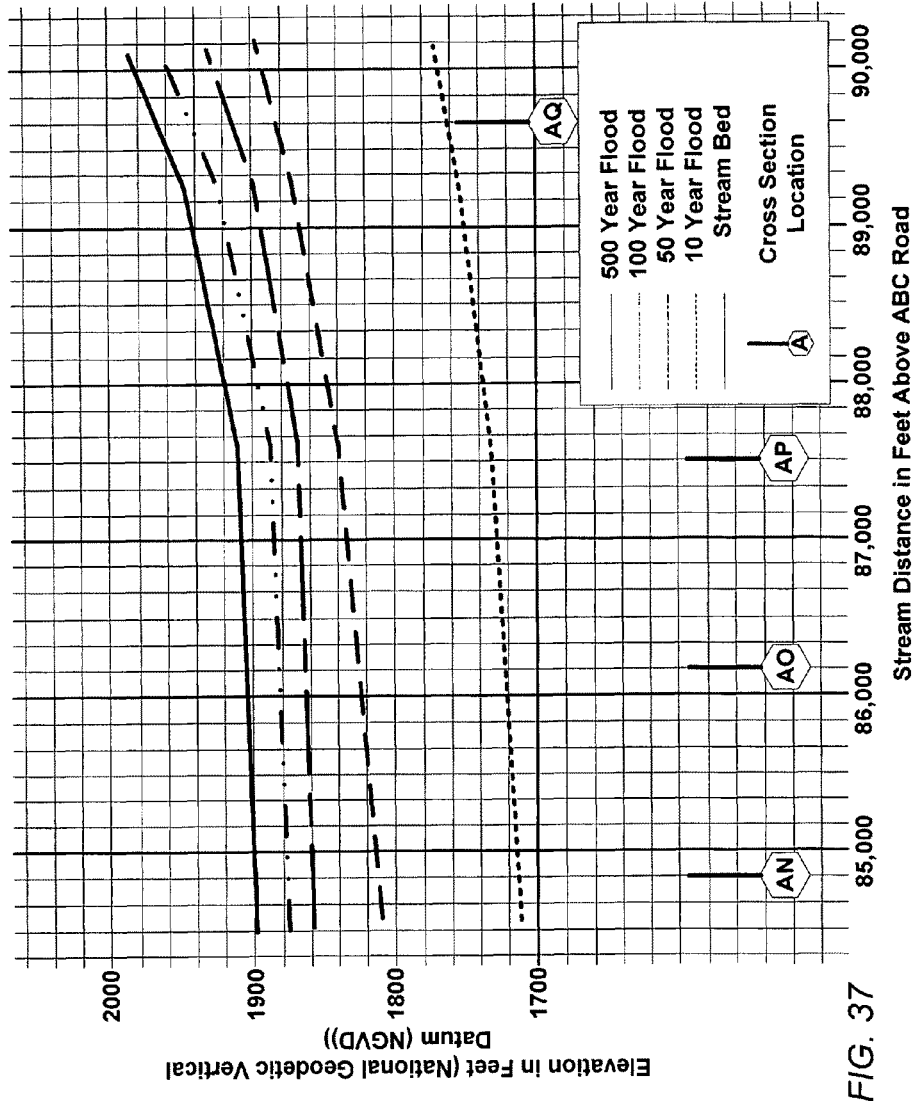
FIG. 37 illustrates an embodiment of a flood water surface profile.

In some embodiments, if the location is known upstream and downstream and the 500 year water surface elevations are available, the placement of new 500 year water elevation line features may be based on a general slope (e.g., based on hydraulic principles) between the known upstream and downstream water surface elevation locations and the elevation data. For example:

Slope=(Upstream Water Surface Elevation−Downstream Water Surface Elevation)/Distance between two known surface elevation locations If the 500 year slope is not available, the 100 year flood profile slope may be used (e.g., see FIG. 37). Example elevation profiles (e.g., from FEMA studies) among different flood frequencies may be presented to show how the water surface may be extrapolated between two known points.

Figure 8A:
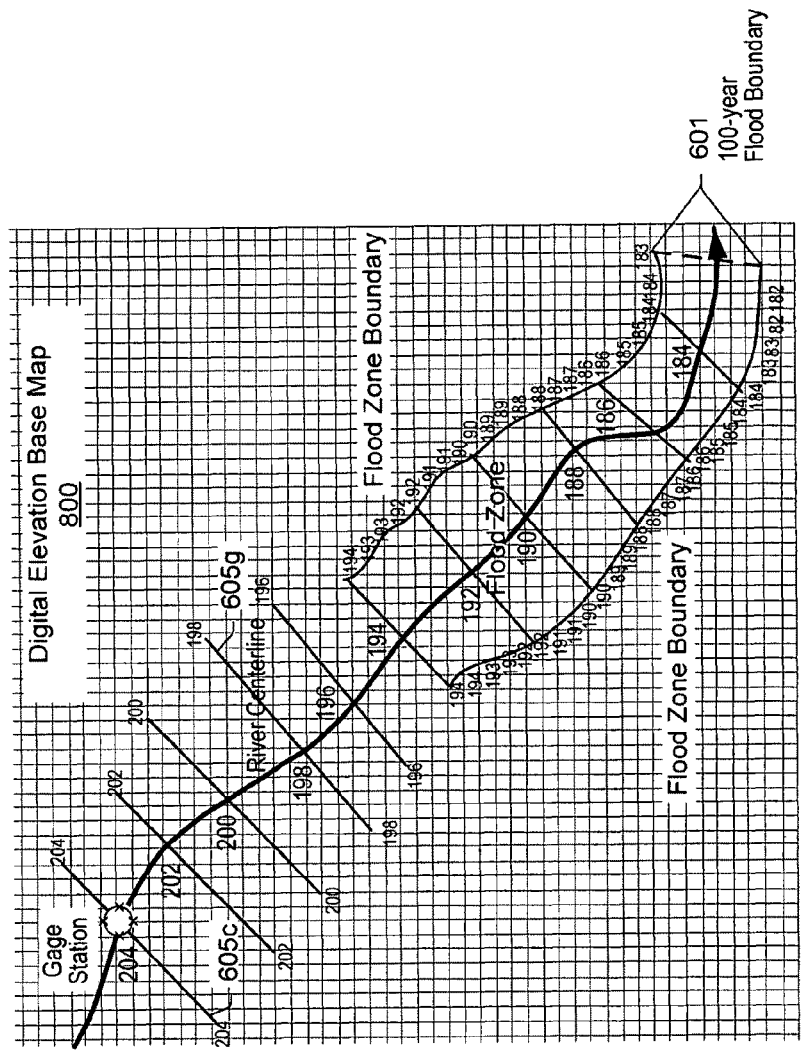

As seen in FIG. 8a, in some embodiments, if the flood zone boundary and/or the flood elevation lines are not available for an area, United States Geological Survey (USGS) gage station data may be used to chart and analyze stream discharge records, build the flood frequency versus discharge curve, build the discharge versus stage curve, and derive the flood frequency versus stage relationship. For example, data from gage station 801 is charted in FIG. 8b. Flood event 1 may have been an actual flood recorded at gage station 801. Flood event 1 may have corresponded to a flood elevation of 124.5 ft. By looking at the flood data for the gage station over time, an annual probability of occurrence (i.e., probability that a similar flood of similar elevation will occur in a given year) and a corresponding flood frequency (i.e., probability a flood elevation will exceed the flood elevation in a given year) may be developed for the flood events. This data may be used with elevation data (e.g., in flood map 800) in a statistical and hydrologic analysis to predict the flood elevations (e.g., 100-year and/or 500-year flood elevations) for various flood boundaries (e.g., the 100-year flood boundary 601 and/or the 500-year flood boundary.) This data may also be used to provide flood boundaries (e.g., the 100-year flood boundary and/or 500-year flood boundary). In some embodiments, discharge rates could be determined to assist in the hydrologic and hydraulic analysis. In addition, other data (e.g., downstream flood zone boundaries) may also be used in the analysis to predict the missing flood elevation lines (e.g., flood elevation line 605g). In some embodiments, other model data (e.g., FEMA HAZUS-MH (Hazards US Multi-Hazards, Watershed Information System (WISE), Hydrologic Engineering Center River Analysis System (HEC-RAS)) flood model data with DEM (Digital Elevation Model)) (e.g., with a resolution of 10 m) may also be used. Other resolutions may also be used. In some embodiments, a high resolution DEM may be used (e.g., a high resolution digital elevation map).

Figure 9:
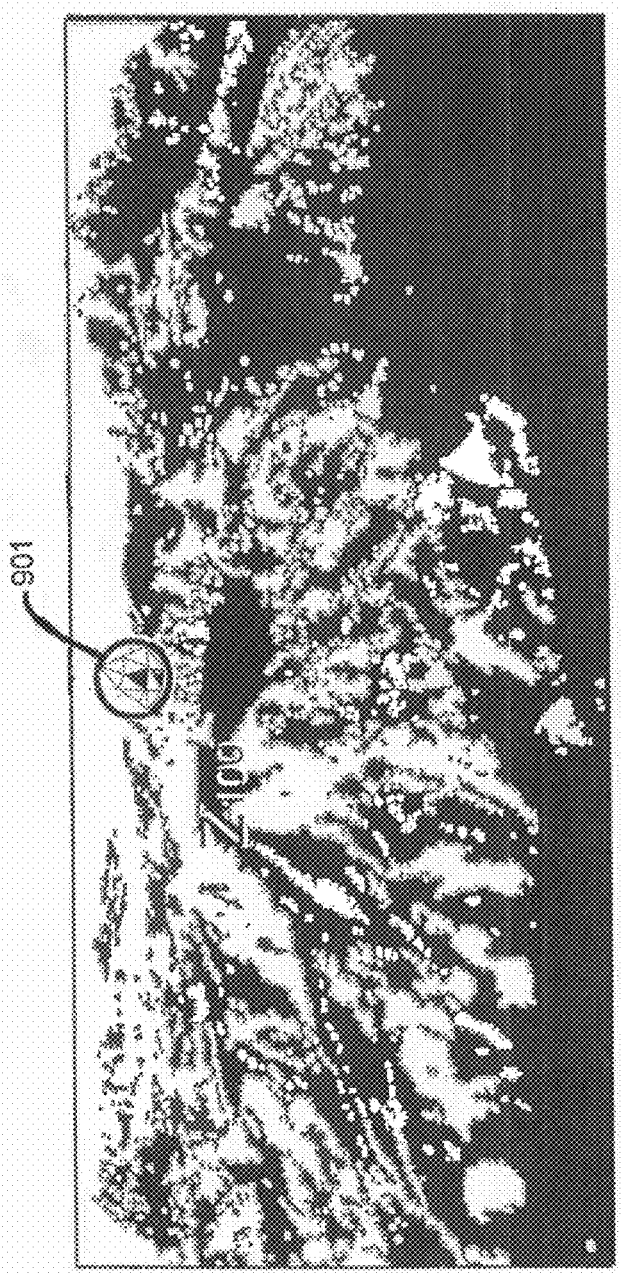
FIG. 9 illustrates an embodiment of using raster images to calculate raster surfaces for 100-year and 500-year flood elevations by Triangulated Irregular Network (TIN) methods using flood elevation line features.

FIG. 9 illustrates an embodiment of using raster images to calculate raster layers for 100-year and 500-year flood elevations. For example, GIS software may use surface analysis and modeling capabilities to create extrapolated surfaces based on attribute values at points and flood elevation lines. In some embodiments, these raster layers may be used to determine flood elevations for points on the flood frequency versus flood elevation curve.

In some embodiments, to create raster layers for 100-year flood elevations, the flood elevation lines and associated flood elevation values may be used as input for a surface model (such as a TIN surface) to create a raster surface 901 for 100-year flood elevations. In some embodiments, for the areas without the 100-year flood elevation lines, but with 100-year flood boundaries, the 100-year flood boundaries may be overlaid on top of the digital elevation data (e.g., overlaid on the digital elevation map), and points on the 100-year flood boundary lines (e.g., the point elevations) from the digital elevation data may be used as inputs for the surface model to create the raster surface 901 for the 100-year flood elevations. For example, points on the 100-year flood boundary lines may be connected to form the raster surface 901. Other raster surfaces are also contemplated.

In some embodiments, if both 100-year flood elevation lines and flood boundaries are missing for an area, USGS gage data may be used along with an HH study or USGS national flood frequency curves (NFF) to obtain 100-year flood elevations at a location or area. This data may be combined with known 100-year flood elevations (e.g., downstream or upstream) and used as input for the surface model to create the raster surface 901 for 100-year flood elevations.

In some embodiments, for areas with 500-year flood boundaries, the 500-year flood boundaries may be overlaid on top of the digital elevation data and the elevations of the points along the 500-year flood boundary lines may be used as input for a surface model to create the raster surface 901 for 500-year flood elevations.

In some embodiments, for areas without the 500-year flood boundaries, USGS gage data may be used with hydrologic analysis or USGS national flood frequency curves (NFF) to obtain 500-year flood elevation at areas to combine with known 500-year flood elevations (e.g., downstream or upstream) as input for a surface model to create the raster surface 901 for 500-year flood elevations.

In some embodiments, these raster surfaces may be queried to determine sets of flood elevations versus flood frequencies for a property point (e.g., an address). These sets may be used in the distribution to determine the curve for the flood frequency versus flood elevation for the property point.

In various embodiments, once the flood elevations lines are available near an property point, these flood elevations may be used to interpolate/extrapolate at least two flood frequency/flood elevation points for the distribution. Several methods of interpolating/extrapolating these points are described herein.

Figure 10:
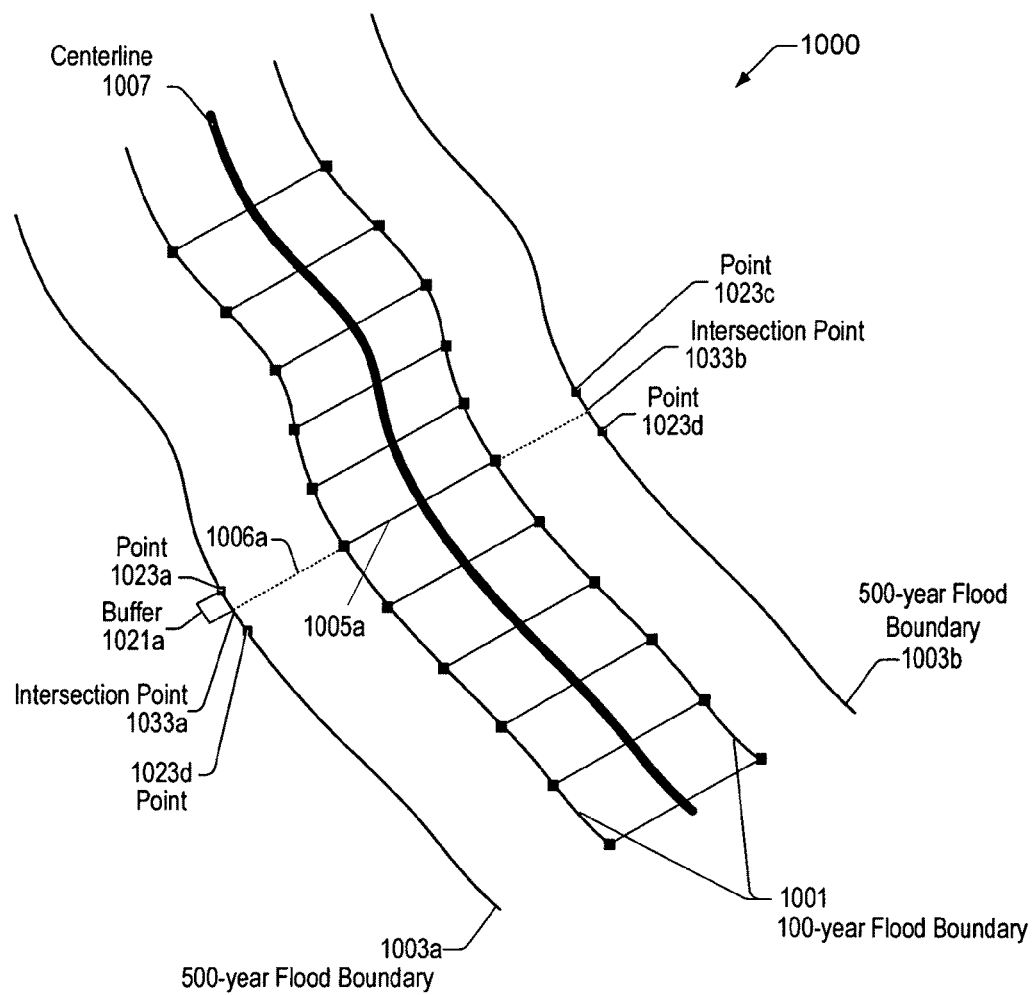
FIG. 10 illustrates an embodiment of extending flood elevation lines using existing flood elevation lines.

FIG. 10 illustrates an embodiment of a map 1000 for extending new flood elevation lines using existing flood elevation lines (e.g., BFEs). In some embodiments, flood elevation lines 1005 (e.g., flood elevation line 1005a (a BFE) on 100-year flood boundary 1001 around centerline 1007) may be extended (e.g., along their slope) to the 500-year flood boundary 1003 (e.g., extended flood elevation line 1006a indicated with a dashed line). In some embodiments, the intersection 1033a of the extended flood elevation line may be buffered (e.g., buffer 1021a 10 ft on either side of the intersection point 1033a for a DEM map (e.g., with a resolution of 10 m)) upstream and downstream at the 500-year flood boundary 1003. The elevation points between the buffered points 1023a and 1023b may be compared with the elevation points between the buffered points 1023c and 1023d (resulting from a buffer around intersection point 1033b). In some embodiments, an elevation point at each end (e.g., with the smallest difference) may be selected as the endpoints of the extended flood elevation line 1006*a* at the 500-year flood boundary 1003. The average of the selected elevation points may be assigned to the new flood elevation line 1006. In some embodiments, the buffer amount may be based on the resolution of the digital elevation map. In some embodiments, buffers may not be used and the new flood elevation line 1006 may be assigned an average approximately equal to the two intersection points 1033*a,b*.

Figure 11:
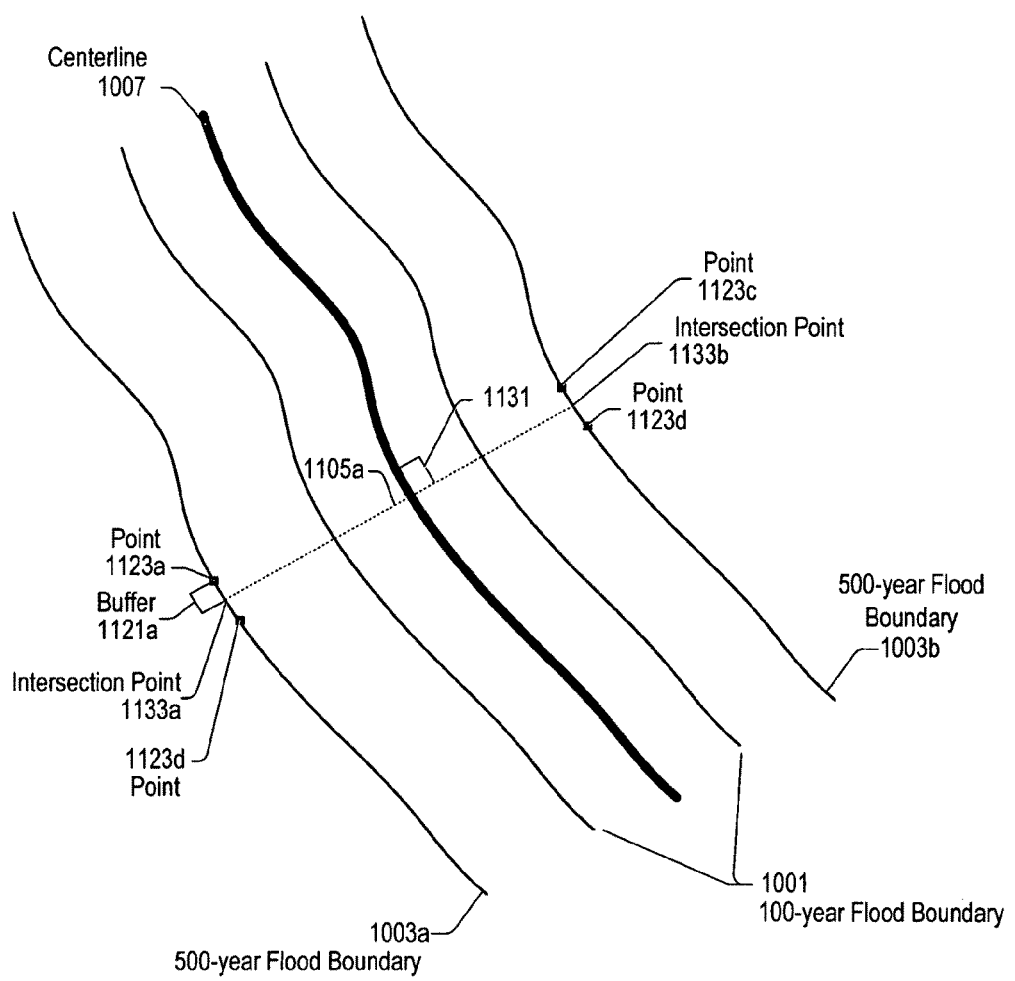
FIG. 11 illustrates an embodiment of forming a flood elevation line using a flood source line feature.

FIG. 11 illustrates an embodiment of forming a flood elevation line using a flood source line feature (e.g., a centerline). In some embodiments, flood elevation line 1105*a* may be drawn substantially perpendicular to the centerline 1007 (i.e., at a right angle 1131 to the centerline 1007 at a point on the centerline 1007). In some embodiments, the intersections 1133*a,b* of the drawn flood elevation line 1105*a* may be buffered in a similar manner as described above with respect to FIG. 10 to derive adjusted endpoints for the flood elevation line 1105*a* (e.g., by applying buffer 1121*a* to the intersections 1133*a,b* to get buffered points 1123*a-d*, selecting approximately equivalent elevation points on either end, and connecting the selected elevation points to reform the flood elevation line 1105*a*). In some embodiments, the ends of flood elevation line 1105*a* may not be buffered (e.g., the elevations at the intersections 1133*a,b* may be used as the endpoints of the flood elevation line 1105*a* without adjustment (the flood elevation line 1105*a* may be assigned a value approximately equal to the average of the two intersected points 1133*a,b*)). In some embodiments, the flood elevation line may be intersected with flood boundaries (e.g., the 100 year and/or 500 year flood boundaries). The elevation (e.g., from a DEM reading) of the intersection points (e.g., on the property point side of the centerline 1007) may be used to move the endpoints on the opposite side of the centerline to points of similar elevation (e.g., points collinear with the flood elevation line). The flood elevation line may then be provided with endpoints of matching elevation. In some embodiments, moving an endpoint may include moving a digital point on a digital map (e.g., a digital flood map or digital elevation map).

Figure 12:
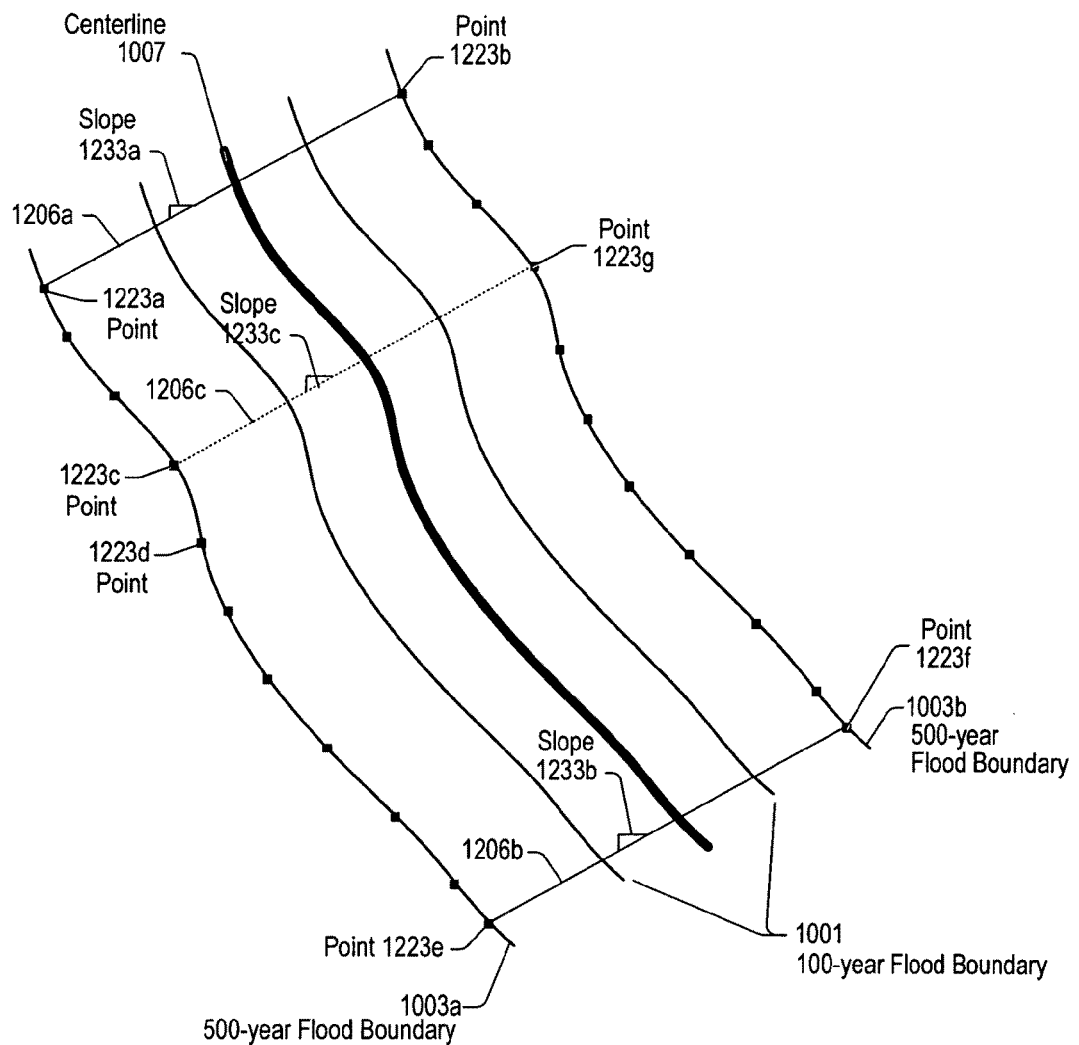
FIG. 12 illustrates an embodiment of forming flood elevation lines using two pre-established flood elevation lines.

FIG. 12 illustrates an embodiment of a map for forming flood elevation lines using pre-established flood elevation lines. In some embodiments, a user may choose points 1223*a* and 1223*b* on either side of centerline 1007 to form flood elevation line 1206*a*. The user may carefully choose these points (e.g., guided by elevations and/or other map details) to define an accurate flood elevation line 1206*a*. In some embodiments, a computer may determine these points. In some embodiments, a flood elevation line 1206*b* may be similarly defined (e.g., by selecting points 1223*e,f*). Using the two defined flood elevation lines 1206*a,b*, additional flood elevation lines may be formed between them using the slope and/or lengths of the flood elevation lines 1206*a,b* and the elevation values corresponding to the 500-year flood boundary 1003 (or other flood boundary such as the 100-year flood boundary 1001). Points (e.g., points 1223*c,d*) may be selected at intervals along one side of the flood boundary (e.g., along the left side of the 500-year flood boundary 1003). Slopes and/or lengths of the missing flood elevation lines between the pre-established flood elevation lines 1206*a,b* may be estimated using the slopes and/or lengths of the pre-established flood elevation lines 1206*a,b* (e.g., by weighting an average of the slopes and/or lengths of the pre-established flood elevation lines 1206*a,b* according to, for example, a distance of the flood elevation line to be drawn from the pre-established flood elevation lines 1206*a,b*.) For example, flood elevation lines closer to flood elevation line 1206*a* may have a slope similar to slope 1233*a* and flood elevation lines closer to flood elevation line 1206*b* may have a slope similar to slope 1233*b*. Using the estimated slope (e.g., slope 1233*c*), a corresponding location on the opposing flood boundary may be determined. A point 1223*g* of similar elevation as the initial point (e.g., initial point 1223*c*) may be determined (e.g., using the buffer technique described above with respect to FIG. 10). In some embodiments, the closest similar elevation point may be used. A flood elevation line (e.g., flood elevation line 1206*c*) may be drawn between the determined points and an average elevation (e.g., average of the two opposing points) may be assigned to the flood elevation line 1206*c*.

In some embodiments, the slope and length of a temporary line used to search for a matching elevation point may be determined based on a weighted average of the length and slope of flood elevation line 1206*a,b*. For example, the closer the initial elevation point 1223*c* is to flood elevation line 1206*a*, the more a temporary line may resemble the flood elevation line 1206*a* in length and slope.

In some embodiments, a length of the temporary line (length_temp) may be determined as follows (with distance to flood elevation line 1206*a*=dist1206*a*; distance to flood elevation line 1206*b*=dist1206*b*; length of flood elevation line 1206*a*=length1206*a*; and length of flood elevation line 1206*b*=length1206*b*):

$$\text{length\_temp} = \frac{dist1206a}{dist1206a + dist1206b} * length1206b + \frac{dist1206b}{dist1206a + dist1206b} * length1206a$$

The distance between the point and the flood elevation line may equal the shortest distance between the initial elevation point 1223*c* and the flood elevation line. Other distances are also contemplated.

In some embodiments, the slope of the temporary line (slope_temp) may be determined as follows (with slope of flood elevation line 1206*a*=slope 1206*a* and slope of flood elevation line 1206*b*=slope1206*b*):

$$\text{slope\_temp} = \frac{dist1206a}{dist1206a + dist1206b} * slope1206b + \frac{dist1206b}{dist1206a + dist1206b} * slope1206a$$

Other methods of determining ratios for slopes and/or lengths are also possible. The temporary line may be drawn using the calculated slope and length. The elevation points on the other side of the flood elevation line may then be searched for an elevation point approximately the same as the initial elevation point 1223*c*. The flood elevation line 1206*c* from the initial elevation point 1223*c* to the determined elevation point 1223*g* may then replace the temporary line. The flood elevation line 1206*c* may be assigned an elevation approximately equal to the average of the initial elevation point 1223*c* and the determined elevation point 1223*g*.

In some embodiments, other flood elevation line creation methods may be used. In some embodiments, combinations of the methods described herein may be used.

Figure 13:
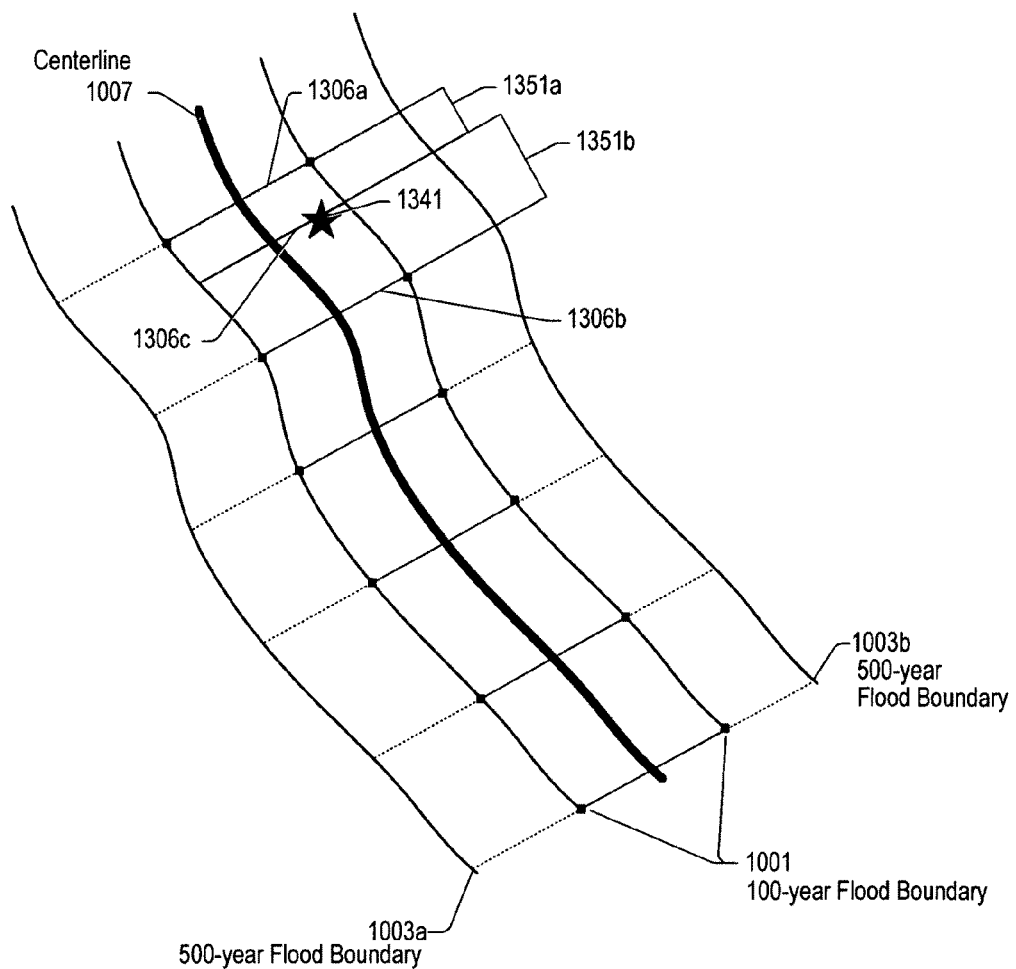
FIG. 13 illustrates an embodiment of approximating a flood elevation line for a point between two flood elevation lines for 100-year flood boundaries.

FIG. 13 illustrates an embodiment of approximating a flood elevation for a point 1341 between two flood elevation lines (e.g., BFE lines 1306*a,b*) for the 100-year flood boundaries 1001. The property point 1341 may be a specific property, a geocoded point location, or a point of interest (POI). In some embodiments, a substantially perpendicular line 1306*c* may be formed, on the digital elevation map, between the property point 1341 and a flood source line feature (e.g., centerline 1007) of a flood source in a same catchment area as the property point 1341. To calculate the flood elevation for the point 1341 between two BFE lines 1306*a,b*, distances 1351*a,b* may be calculated between the BFEs 1306*a,b* and the substantially perpendicular line 1306*c*. In some embodiments, distances 1351*a,b* may be calculated between the BFEs 1306*a,b* and the point 1341 (e.g., a shortest distance between the point 1341 and the BFE or a distance along a line on a right angle to the BFE and through the point 1341). In some embodiments, based on the distances 1351*a,b*, an elevation between the two BFEs 1306*a,b* may be extrapolated for the point 1341. For example, if BFE 1306*a* is 200 ft, BFE 1306*b* is 210 ft, distance 1351*a* (dist1351*a*) is 100 ft and distance 1351*b* (dist1351*b*) is 200 ft (totaldist=300 ft), the BFE for 1341 may be calculated as follows:

$$BFE = \frac{dist1351b}{totaldist} * BFE1306a + \frac{dist1351a}{totaldist} * BFE1306b$$

$$BFE = \frac{200}{300} * 200 \text{ ft} + \frac{100}{300} * 210 \text{ ft} = 133.33 \text{ ft} + 70 \text{ ft} = 203.33 \text{ ft}$$

Therefore, the BFE 1306*c* may be 203.33 ft (which may be rounded to 203 ft). Other methods of calculating a weighted average for the BFE 1306*c* for point 1341 are also contemplated. In some embodiments, at least two points of flood frequency versus flood elevation for the property point may be calculated by determining the flood elevation for the point at two flood frequencies (e.g., by approximating a flood elevation for the property point between two flood elevation lines for the 100 year flood zone and two flood elevation lines for the 500 year flood zone). In some embodiments, the substantially perpendicular line 1306*c* may be a substantially perpendicular cross section through the property point.

Figure 14:
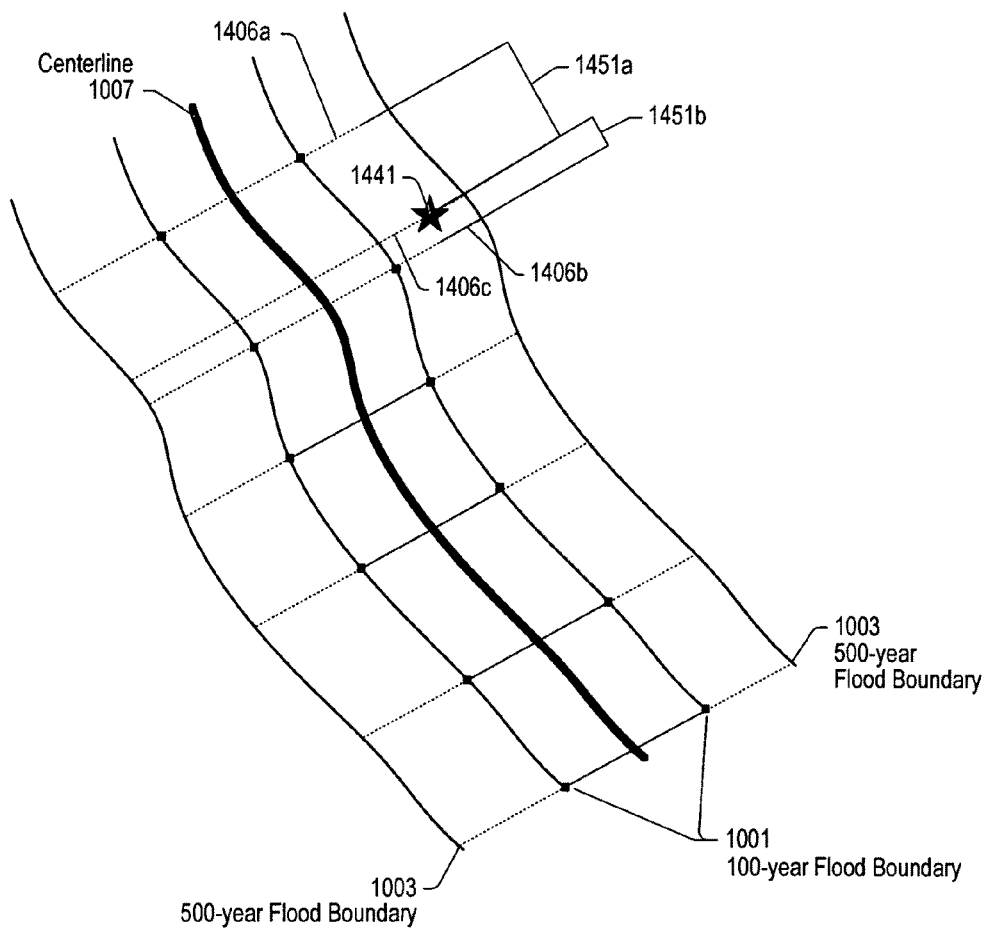
FIG. 14 illustrates an embodiment of approximating a flood elevation line for a point between two flood elevation lines for the 500-year flood boundaries.

FIG. 14 illustrates an embodiment of approximating a flood elevation line for a property point 1441 between two flood elevation lines (e.g., flood elevation lines 1406*a,b*) for the 500-year flood boundaries 1003. In some embodiments, a substantially perpendicular line 1406*c* may be formed, on the digital elevation map, between the property point 1441 and a flood source line feature (e.g., centerline 1007) of a flood source in a same catchment area as the property point 1441. To calculate the flood elevation line for a property point 1441 between two flood elevation lines 1406*a,b*, distances 1451*a,b* may be calculated between the flood elevation lines 1406*a,b* and the substantially perpendicular line 1406*c*. In some embodiments, distances 1451*a,b* may be calculated between the flood elevation lines 1406*a,b* and the property point 1441. In some embodiments, based on the distances 1451*a,b*, an elevation between the two flood elevation lines 1406*a,b* may be extrapolated for the property point 1441. For example, if flood elevation line 1406*a* (FE_1406*a*) is 240 ft, flood elevation line 1406*b* (FE_1406*b*) is 250 ft, distance 1451*a* (dist1451*a*) is 250 ft and distance 1451*b* (dist1451*b*) is 50 ft (totaldist=300 ft), the flood elevation for 1441 (FE 1441) may be calculated as follows:

$$FE\_1441 = \frac{dist1451b}{totaldist} * FE\_1406a + \frac{dist1451a}{totaldist} * FE\_1406b$$

$$FE\_1441 = \frac{50}{300} * 240 \text{ ft} + \frac{250}{300} * 250 \text{ ft} = 40 \text{ ft} + 208.33 \text{ ft} = 248.33 \text{ ft}$$

Therefore, the flood elevation line 1406*c* may be 248.33 ft (which may be rounded to 248 m). Other methods of calculating a weighted average for the flood elevation line 1406*c* are also contemplated. In some embodiments, flood elevation line 1406*c* may be formed as a substantially perpendicular line 1306*c* or a substantially perpendicular cross section through the property point 1441.

Figure 15:
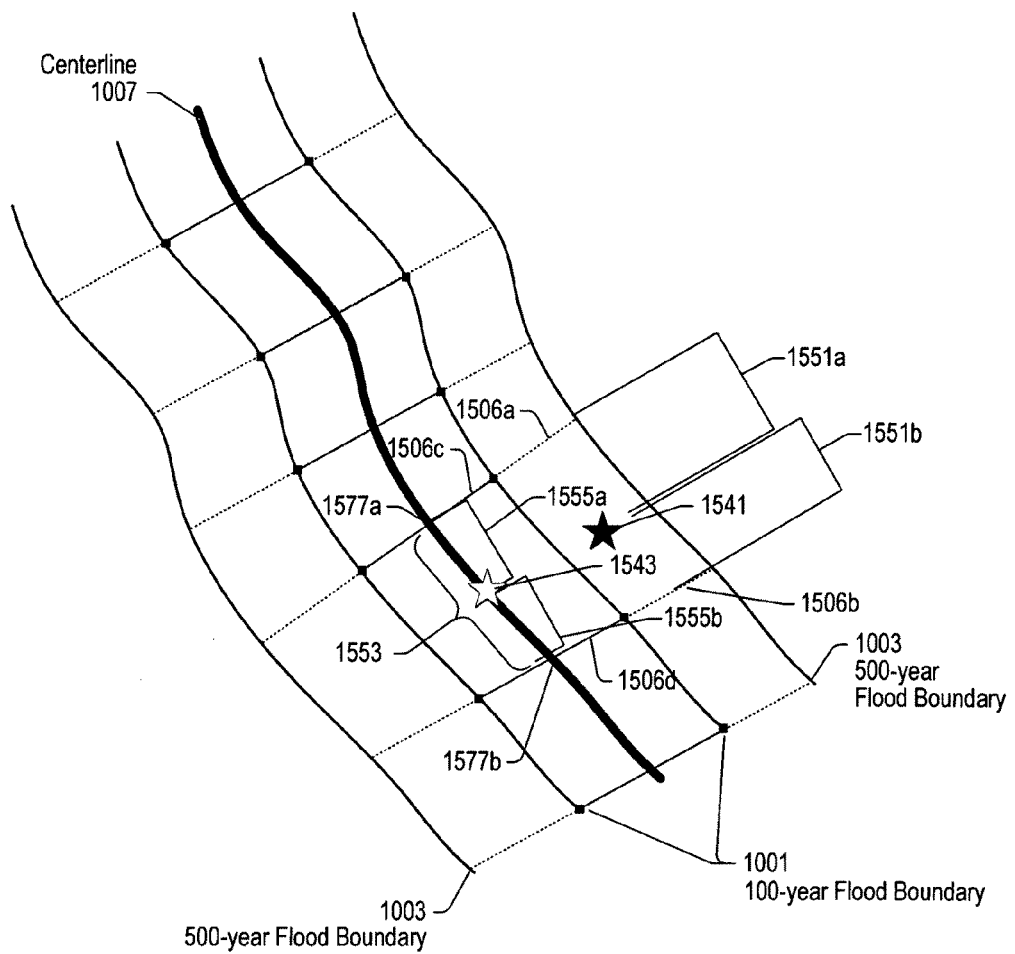
FIG. 15 illustrates another embodiment for calculating a flood elevation line for a point between two flood elevation lines.

FIG. 15 illustrates another embodiment for calculating a flood elevation line for a property point between two flood elevation lines. In some embodiments, distances 1551*a* and 1551*b* between property point 1541 and the nearest flood elevation lines (e.g., flood elevation lines 1506*a,b*). The property point 1541 may be a specific property, a geocoded point location, or a point of interest (POI). Distances 1551*a* and 1551*b* may be used to place a dummy point 1543 between the 100-year flood boundary flood elevation lines on the centerline 1007. If the centerline 1007 does not exist, a dummy point may be placed between the two middle points 1577*a,b* of the flood elevation lines 1506*a,b*. Other locations for the dummy point are also contemplated. Distances 1551*a,b* may be the shortest distance between the property point 1541 and the nearest point on the flood elevation lines 1506*a,b* or a distance along a line on a right angle to the flood elevation lines 1506*a,b* and through the property point 1541. A ratio of the relative distances may be used to place the dummy point 1543.

For example (distance to 1551*a*=dist1551*a*; distance to 1551*b*=dist1551*b*; distance to 1555*a*=dist1555*a*; total distance between 1577*a* and 1577*b*=tot_dist1553; and distance to 1555*b*=dist1555*b*):

$$dist1555a = \frac{dist1551a}{dist1551a + dist1551b} * tot\_dist1553$$

$$dist1555b = \frac{dist1551b}{dist1551a + dist1551b} * tot\_dist1553$$

The 100-year flood elevation line for the dummy point 1543 may then be calculated using the nearest flood elevation lines for the 100-year flood boundary 1001 using the method as seen in FIG. 13. This 100-year flood boundary flood elevation line may then be used for the property point 1541.

Figure 16:
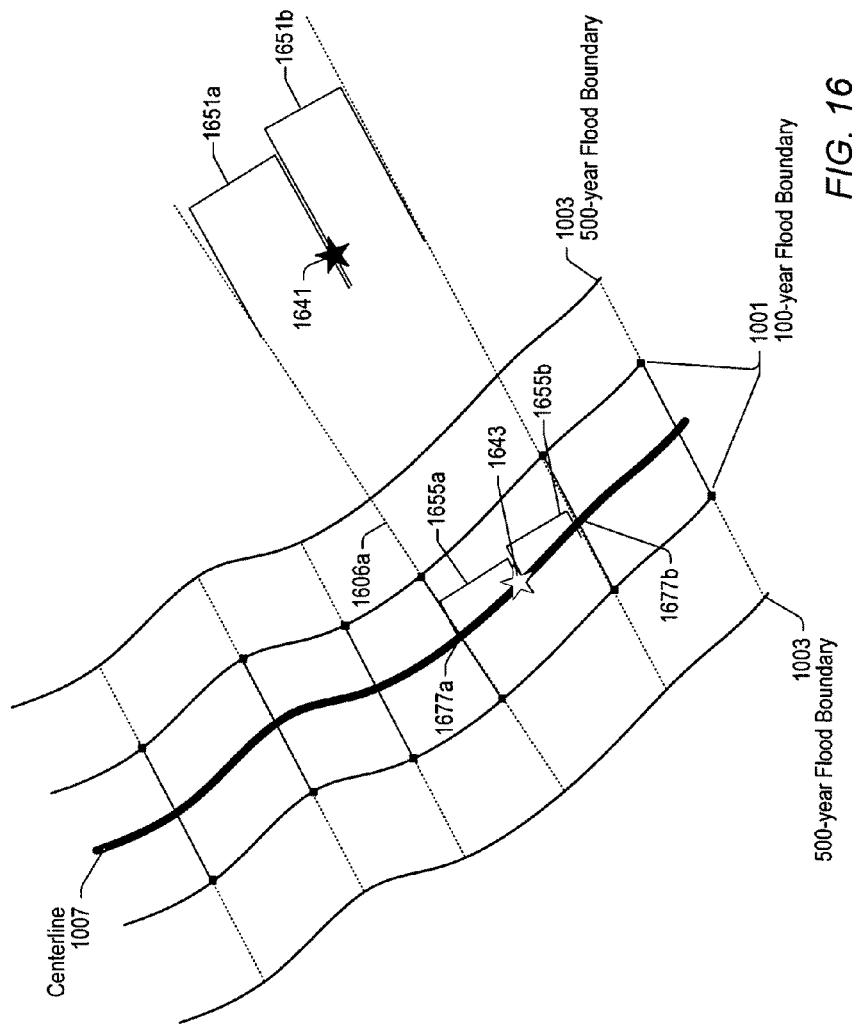
FIG. 16 illustrates an embodiment of determining a flood elevation line for a point outside of the 500-year flood boundary.

FIG. 16 illustrates an embodiment of determining a flood elevation line for a property point outside of the 500-year flood boundary 1003. In some embodiments, the nearest flood elevation lines (e.g., flood elevation lines 1606*a,b*) may be extended past the property point 1641 by extending their lines along the directions of the respective lines. The nearest distances 1651*a,b* to each extended flood elevation line may be calculated (e.g., a shortest distance between the property point 1641 and the flood elevation line or a distance along a line on a right angle to the flood elevation line and through the property point 1641) and used to place a dummy point 1643 on the centerline 1007 (or between the middle points 1677*a,b* of two flood elevation lines 1606*a,b*). For example, the relative distances 1655*a,b* may be calculated based on the distances 1651*a,b*. The 100-year flood boundary flood elevation line for the dummy point 1643 may then be calculated using the nearest flood elevation lines for the 100-year flood boundary 1001 using the method as seen in FIG. 13. This 100-year flood boundary flood elevation line may then be used for the property point 1641.

In some embodiments, substantially seamless national coverage (and/or global coverage) for 100-year and 500-year flood elevation lines (and/or other flood elevation frequencies) and flood boundaries may be determined using the methods described herein. The flood frequency versus flood loss curve may be derived based on the computed flood frequency versus flood elevation curve, digital elevation datasets, and/or collected damage curves at a property point, a geocoded point or a point of interest (POI). In some embodiments, triangulated irregular network (TIN) surfaces may be created using the determined flood elevation lines and flood zone boundaries. The TIN surfaces may then be recomputed when FEMA DFIRM datasets are updated.

In some embodiments, once a flood elevation line is established for a property point, the 100-year flood elevation line and 500-year flood elevation line for the property point (or elevations of the flood at other flood frequency marks) may be used as points on a flood frequency versus flood elevation curve. These points may also be used with a probability distribution (e.g., the Log Pearson Type III distribution, the Log Normal distribution, and/or the Extreme Value Type I distribution as described above) to calculate other points on the curve. Once the curve is calculated, the flood elevation at other flood frequencies may be determined (e.g., flood elevation at the 2 year, 10 year, 50 year, 100-year, 200 year, 500-year, and 1000 year).

Figure 18A:
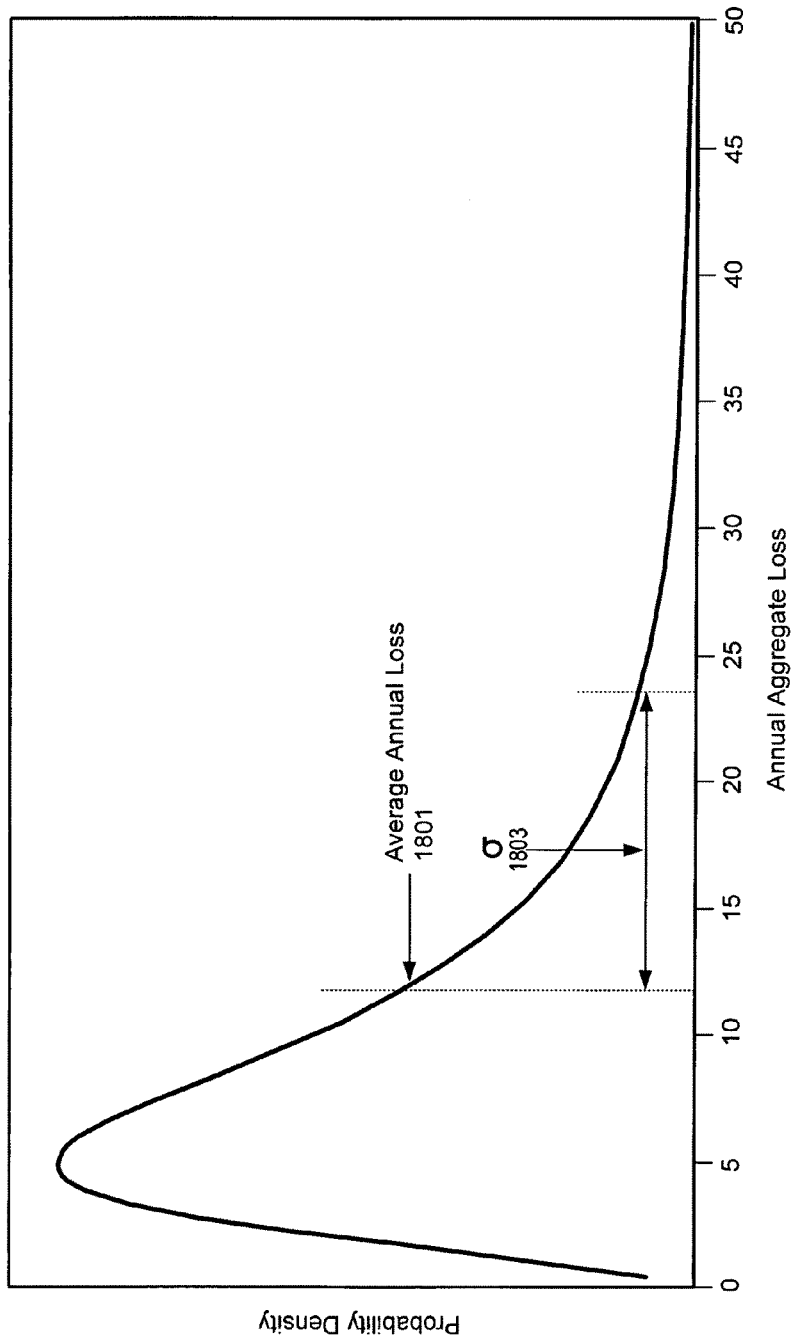
FIG. 18a illustrates an embodiment of a distribution for average annual loss.

Once the flood frequency versus flood elevation curve is calculated, a flood frequency versus damage curve may be created. Users may enter the total value of property at the property point (e.g., commercial property) and associated property characteristics (e.g., property type). A ground elevation may be determined at the property point (e.g., using the DEM data) and the latitude/longitude of the property point. The flood depths for the property point may be calculated by subtracting the ground elevation of the property point from the flood elevations during different flood frequency floods. For example:

flood elevation=flood depth−ground elevation of the property point where flood depth may equal the depth of the flood water above the ground at the property point (flood elevation may be the elevation of the flood water surface above sea level). If flood depths is negative, a 0 may be used. This data may be entered in a chart and/or plot (e.g., see FIG. 17*a*). A damage curve may also be determined or provided by a user (e.g., using the building type) (e.g., see FIG. 17*b*). Using the data from the flood frequency versus flood elevation table (FIG. 17*a*), the flood damage curve (FIG. 17*b*), and the property value, the flood frequency versus flood damage curve (FIG. 17*c*) can be calculated. For example:

Flood damage at flood frequency=total property point value*% of Damage at the related flood depth In some embodiments, this information may be used to calculate the average annual loss for the property point. For example:

average annual loss for the property point=SUM(probability that a flood event occurs*the associated loss where SUM may be a summation over several flood events. FIG. 17*d* also shows a relationship between calculated loss value and flood frequency. FIG. 18*a* illustrates an embodiment of a distribution for average annual loss and FIG. 18*b* illustrates an embodiment of a chart calculating an average annual loss. Sample average annual loss 1801 is shown as a line on the annual aggregate loss with a standard deviation 1803. The probable maximum loss may equal the maximum associated loss for the property point due to flood (e.g., $3,345,000). This may represent the largest economic loss likely to occur for a given policy or a set of policies when a catastrophic flood event occurs. For a commercial property, this may represent an estimate of the largest loss that a building or a business in the building is likely to suffer. In some embodiments, the potential premium for the property point may equal the average annual loss plus a risk load plus an expense load where the risk load may be a number representing the uncertainty of the average annual loss (e.g., risk of damage to a levee or dam, inaccuracy in the flood model, etc.). The expense load may equal the expenses of administering a flood insurance program and other fees.

In some embodiments, an adjustment rate may be calculated to adjust the average annual loss by an adjustment rate representative of other factors. For example:

adjusted average annual loss=average annual loss*(1+ adjustment rate)

In some embodiments, several different associated adjustment scores may be used to adjust the average annual loss. In some embodiments, a cap may be applied to the adjustment scores. For example, adjusted average annual loss=average annual loss*(1+ adjustment cap*sum(associated adjustment scores)/maximum possible sum of the adjustment scores)

As an example (e.g., as seen in FIG. 19), the risk scores may be assigned as follows: if the property point is impacted by 2-10 year flood, the risk score may be 6.0 (there may be some repetitive loss associated with the property point); if the property point is impacted by 10-50 year flood, the risk score may be 5.0 (there may be some potential repetitive loss associated with the property point); if the property point is impacted by 50-100-year flood, the risk score may be 4.0; if the property point is impacted by 100-200 year flood, the risk score may be 3.0; if the property point is impacted by 200-500-year flood, the risk score may be 2.0; if the property point is impacted by 500-1000 year flood, the risk score may be 1.0; if the property point is not impacted by flood, the risk score may be 0. Other risk scores are also possible. Other risk adjustments are also contemplated. For example, if the property point could be impacted by damage to a levee, add 1.0 to the total risk score (the probability of damage to a levee could increase the overall possibility of flooding); if the property point could be impacted by damage to a dam, add 0.5 to the total risk score (the probability of damage to a dam could increase the overall possibility of flooding); if the property point could be impacted by hurricanes, add 1.0 to the total risk score; if the property point could be impacted by a landslide, add 0.5 to the total risk score; if the property point could be impacted by a tsunami, add 0.5 to the total risk score; if the property point could be impacted by flash flooding, add 0.5 to the total risk score. Other risk adjustments are also possible. In some embodiments, the adjustment rate may equal the risk score divided by 10. Other risk scores and divisors are also contemplated. In some embodiments, the risk scores and adjustment rates may be modifiable (e.g., by an insurance company).

In some embodiments, a system may be provided to perform one or more methods described herein. The system could be a web-based system that integrates multiple geospatial datasets, flood damage computation, and the flood risk rating. The system may generate a flood risk assessment report with commercial property information, including a property point address and company information. The report may further include the 100-year and 500-year flood determination, a FEMA flood zone map, ground elevation of the commercial building, property point values (including contents, equipment, etc.) for the commercial building, flood frequency versus flood elevation curve, flood frequency versus flood loss curve, average annual loss, probable maximum loss, flood risk rating, historical hazard events for the property point, and a reporting date. The report may be delivered to a client through a web service (e.g., through Extensible Markup Language (XML)).

Figures 20, 21:
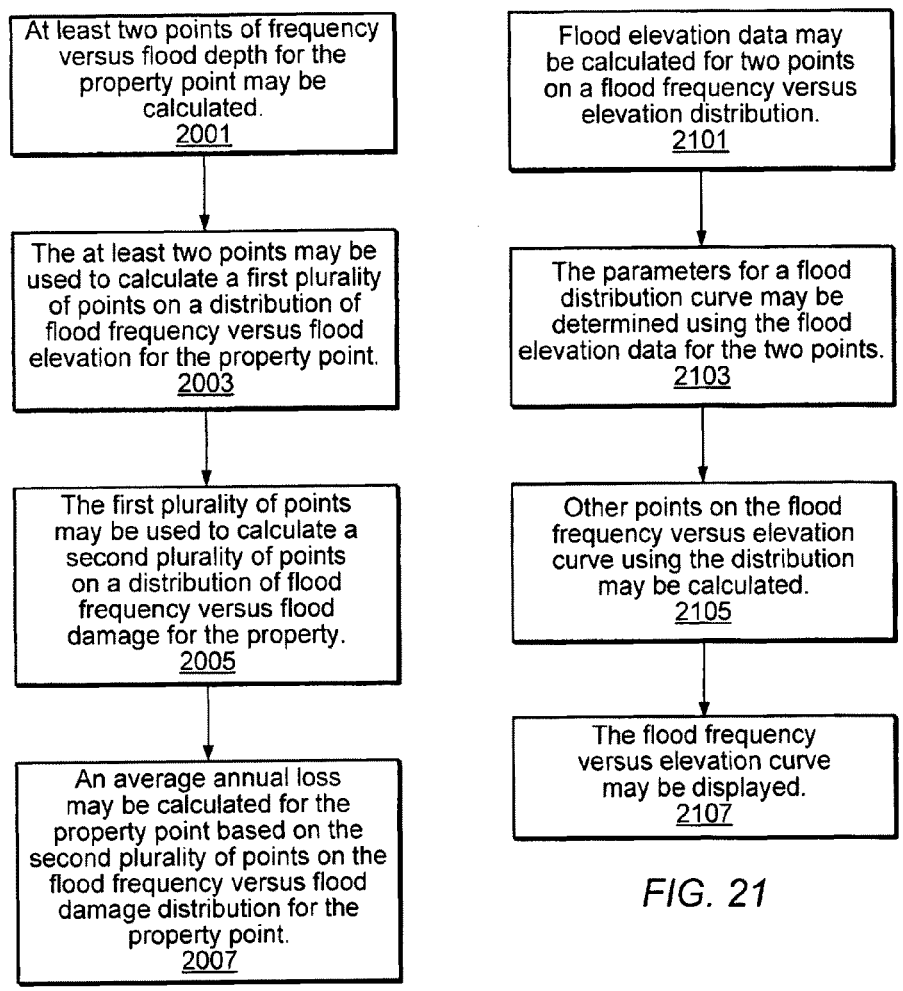
FIG. 20 illustrates an embodiment of a method for calculating the average annual loss due to flooding at a property point.
FIG. 21 illustrates an embodiment of a method for using flood elevation data to calculate a distribution for flood frequency versus flood elevation.

FIG. 20 illustrates an embodiment of a method for calculating the average annual loss due to flooding at a property point. It should be noted that in various embodiments of the methods described below, one or more of the elements described may be performed concurrently, in a different order than shown, or may be omitted entirely. Other additional elements may also be performed as desired.

At 2001, at least two points of flood frequency versus flood elevation for the property point may be calculated. These points may be derived, for example, from flood elevation lines on a flood map, from derived flood elevation lines on the flood map (e.g., derived from pre-existing flood elevation lines on the flood map), and/or gage station data near the property point.

At 2003, the at least two points may be used to calculate a first plurality of points (e.g., a curve) on a distribution of flood frequency versus flood elevation for the property point. For example, if flood elevation data exists for flood elevation lines on the 100-year flood boundary (frequency=0.01) and the 500-year flood boundary (frequency=0.002), this information may be used to calculate the distribution of flood frequency versus flood elevation for the property point. In some embodiments, the Log Pearson Type III distribution, the Log Normal distribution, and/or the Extreme Value Type I distribution may be used. Other distributions may also be used.

At 2005, the first plurality of points may be used to calculate a second plurality of points (e.g., a curve) on a distribution of flood frequency versus flood damage for the property point.

At 2007, an average annual loss may be calculated for the property point based on the second plurality of points on the flood frequency versus flood damage distribution for the property point (e.g., see FIG. 18b). Calculating the average annual loss may include weighting the calculated average annual loss with a risk score determined for the property point. For example, the risk score may be at least partially dependent on the flood frequency of flooding at the property point or whether the property point may be impacted by damage to a levee, damage to a dam, a hurricane, a storm surge, a landslide, a tsunami, or a flash flood. In some embodiments, the risk scores may be adjustable to increase or decrease the relative effect on the annual average loss of the risk scores. The effect of the risk scores may also be capped.

FIG. 21 illustrates an embodiment of a method for using flood elevation data to calculate a distribution for flood frequency versus flood elevation. It should be noted that in various embodiments of the methods described below, one or more of the elements described may be performed concurrently, in a different order than shown, or may be omitted entirely. Other additional elements may also be performed as desired.

At 2101, flood elevation data may be calculated for two points on a flood frequency versus flood elevation distribution.

At 2103, the parameters for a flood distribution curve may be determined using the flood elevation data for the two points. The flood distribution may be selected from the Log Pearson Type III distribution, the Log Normal distribution, or the Extreme Value Type I distribution. Other distributions may also be used.

At 2105, other points on the flood frequency versus flood elevation curve may be calculated using the distribution.

At 2107, the flood frequency versus flood elevation curve may be displayed.

Figures 22, 23:
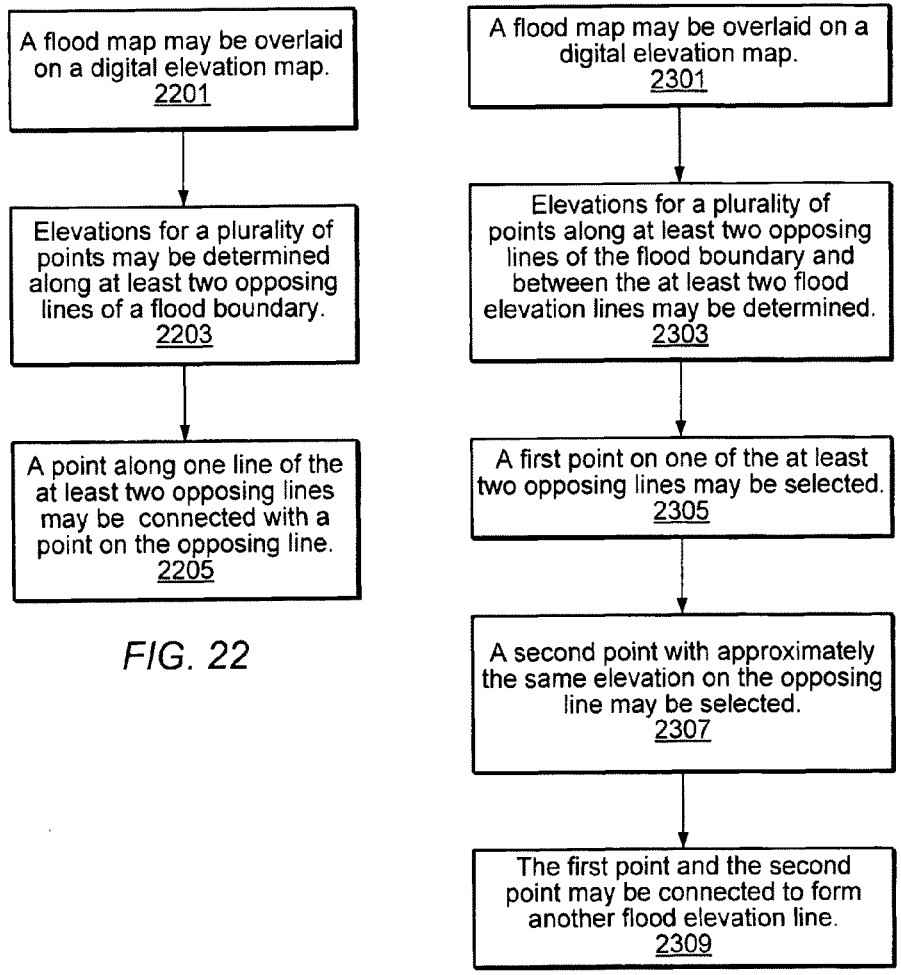
FIG. 22 illustrates an embodiment of a method for forming a flood elevation line by aligning elevations on a flood boundary.
FIG. 23 illustrates an embodiment of a method for forming a flood elevation line based on a pre-existing flood elevation lines.

FIG. 22 illustrates an embodiment of a method for forming a flood elevation line by aligning elevations on a flood boundary (e.g., see FIG. 7a). It should be noted that in various embodiments of the methods described below, one or more of the elements described may be performed concurrently, in a different order than shown, or may be omitted entirely. Other additional elements may also be performed as desired.

At 2201, a flood map may be overlaid on a digital elevation map. For example, the flood map and the digital elevation map may be aligned (e.g., geographically aligned).

At 2203, elevations for a plurality of points (e.g., elevation points 609) may be determined along at least two opposing lines of a flood boundary (e.g., 100-year flood boundary 601) on the flood map.

At 2205, a point along one line of the at least two opposing lines may be connected with a point on the opposing line. The points may not actually be on the opposing lines, but may be near the opposing lines. The two connected points may be approximately the same elevation. In some embodiments, a line connecting the two points may be substantially perpendicular to the flood source line feature (e.g., centerline 607). In some embodiments, the points may not be physically connected with a line, but may instead be connected by association with each other (e.g., in a database).

FIG. 23 illustrates an embodiment of a method for forming a flood elevation line based on pre-existing flood elevation lines (e.g., see FIG. 12). It should be noted that in various embodiments of the methods described below, one or more of the elements described may be performed concurrently, in a different order than shown, or may be omitted entirely. Other additional elements may also be performed as desired.

At 2301, a flood map may be overlaid on a digital elevation map. The flood map may have at least two pre-existing flood elevation lines (which may be BFEs) for a flood boundary.

At 2303, elevations for a plurality of points along at least two opposing lines 1003a,b of the flood boundary and between the at least two pre-existing flood elevation lines (e.g., flood elevation lines 1206a,b) may be determined. The plurality of points on a line of the flood boundary may be approximately equally spaced vertically based on the slope of the two pre-existing flood elevation lines. For example, the slope may be calculated as the upstream flood elevation (corresponding to the upstream flood elevation line such as flood elevation line 1206a)–downstream flood elevation (corresponding to the downstream flood elevation line such as flood elevation line 1206b)/the distance between the intersection of the upstream flood elevation line and the centerline 1007 and the intersection of the downstream flood elevation line and the centerline 1007. The slope may thus provide change in elevation/distance. The plurality of points may thus be equally spaced (e.g., along opposing lines 1003a,b which may or may not be present) at equal increments of slope. For example, if the slope is 100 m/2000 m, 9 points may be distributed along a flood boundary every 10 m/200 m (with an approximate 10 m change in elevation between points and the points approximately spaced 200 m apart).

At 2305, a first point 1223c on one of the at least two opposing lines (e.g., flood boundary line 1003a) of the flood boundary may be selected.

At 2307, a second point 1223g with approximately the same elevation on the opposing line (e.g., flood boundary line 1003b) may be selected. The second point 1223g may include a point placed on the opposing line at 2303. For example, if the first point 1223c is the third next point (as placed at 2303) on one of the opposing lines, the second point 1223g may be the third next point (as placed in 2303) on the other opposing line. In some embodiments, the second point 1223g may be searched for such that a line passing through the first point 1223c and a region of the second point 1223g may have a slope associated with at least one of the slopes of the pre-existing flood elevation lines (e.g., the slope between the first point 1223c and the second point 1223g may be approximately the same slope as a pre-existing flood elevation line or may be a weighted slope (e.g., using the distance from the first point 1223c to each of the two pre-existing flood elevation lines and the slopes of each of the two pre-existing flood elevation lines)). In some embodiments, the second point 1223g may be searched for such that a line passing through the first point 1223c and a region of the second point 1223g may be substantially perpendicular to the centerline 1007 (at the point the line intersects the centerline 1007).

At 2309, the first point 1223c and the second point 1223g may be connected to form another flood elevation line 1206c.

Figure 24A:
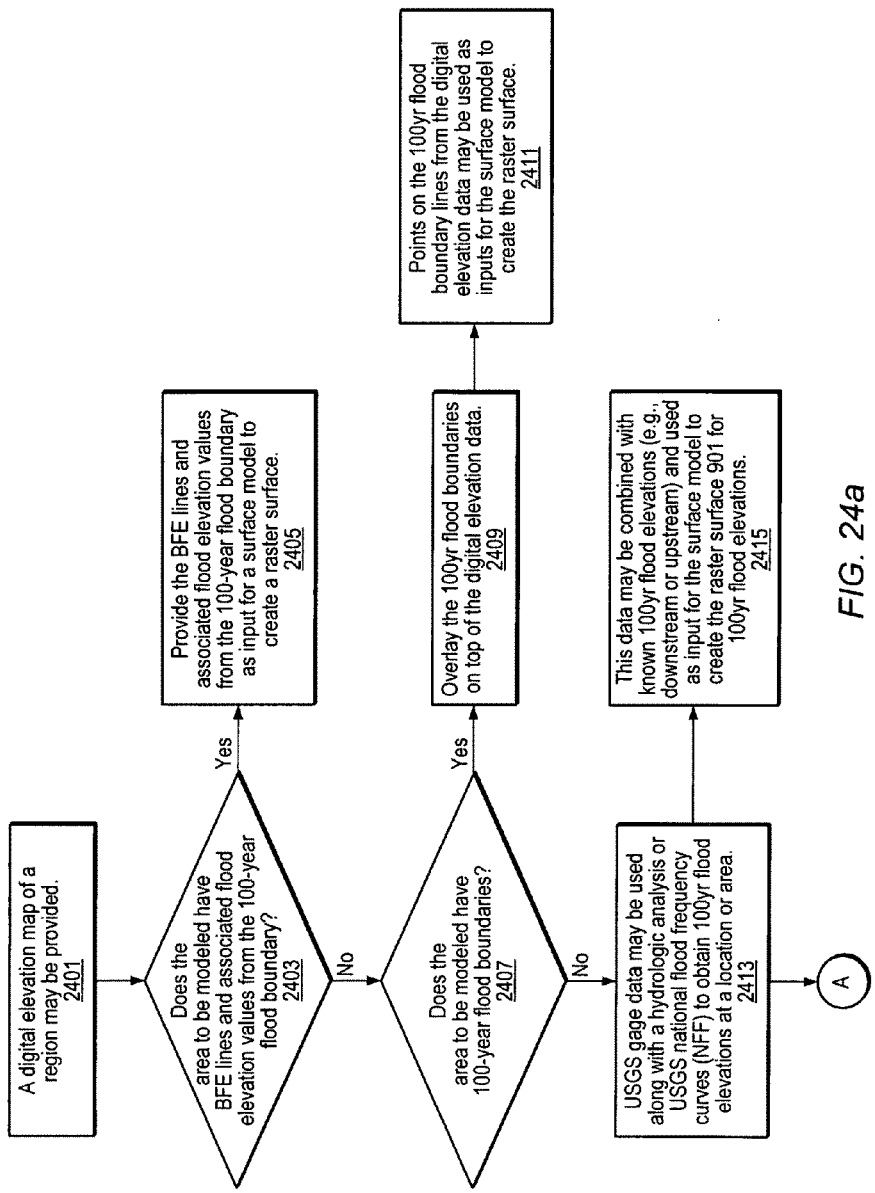
FIG. 24a-b illustrate an embodiment of a method for forming a raster surface based on flood elevations.
Figure 24B:
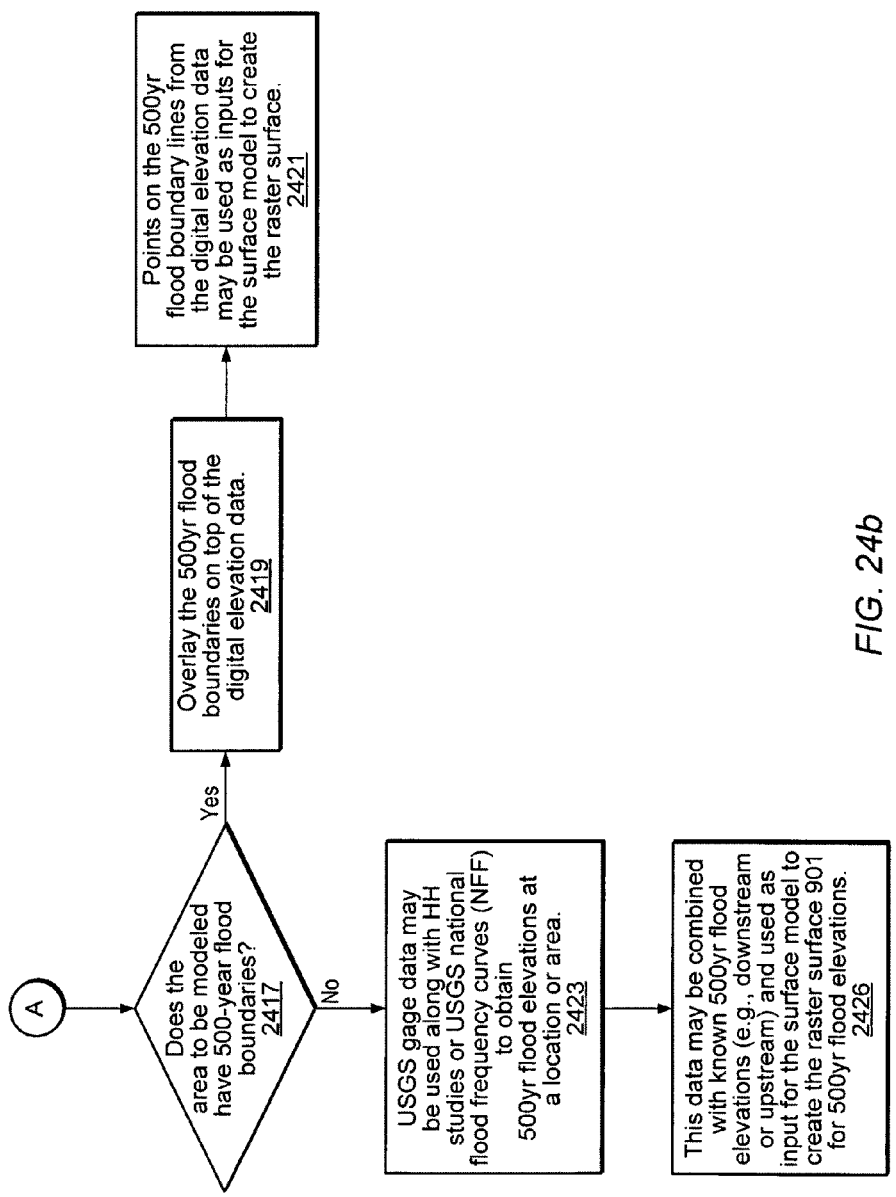

FIGS. 24a-b illustrate an embodiment of a method for forming a raster surface (e.g., see FIG. 9) based on flood elevations. It should be noted that in various embodiments of the methods described below, one or more of the elements described may be performed concurrently, in a different order than shown, or may be omitted entirely. Other additional elements may also be performed as desired.

At 2401, a digital elevation map of a region (e.g., an area to be modeled) may be provided.

At 2403, a determination may be made as to whether an area to be modeled has line features and associated flood elevation values from the 100-year flood boundary.

At 2405, if the area has line features and associated flood elevation values from the 100-year flood boundary, the flood elevation lines and associated flood elevation values from the 100-year flood boundary may be provided as input for a surface model (such as a TIN surface) to create a raster surface.

At 2407, if the area does not have flood elevation lines and associated flood elevation values from the 100-year flood boundary, a determination may be made as to whether the area has 100-year flood boundaries.

At 2409, if the area has 100-year flood boundaries, the 100-year flood boundaries may be overlaid on top of the digital elevation data (e.g., overlaid on the digital elevation map), and at 2411, points on the 100-year flood boundary lines (e.g., the point elevations) from the digital elevation data may be used as inputs for the surface model to create the raster surface for the 100-year flood elevations.

At 2413, if the area does not have 100-year flood boundaries, USGS gage data may be used along with an HH study or USGS national flood frequency curves (NFF) to obtain 100-year flood elevations at a location or area. At 2415, this data may be combined with known 100-year flood elevations (e.g., downstream or upstream) and used as input for the surface model to create the raster surface 901 for 100-year flood elevations.

At 2417, a determination may be made as to whether the area has 500-year flood boundaries.

At 2419, if the area has 500-year flood boundaries, the 500-year flood boundaries may be overlaid on top of the digital elevation data (e.g., overlaid on the digital elevation map), and at 2421, points on the 500-year flood boundary lines (e.g., the point elevations) from the digital elevation data may be used as inputs for the surface model to create the raster surface for the 500-year flood elevations.

At 2423, if the area does not have 500-year flood boundaries, USGS gage data may be used along with an HH study or USGS national flood frequency curves (NFF) to obtain 500-year flood elevations at a location or area. At 2425, this data may be combined with known 500-year flood elevations (e.g., downstream or upstream) and used as input for the surface model to create the raster surface 901 for 500-year flood elevations.

Figures 25, 26:
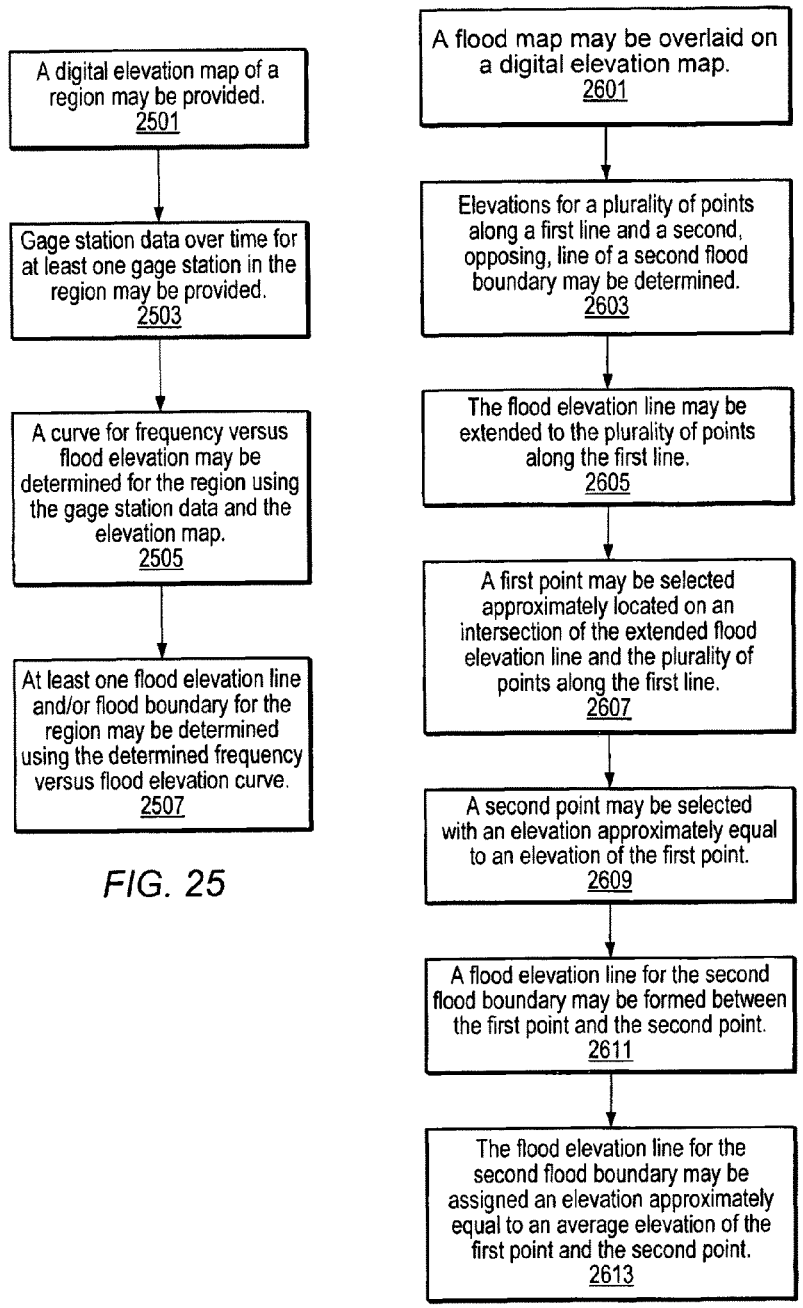
FIG. 25 illustrates an embodiment of a method for forming a flood elevation line based on gage station data.
FIG. 26 illustrates an embodiment of a method for forming a flood elevation line by extending a pre-existing elevation line.

FIG. 25 illustrates an embodiment of a method for forming a flood elevation line (e.g., a BFE) and/or a flood boundary based on gage station data (e.g., see FIGS. 8a-b). In some embodiments, if the 100-year flood boundaries and/or the 500-year flood boundaries are not provided, gage station data may be used to form one or more of these boundaries. This data may also be used to provide corresponding flood elevation lines. It should be noted that in various embodiments of the methods described below, one or more of the elements described may be performed concurrently, in a different order than shown, or may be omitted entirely. Other additional elements may also be performed as desired.

At 2501, a digital elevation map of a region may be provided.

At 2503, gage station data over time for at least one gage station in the region may be provided (e.g., see gage station data in FIG. 38b). In some embodiments, a USGS map (e.g., a USGS Hydrologic Unit Code Map) may be used to determine the hydraulic unit code for the region (e.g., by entering a geocoded point for the region or address). The gage stations assigned to that hydraulic unit code may then be used.

At 2505, a curve for flood frequency versus flood elevation may be determined for the region using the gage station data and the digital elevation map. For example, a statistical and hydrologic analysis may be applied to data from the indicated gage station(s). (As another example, see FIG. 38b and accompanying description above).

At 2507, at least one flood elevation line and/or flood boundary for the region may be determined using the determined flood frequency versus flood elevation curve. For example, the 100-year flood elevation line (corresponding to the determined 100 year flood elevation for a property point in the region) and/or the 500-year flood elevation line (corresponding to the determined 500 year flood elevation for the property point) may be provided for a property point by using the determined flood frequency versus flood elevation curve. In some embodiments, several flood elevation lines may be used to construct the corresponding flood boundary (e.g., by connecting the adjacent ends of corresponding flood elevation lines to form corresponding flood boundaries).

FIG. 26 illustrates an embodiment of a method for forming a flood elevation line by extending a pre-existing flood elevation line (e.g., forming a 500-year flood elevation line by extending a BFE) (e.g., see FIG. 10). It should be noted that in various embodiments of the methods described below, one or more of the elements described may be performed concurrently, in a different order than shown, or may be omitted entirely. Other additional elements may also be performed as desired.

At 2601, a flood map with a flood elevation line 1005a for a first flood boundary 1001 (e.g., a BFE 1005a for a 100-year flood boundary 1001) may be overlaid on a digital elevation map.

At 2603, elevations for a plurality of points along a first line 1003a and a second, opposing, line 10036 of a second flood boundary (e.g., opposing lines of the second flood boundary 1003) may be determined.

At 2605, the flood elevation line 1005a may be extended to the plurality of points along the first line 1003a. The flood elevation line 1005a may be extended along approximately the same direction as the flood elevation line (e.g., a BFE) for the first flood boundary.

At 2607, a first point may be selected approximately located on an intersection of the extended flood elevation line 1006a and the flood boundary 1003 (e.g., comprised of a plurality of points along the first line). The elevation value may be taken from the digital elevation dataset at the intersection point. For example, the closer of points 1023a or 1023d to intersection point 1033a may be used. In some embodiments, a point at intersection 1033a may be used as the first point.

At 2609, a second point may be selected with an elevation approximately equal to an elevation of the first point. The second point may be approximately at an intersection of the extended flood elevation line 1006a and the plurality of points along the second line 1003b. The second point may be chosen to have an elevation approximately equal to the first point elevation. For example, the point (between either point 1023c or 1023d) with the closest elevation to the first point may be selected as the second point.

At 2611, a flood elevation line 1006a for the second flood boundary 1003 may be formed between the first point and the second point.

At 2613, the flood elevation line for the second flood boundary may be assigned an elevation approximately equal to an average elevation of the first point and the second point.

Figure 27:
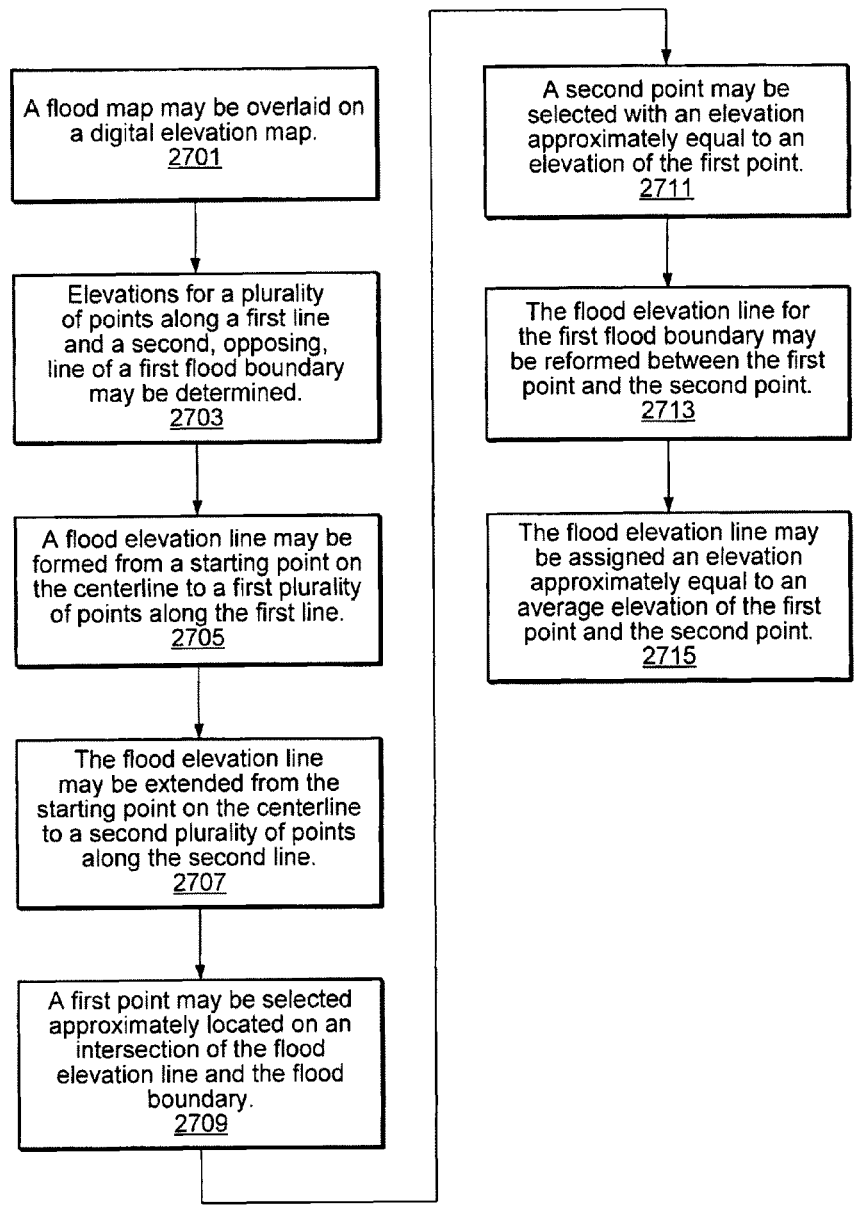
FIG. 27 illustrates an embodiment of a method for forming a base flood elevation line by using a centerline.

FIG. 27 illustrates an embodiment of a method for forming a flood elevation line by using a centerline (e.g., see FIG. 11). It should be noted that in various embodiments of the methods described below, one or more of the elements described may be performed concurrently, in a different order than shown, or may be omitted entirely. Other additional elements may also be performed as desired.

At 2701, a flood map with a centerline 1007 may be overlaid on a digital elevation map.

At 2703, elevations for a plurality of points along a first line 1003a and a second, opposing, line 1003b of a first flood boundary 1003 may be determined.

At 2705, a flood elevation line 1105a may be formed from a starting point on the centerline 1007 to a first plurality of points along the first line 1003a. The flood elevation line 1105a may be formed substantially perpendicular to the centerline 1007 at the starting point on the centerline 1007.

At 2707, the flood elevation line 1105a may be extended from the starting point on the centerline 1007 to a second plurality of points along the second line 1003b. The flood elevation line 1105a may be extended substantially perpendicular to the centerline 1007 at the starting point on the centerline 1007. For example, the flood elevation line 1105a may be substantially perpendicular to the centerline 1007 at the location where the flood elevation line 1105a crosses the centerline 1007.

At 2709, a first point may be selected approximately located on an intersection of the flood elevation line 1105a and flood boundary 1003 (e.g., the plurality of points along the first line 1003a).

At 2711, a second point may be selected with an elevation approximately equal to an elevation of the first point. The second point is approximately at an intersection of the extended flood elevation line 1105a and the second plurality of points (e.g., along second line 1003b).

At 2713, the flood elevation line 1105a for the first flood boundary 1003 may be reformed between the first point and the second point.

At 2715, the flood elevation line 1105a may be assigned an elevation approximately equal to an average elevation of the first point and the second point.

Figure 28:
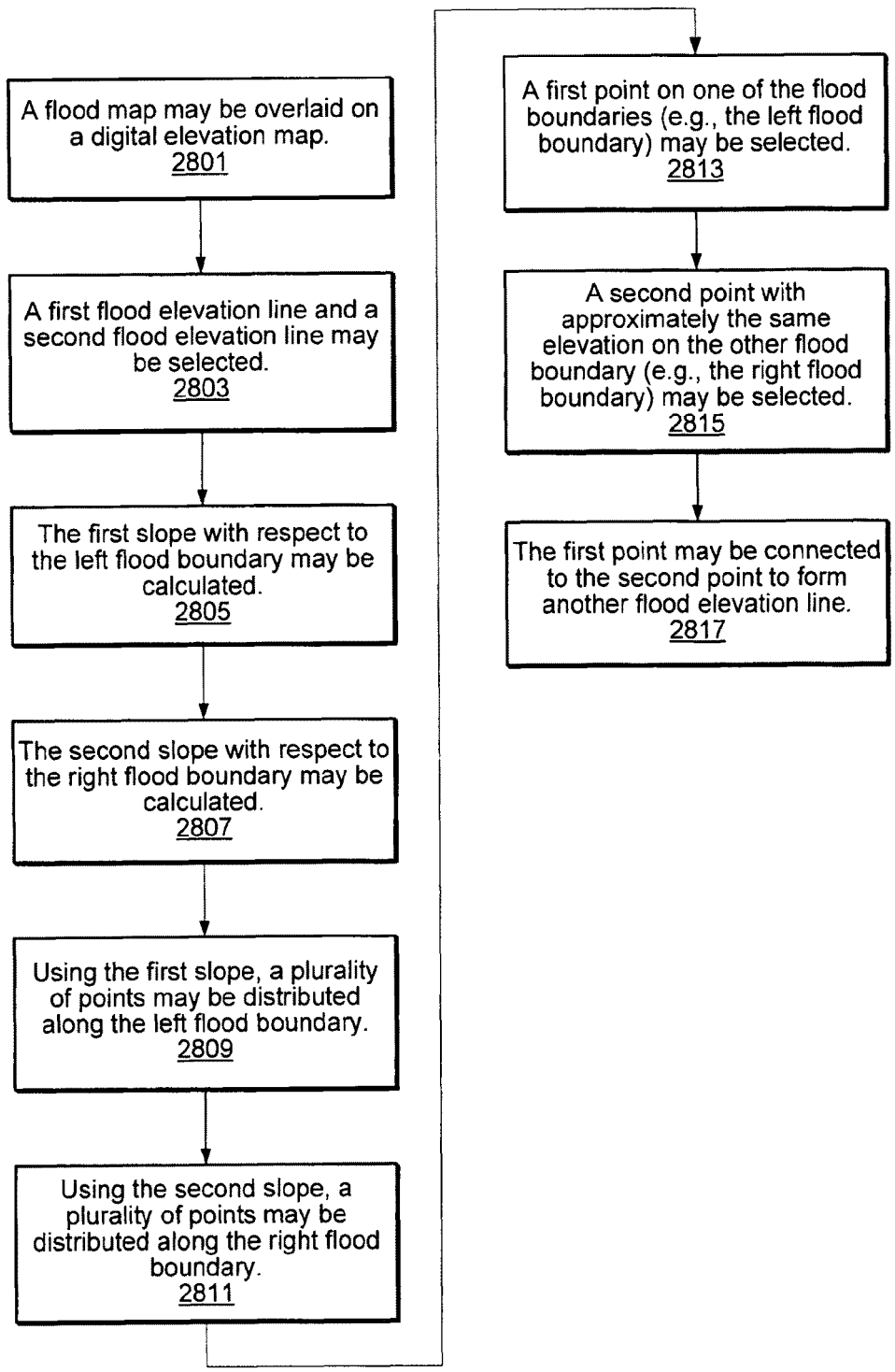
FIG. 28 illustrates an embodiment of a method for using two perimeter flood elevation lines for forming subsequent intermediary flood elevation lines.

FIG. 28 illustrates an embodiment of a method for using two perimeter flood elevation lines for forming subsequent intermediary flood elevation lines (e.g., see FIG. 12). It should be noted that in various embodiments of the methods described below, one or more of the elements described may be performed concurrently, in a different order than shown, or may be omitted entirely. Other additional elements may also be performed as desired.

At 2801, a flood map may be overlaid on a digital elevation map.

At 2803, a first flood elevation line 1206a and a second flood elevation line 1206b may be selected. In some embodiments, the first flood elevation line 1206a may be an upstream flood elevation line and the second flood elevation line 1206b may be a downstream flood elevation line. The first flood elevation line 1206a and the second flood elevation line 1206b may intersect respective flood boundaries. For example, the first flood elevation line 1206a may intersect the left flood boundary 1003a at point 1223a and the right flood boundary 1003b at point 1223b. The second flood elevation line 1206b may intersect the left flood boundary 1003a at point 1223e and the right flood boundary 1003b at point 1223f.

At 2805, the first slope with respect to the left flood boundary 1003a may be calculated. For example, the slope may be calculated as the upstream flood elevation (corresponding to the upstream flood elevation line 1206a)–downstream flood elevation (corresponding to the downstream flood elevation line 1206b)/the distance between point 1223a and 1223e (distance along the left flood boundary line 1003a). The slope may thus provide change in elevation/distance corresponding to the left flood boundary line 1003a.

At 2807, the second slope with respect to the right flood boundary 1003b may be calculated. For example, the second slope may be calculated as the upstream flood elevation (corresponding to the upstream flood elevation line 1206a)–downstream flood elevation (corresponding to the downstream flood elevation line 1206b)/the distance between point 1223b and 1223f (distance along the right flood boundary line 1003b). The slope may thus provide change in elevation/distance corresponding to the right flood boundary line 1003b.

At 2809, using the first slope, a plurality of points may be distributed along the left flood boundary 1003a. The plurality of points may be equally spaced along the left flood boundary 1003a at equal increments of slope. For example, if the slope is 100 m/2000 m (flood elevation change/distance), 9 points may be distributed along the left flood boundary 1003a every 10 m/200 m (with an approximate 10 m change in elevation between points and the points approximately spaced 200 m apart).

At 2811, using the second slope, a plurality of points may be distributed along the right flood boundary 1003b. The plurality of points may be equally spaced along the right flood boundary 1003b at equal increments of slope. For example, if the slope is 120 m/2200 m (flood elevation change/distance), 9 points may be distributed along the right flood boundary 1003b every 12 m/220 m (with an approximate 10 m change in elevation between points and the points approximately spaced 200 m apart).

At 2813, a first point 1223c on one of the flood boundaries (e.g., the left flood boundary 1003a) may be selected.

At 2815, a second point 1223g with approximately the same elevation on the other flood boundary (e.g., the right flood boundary 1003b) may be selected. The second point 1223g may include a point placed on the boundary line at 2811. For example, if the first point 1223c is the third next point (as placed at 2809) on the left flood boundary 1003a, the second point 1223g may be the third next point (as placed in 2811) on the other opposing line (e.g., right flood boundary 1003b). In some embodiments, the second point 1223g may be searched for such that a line passing through the first point 1223c and a region of the second point 1223g may have a slope associated with at least one of the slopes of the pre-existing flood elevation lines (e.g., the slope between the first point 1223c and the second point 1223g may be approximately the same slope as a pre-existing flood elevation line or may be a weighted slope (e.g., using the distance from the first point 1223c to each of the two pre-existing flood elevation lines and the slopes of each of the two pre-existing flood elevation lines)). In some embodiments, the second point 1223g may be searched for such that a line passing through the first point 1223c and a region of the second point 1223g may be substantially perpendicular to the centerline 1007.

At 2817, the first point 1223c may be connected to the second point 1223g to form another flood elevation line 1206c.

In some embodiments, elevations for a plurality of points along at least two opposing lines of a flood boundary may be determined (the points of the plurality of points on a line of the flood boundary may be approximately equally spaced between the first and second flood elevation lines 1206a,b (e.g., BFEs)). A first flood elevation line 1206a (having a first slope) may be formed by connecting a first point 1223a along one line of the at least two opposing lines with a second point 1223b on the opposing line. The first point 1223a and second point 1223b may be approximately the same elevation. A second flood elevation line 1206b (having a second slope) may be formed by connecting a third point 1223e along one line of the at least two opposing lines with a fourth point 1223f on the opposing line. The third point 1223e and fourth point 1223f may be approximately the same elevation. The elevations for a plurality of points along the at least two opposing lines of the flood boundary and between the first and second flood elevation lines may be determined. In some embodiments, the elevations may be displayed. A fifth point 1223c may be selected on one of the at least two opposing lines. In some embodiments, a sixth point 1223g with approximately the same elevation on the opposing line may be searched for such that a line passing through the fifth point 1223c and a region of the sixth point 1223g may have approximately a slope (weighted_slope) equal to a sum of a weighted value of the first slope plus a weighted value of the second slope. The weighted values of the first slope and the second slope may depend on their proximity to the fifth point 1223c. For example, the weighted_slope may calculated as follows (where dist_sec_elev=distance from the second flood elevation line and dist_first_elev=distance from the first flood elevation line):

$$weighted\_slope = \frac{dist\_sec\_elev}{dist\_first\_elev + dist\_sec\_elev} * first\_slope + \frac{dist\_first\_elev}{dist\_first\_elev + dist\_sec\_elev} * sec\_slope$$

Figure 29:
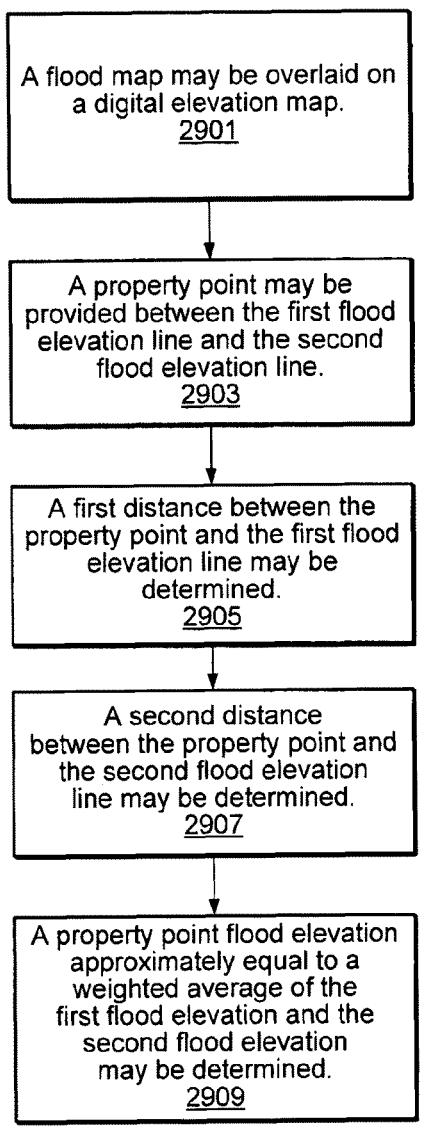
FIG. 29 illustrates an embodiment of a method for forming a flood elevation line for a point between two pre-existing flood elevation lines.

FIG. 29 illustrates an embodiment of a method for forming a flood elevation line for a property point between two pre-existing base flood elevation lines (e.g., see FIG. 13). A flood elevation line through a property point may provide at least one point of flood frequency versus flood elevation. For example, the flood elevation line through the property point may correspond to a flood frequency (e.g., a 100 year flood elevation line through the property point) and may have a flood elevation associated with the flood elevation line. For example, a flood elevation line of 180 m (with each endpoint intersecting the 100 year flood boundary at the 180 m elevation) through the property point may correspond to a flood elevation of 180 m for the property point for a flood frequency of once every 100 years (0.01) for the property point. It should be noted that in various embodiments of the methods described below, one or more of the elements described may be performed concurrently, in a different order than shown, or may be omitted entirely. Other additional elements may also be performed as desired.

At 2901, a flood map, with a first flood elevation line 1306a with a first flood elevation and a second flood elevation line 1306b with a second flood elevation, may be overlaid on a digital elevation map.

At 2903, a property point 1341 may be provided between the first flood elevation line 1306a and the second flood elevation line 1306b.

At 2905, a first distance 1351a between the property point 1341 and the first flood elevation line 1306a may be determined.

At 2907, a second distance 1351b between the property point 1341 and the second flood elevation line 1306b may be determined.

At 2909, a property point flood elevation approximately equal to a weighted average of the first flood elevation (first_elev) and the second flood elevation (sec_elev) may be determined. For example, if a total distance (total_dist) approximately equals the first distance (first_dist) plus the second distance (sec_dist), the weighted average (avg) for the property point flood elevation may be determined as follows:

$$avg = \left(\frac{first\_dist}{total\_dist}\right) * sec\_elev + \frac{sec\_dist}{total\_dist} first\_elev$$

Where avg=flood elevation for the property point 1341 (and, correspondingly, for a flood elevation line 1306c passing through the property point 1341.

Figure 30:
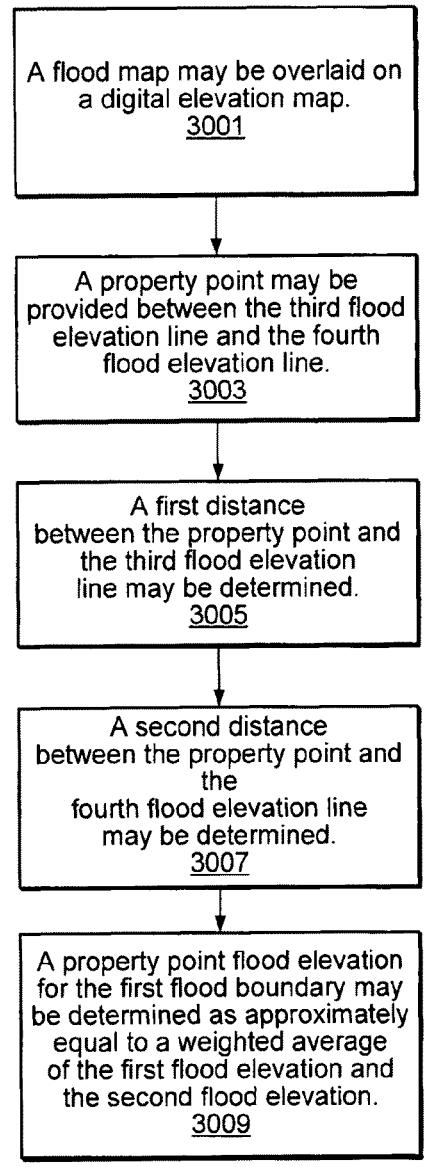
FIG. 30 illustrates an embodiment of a method for forming a flood elevation line for a point using two pre-existing flood elevation lines.

FIG. 30 illustrates an embodiment of a method for forming a flood elevation line for a property point using two pre-existing flood elevation lines (e.g., see FIG. 15). It should be noted that in various embodiments of the methods described below, one or more of the elements described may be performed concurrently, in a different order than shown, or may be omitted entirely. Other additional elements may also be performed as desired.

At 3001, a flood map may be overlaid on a digital elevation map. In some embodiments, the flood map may include a first flood elevation line 1506c and a second flood elevation line 1506d for a first flood boundary 1001 (e.g., BFEs for a 100-year flood boundary) and a third flood elevation line 1506a and a fourth flood elevation line 1506b for a second flood boundary 1003 (e.g., flood elevation lines for a 500 year flood boundary).

At 3003, a property point 1541 may be provided between the third flood elevation line 1506a and the fourth flood elevation line 1506b.

At 3005, a first distance 1551a between the property point 1541 and the third flood elevation line 1506a may be determined.

At 3007, a second distance 1551b between the property point 1541 and the fourth flood elevation line 1506b may be determined.

At 3009, a flood elevation for the property point 1541 relative to the first flood boundary 1001 may be determined as approximately equal to a weighted average of the first flood elevation (first_elev) (e.g., of the first flood elevation line 1506*c*) and the second flood elevation (sec_elev) (e.g., of the second flood elevation line 1506*d*). For example, if a total distance (total_dist) approximately equals the first distance (first_dist) plus the second distance (sec_dist), the weighted average may be determined as follows:

$$avg = \left(\frac{first\_dist}{total\_dist}\right) * sec\_elev + \frac{sec\_dist}{total\_dist} first\_elev$$

Where avg=flood elevation for the property point 1541 (and, correspondingly, for a flood elevation line passing through the property point 1541.

In some embodiments, if the flood map includes a centerline, the method may further include placing a dummy point on the centerline between the first base flood elevation line and the second base flood elevation line (e.g., see FIG. 15). The dummy point may be placed such that a ratio of the distance between the dummy point and the first base flood elevation line to the distance between the dummy point and the second base flood elevation line is approximately equal to the ratio of the distance between the first distance to the second distance.

Figure 31:
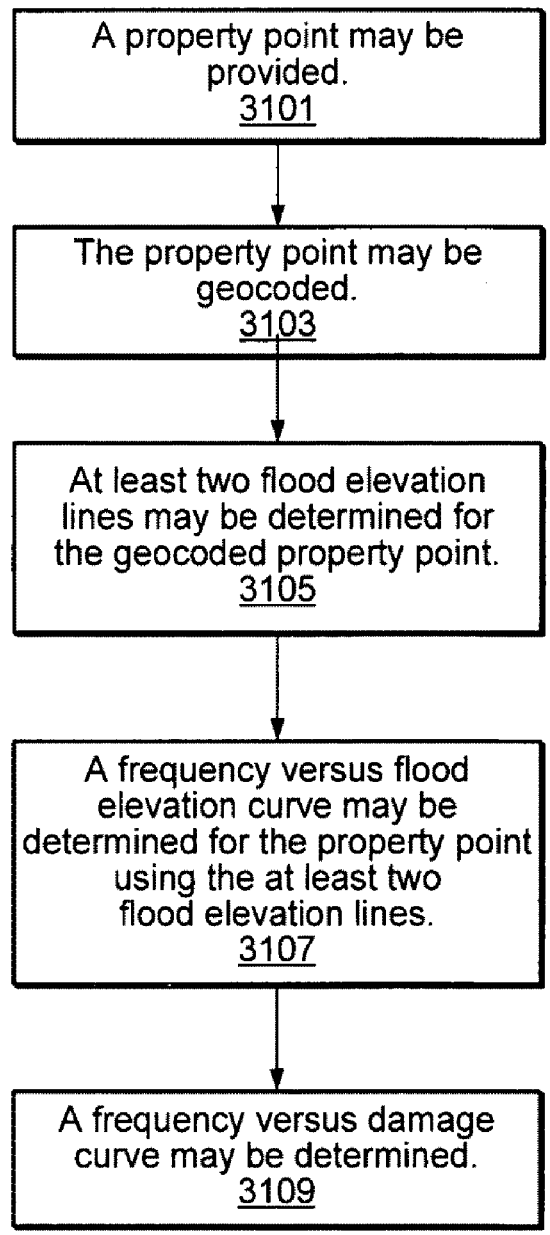
FIG. 31 illustrates an embodiment of a method for providing a flood risk assessment for a point.

FIG. 31 illustrates an embodiment of a method for providing a flood risk assessment for a point. It should be noted that in various embodiments of the methods described below, one or more of the elements described may be performed concurrently, in a different order than shown, or may be omitted entirely. Other additional elements may also be performed as desired.

At 3101, a property point may be provided.

At 3103, the property point may be geocoded (e.g., to provide an x,y coordinate for a digital elevation and/or flood map).

At 3105, at least two flood elevation lines may be determined for the geocoded property point (e.g., a BFE for the 100-year flood boundary and a flood elevation line for the 500-year boundary).

At 3107, a flood frequency versus flood elevation curve may be determined for the geocoded point using the at least two flood elevation lines.

At 3109, a flood frequency versus damage curve may be determined. For example, the user may provide flood elevation versus % damage and the value of the property point to be used with the flood frequency versus damage curve. In some embodiments, this information may be used to calculate the average annual loss (e.g., see FIG. 18*b*).

FIG. 32 illustrates an embodiment of a web-based method for providing a flood risk assessment for a point. It should be noted that in various embodiments of the methods described below, one or more of the elements described may be performed concurrently, in a different order than shown, or may be omitted entirely. Other additional elements may also be performed as desired.

At 3201, a property point may be entered into a web-based system (e.g., the address of a targeted portfolio may be entered into a web-based system). For example, the address of the property point may be entered by a client into an (Hyper Text Markup Language) HTML page provided by the web-based system when the client accesses the web-based system using a URL (Uniform Resource Locator).

At 3203, the property point may be geocoded (e.g., an x,y coordinate (such as a latitude/longitude)) by the system (e.g., by a web server).

At 3205, a determination may be made as to whether the property point is within a 100-year flood zone, a 500-year flood zone, or neither.

At 3207, if the property point is within the 100-year flood zone and/or the 500-year flood zone, the 100-year and 500-year flood elevations may be determined.

At 3209, the flood frequency versus elevation curve may be determined at the property point. In some embodiments, a plurality of points along the curve may be determined instead of actually drawing the curve.

At 3211, a flood frequency curve versus flood loss may be determined for the property point.

At 3213, if the property point is not within the 100-year flood zone and/or the 500-year flood zone, the system may determine the distances to the flood zones and the differences in flood elevations of these flood zones to calculate a weighted average for the property point.

At 3215, the information (including flood frequency curves, distances, elevations, etc.) may be provided to a flood hazard rating engine to determine a flood hazard rating corresponding to the information.

At 3217, the information may be used by a flood hazard rating engine to provide a flood risk assessment report. In some embodiments, other information may also be used to provide the report. The report may include, for example, commercial property information, including a property point address and company information, the 100-year and 500-year flood elevations, a FEMA flood zone map, ground elevation of the commercial building, property point values (including contents, equipment, etc.) for the commercial building, flood frequency versus flood elevation curve, flood frequency versus flood loss curve, average annual loss, probable maximum loss, flood risk rating, historical hazard events for the property point, and a reporting date. In some embodiments, the report may be provided as a downloadable file, an attachment in an email, or presented on screen for a user. Other report formats are also possible.

In various embodiments, prior to determining at least two points of flood elevation for flood frequency, available flood boundaries and/or flood elevation lines (e.g., from a flood map) may be redefined/corrected (e.g., by aligning/redrawing the flood boundaries and/or flood elevation lines on a digital elevation map). In some embodiments, endpoints of a flood elevation line feature (e.g., a BFE) created by previous flood studies may be adjusted to a 10 m or more accurate digital elevation map (e.g., see FIG. 33).

Figure 33A:
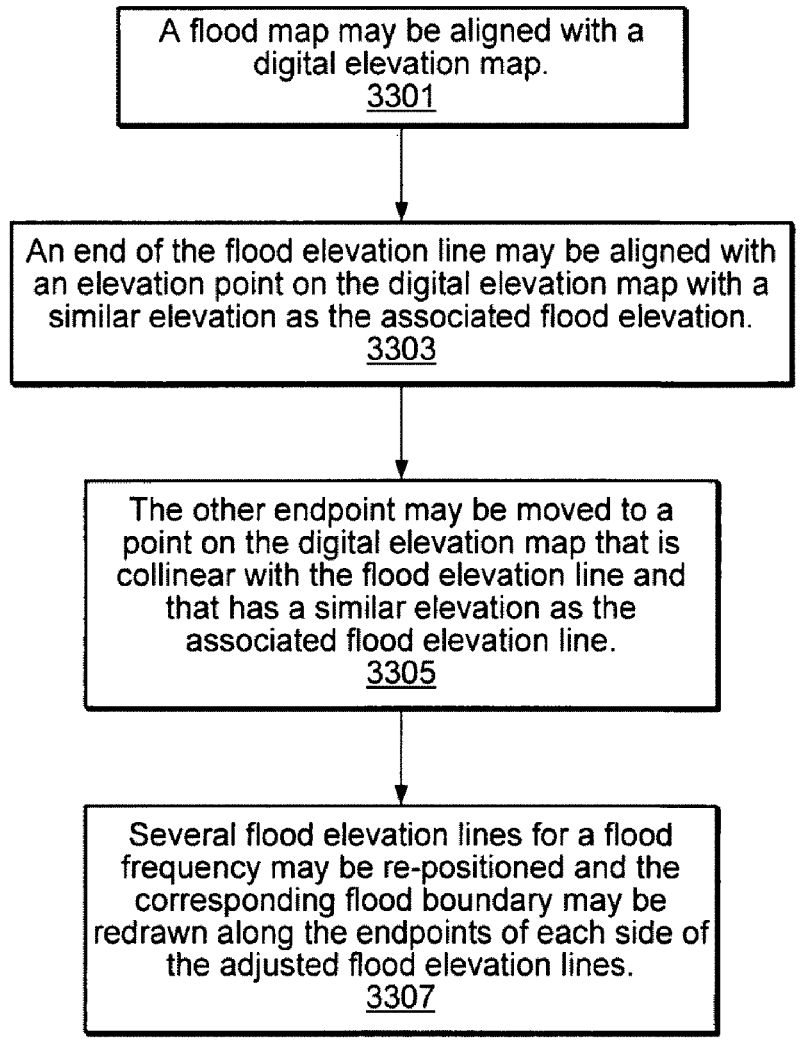
FIGS. 33a-b illustrate an embodiment of a method for correcting a flood elevation line.
Figure 33B:
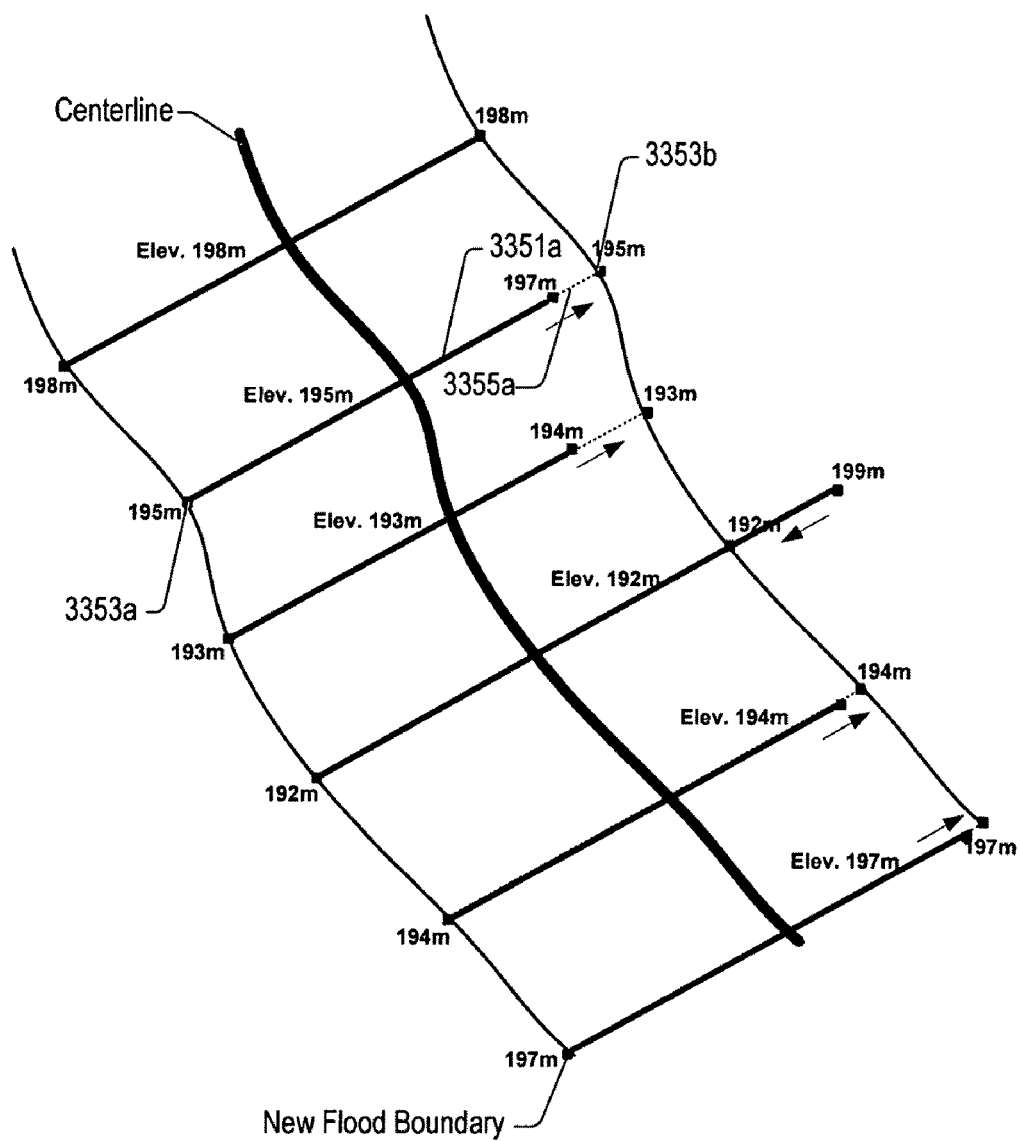

FIGS. 33*a-b* illustrates an embodiment of a method for correcting a flood elevation line. It should be noted that in various embodiments of the methods described below, one or more of the elements described may be performed concurrently, in a different order than shown, or may be omitted entirely. Other additional elements may also be performed as desired.

At 3301, a flood map may be aligned with a digital elevation map. For example, landmark features and/or set reference points may be aligned between the flood map and the digital elevation map (e.g., by overlaying these points on the flood map and digital elevation map). In some embodiments, the flood map may have at least one flood elevation line 3351*a* with two endpoints (a first endpoint 3353*a* and a second endpoint 3353*b*) and at least one associated flood elevation.

At 3303, an end (e.g., the first endpoint 3353*a*) of the flood elevation line 3351*a* may be aligned with an elevation point on the digital elevation map with a similar elevation as the associated flood elevation. For example, the elevation may be approximately the same or may be within a predetermined buffer distance (e.g., as set by a user).

At 3305, the other endpoint (e.g., the second endpoint 3353b) may be moved to a point on the digital elevation map that is collinear with the flood elevation line 3351a and that has a similar elevation as the associated flood elevation line 3351a. For example, the elevation of the moved second endpoint may be approximately the same or may be within a predetermined buffer distance (e.g., as set by a user). In some embodiments, a straight line object 3355a may be created using the second endpoint 3353b and an adjacent point (e.g., a closest point to the second endpoint 3353b) in the flood elevation line 3351a. The straight line object 3355a may then be expanded or collapsed until an elevation value from the digital elevation map matches the elevation value of the first endpoint 3353a. The second endpoint 3353b may then be moved to the new location with the similar elevation value as the first endpoint 3353a.

At 3307, several flood elevation lines for a flood frequency may be re-positioned and the corresponding flood boundary may be redrawn along the corrected endpoints of each side of the adjusted flood elevation lines. For example, if the corrected flood elevation lines correspond to the 100 year flood boundary, the endpoints of the corrected flood elevation lines may be connected (on either side of the flood source line feature) to create an adjusted flood boundary corresponding to the 100 year flood zone.

Figure 34:
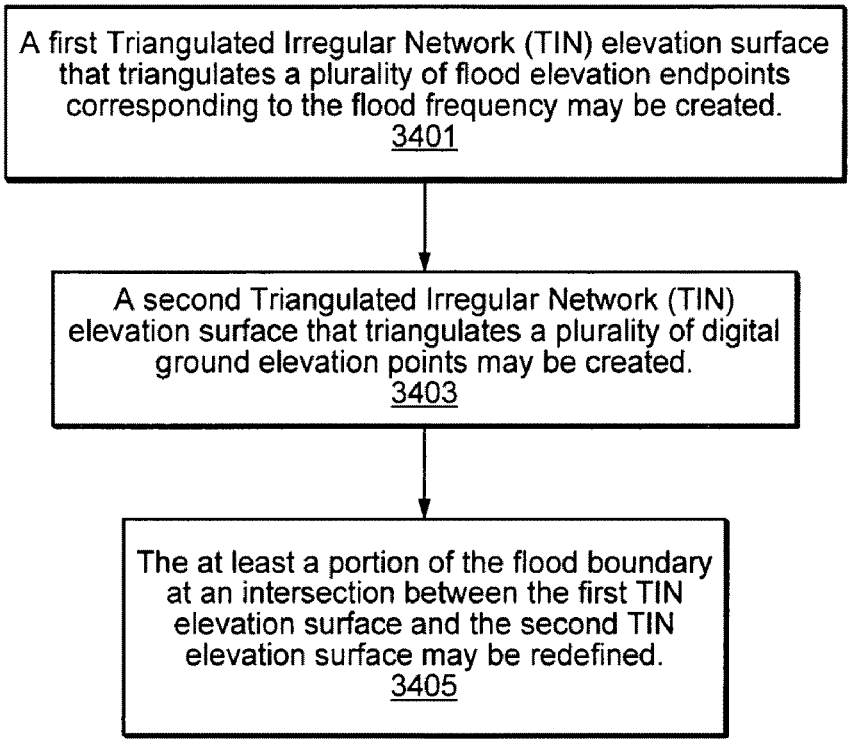
FIG. 34 illustrates an embodiment of a method for redefining at least a portion of a flood boundary.

FIG. 34 illustrates an embodiment of a method for redefining at least a portion of a flood boundary. It should be noted that in various embodiments of the methods described below, one or more of the elements described may be performed concurrently, in a different order than shown, or may be omitted entirely. Other additional elements may also be performed as desired.

At 3401, a first Triangulated Irregular Network (TIN) elevation surface that triangulates a plurality of flood elevation line endpoints corresponding to the flood frequency may be created. In some embodiments, the plurality of flood elevation lines may be pre-defined (e.g., on a flood map) or may be formed using one of the methods described herein (e.g., FIG. 33a) to use in adjusting a flood boundary. Example TIN elevation surfaces may be seen in FIG. 36b (e.g., see TIN surfaces 3603 and 3601). In some embodiments, the surface may be defined by connecting endpoints on either side of the flood source line feature (e.g., without necessarily triangulating all of the endpoints). As with the other embodiments presented herein, the lines and surfaces may be actually drawn (e.g., manually and/or graphically), or may be represented by associations formed for corresponding data points (e.g., stored in a database). Other representations are also contemplated.

At 3403, a second Triangulated Irregular Network (TIN) elevation surface that triangulates a plurality of digital ground elevation points may be created. For example, the second elevation surface may follow the ground surface.

At 3405, the at least a portion of the flood boundary at an intersection between the first TIN elevation surface and the second TIN elevation surface may be redefined. For example, the flood boundary may be formed along the points where the first TIN elevation surface points intersect the second TIN elevation surface (e.g., where the flood elevation line endpoints match the corresponding ground elevations).

Figure 35A:
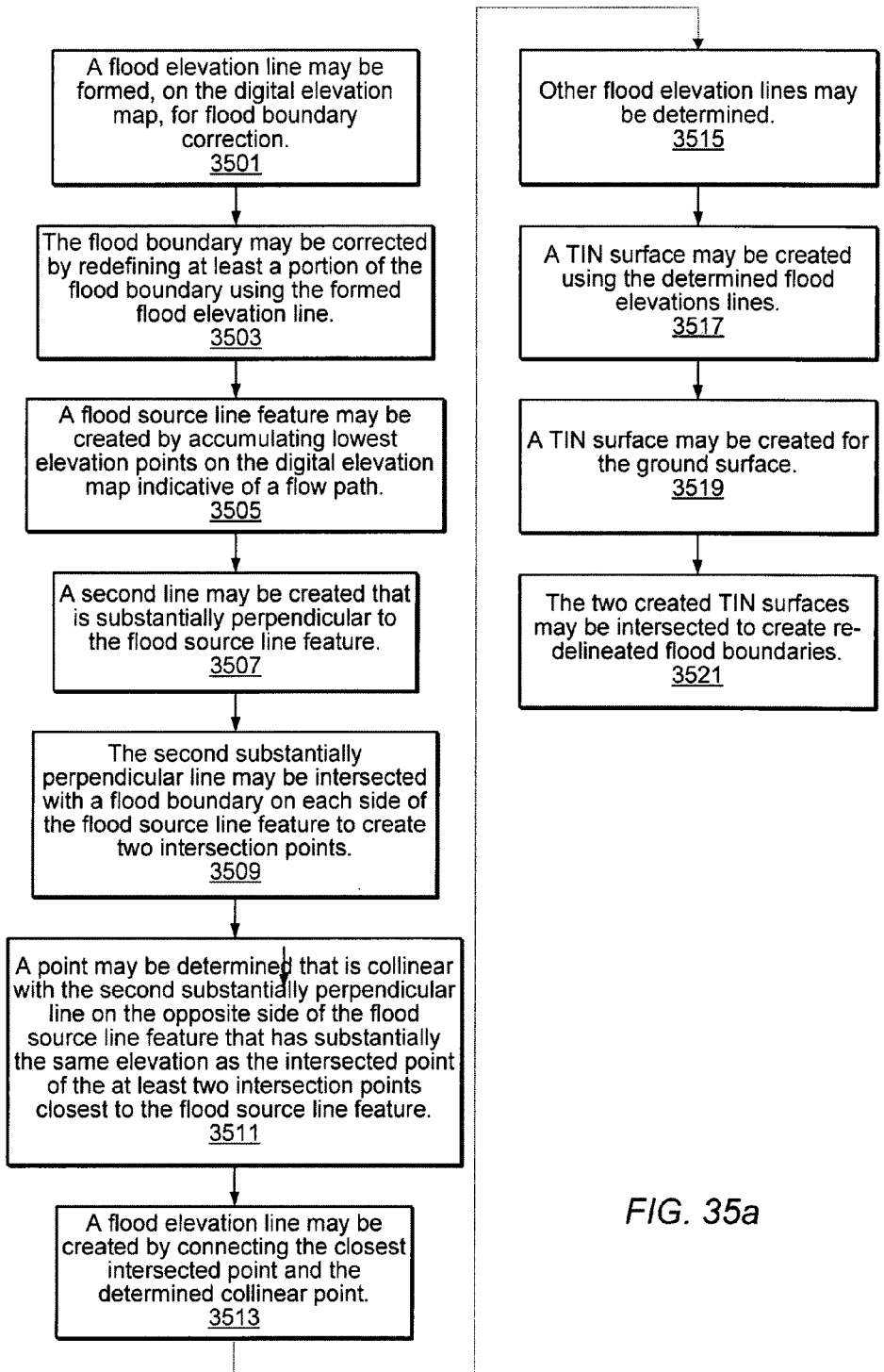
FIGS. 35a-b illustrate an embodiment of a method for correcting a flood boundary using a digital elevation map.
Figure 35B:
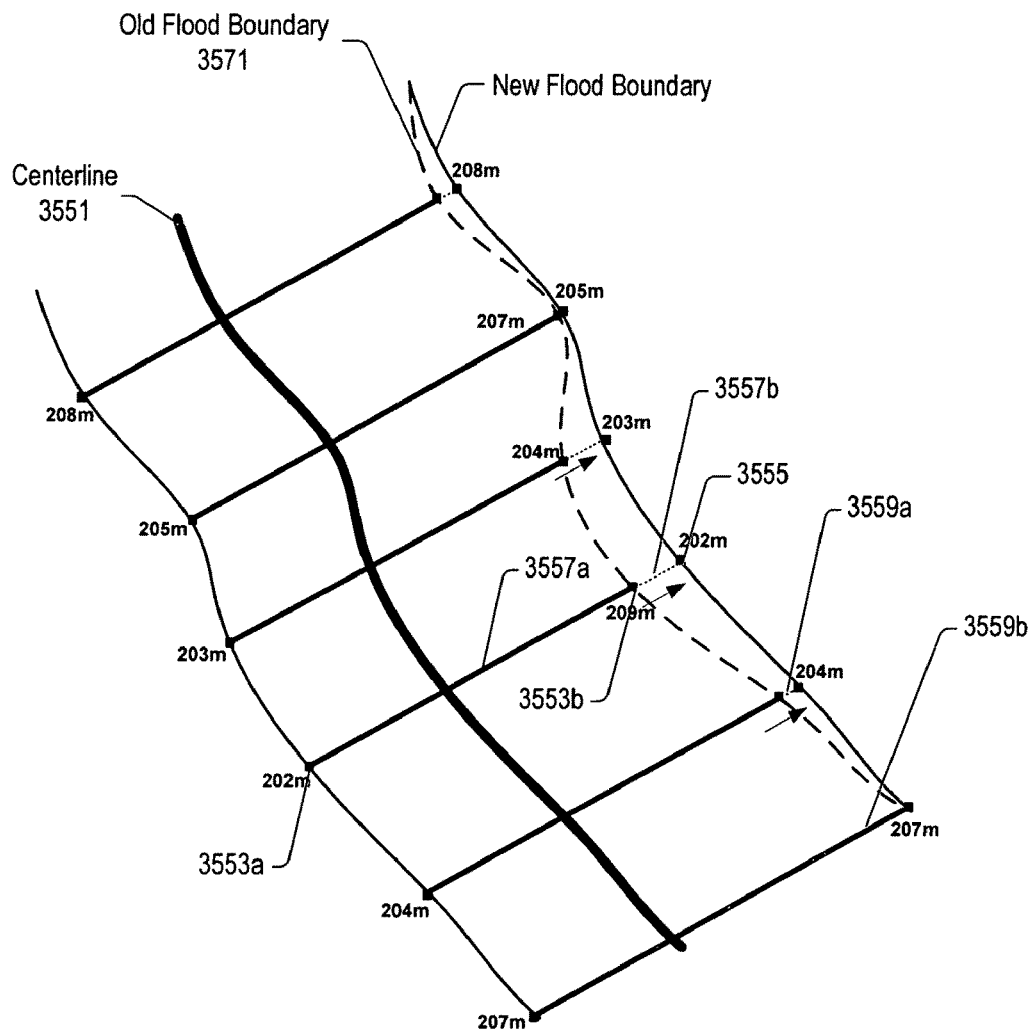

FIGS. 35a-b illustrate an embodiment of a method for correcting a flood boundary using a digital elevation map. For example, flood elevation lines may be created partially using existing flood boundaries, water source centerlines (or flow pass), and a digital elevation map (or other DEM dataset). This method may be used for FEMA designated "A" zones without existing flood elevation lines (such as BFEs). The method may also be used for other areas. It should be noted that in various embodiments of the methods described below, one or more of the elements described may be performed concurrently, in a different order than shown, or may be omitted entirely. Other additional elements may also be performed as desired.

At 3501, a flood elevation line may be formed, on the digital elevation map, for flood boundary correction. For example, the flood elevation line may be formed according to methods discussed above with respect to FIGS. 6-8b, 10-12, 14, etc.). Other flood elevation line formation techniques are also contemplated.

At 3503, the flood boundary 3571 may be corrected by redefining at least a portion of the flood boundary 3571 using the formed flood elevation line (e.g., see elements 3505-3513 below).

At 3505, a flood source line feature (e.g., centerline 3551) may be created by accumulating lowest elevation points on the digital elevation map indicative of a flow path. For example, river centerline elevation points (e.g., from a river centerline study area dataset or a computed flow path using a DEM dataset) may be used. Points corresponding to the lowest ground elevation points (e.g., along a line) may be connected and/or associated with a flow path (e.g., the ground elevation points for the floor of a river may be lower than ground elevation points along the river bank).

At 3507, a second line 3557a may be created that is substantially perpendicular to the flood source line feature 3551. Again, the substantially perpendicular line may be actually drawn, or an appropriate association for stored data points may be stored.

At 3509, the second substantially perpendicular line 3557a may be intersected with a flood boundary on each side of the flood source line feature 3551 to create two intersection points (e.g., intersection points 3553a,b).

At 3511, a point 3555 may be determined that is collinear with the second substantially perpendicular line 3557a on the opposite side of the flood source line feature 3551 that has substantially the same elevation as the intersected point 3553a of the at least two intersection points closest to the flood source line feature 3551.

At 3513, a flood elevation line 3557b may be created by connecting the closest intersected point 3553a and the determined collinear point 3555. The line may actually be drawn or stored (e.g., recording the location and/or elevation (for example, from the DEM)). The flood elevation line 3557b may have a similar elevation at both endpoints 3553a, 3555.

At 3515, other flood elevation lines (e.g., 3559a,b) may be determined (e.g., at a distance interval of 100 feet). Other distance intervals are also contemplated.

At 3517, a TIN surface may be created using the determined flood elevations lines (e.g., by using the endpoints of the flood elevation lines to define a TIN surface for the corresponding flood frequency).

At 3519, a TIN surface may be created for the ground surface (e.g., comprising the ground elevation points)

At 3521, the two created TIN surfaces may be intersected to create re-delineated flood boundaries (flood boundaries may occur at the intersection of the two surfaces).

FIG. 36 illustrates an embodiment of a method for determining flood frequency versus flood elevation points using three dimensional surfaces. It should be noted that in various embodiments of the methods described below, one or more of the elements described may be performed concurrently, in a different order than shown, or may be omitted entirely. Other additional elements may also be performed as desired.

At 3602, a first flood-frequency elevation surface 3601 may be defined. The flood-frequency elevation surface 3601 may be defined by respective elevation points of a water level during a flood at the respective frequency for the flood-frequency elevation surface. For example, the surface of the water during a 100 year flood may form the flood-frequency elevation surface 3601 for the 100 year flood frequency. In some embodiments, the edges of the flood-frequency elevation surface 3601 may correspond to the endpoints of the associated flood elevation lines corresponding to the designated flood frequency.

At 3604, a second flood frequency elevation surface 3603 may be defined.

At 3606, a cross-section surface 3605 may be defined that passes through the property point 3607 and is substantially perpendicular to a flood source line feature (e.g., centerline 307). In some embodiments, the cross section 3605 may geospatially, hydrologically, and hydraulically link the property point 3607 to the flood source (e.g., centerline 307).

Figure 36B:
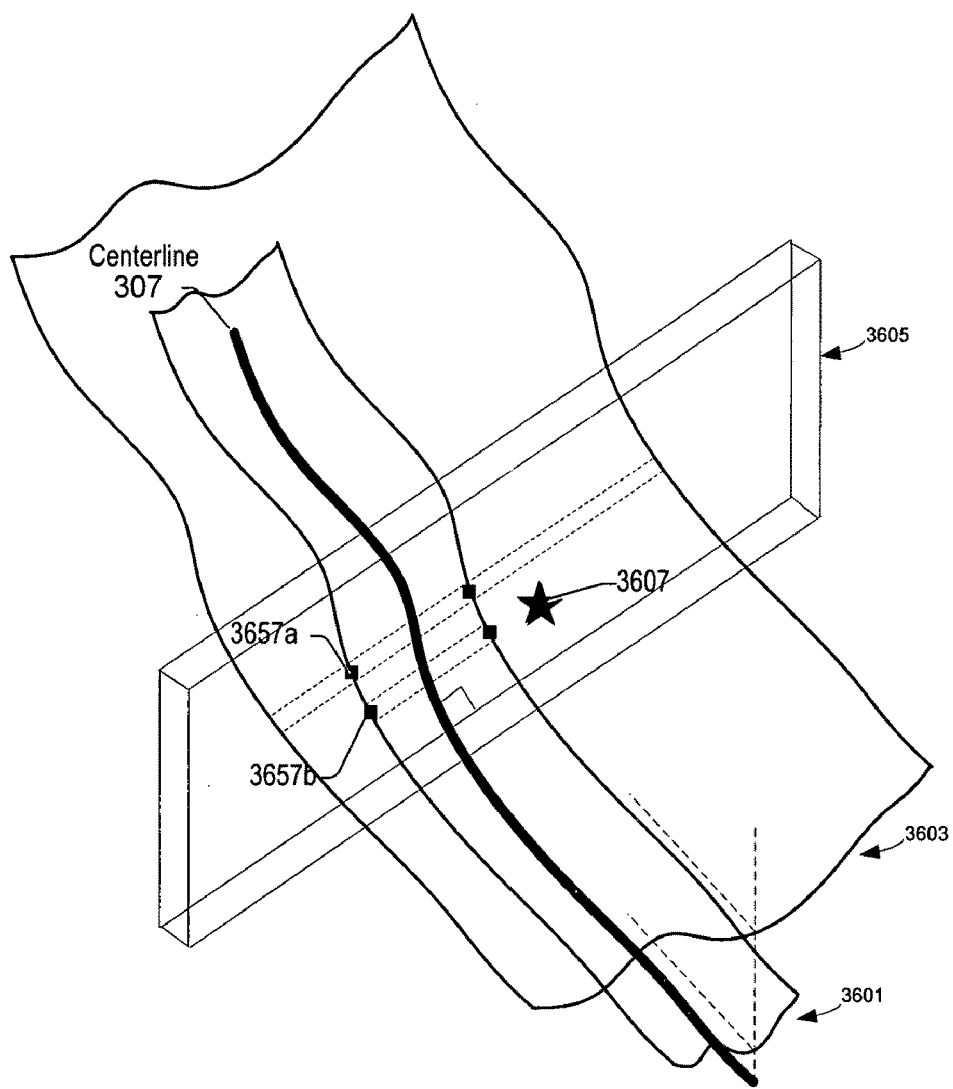

At 3608, the intersection points between the cross section surface 3605 and the flood frequency elevation surfaces 3601 and 3603 may provide the flood elevations for the corresponding flood frequencies (e.g., corresponding to the intersected flood frequency elevation surface). As seen in FIG. 36b, in some embodiments, two flood elevations at different flood frequencies for the property point 3607 may be derived from the flood-frequency elevation surfaces by using the elevation values at points, for example, where the first flood-frequency elevation surface 3601 and the second flood-frequency elevation surface 3603 (such as the 100 year flood elevation surface and the 500 year flood elevation surface) intersect with the cross section surface 3605 that is perpendicular to the flood source (e.g., centerline 307) where the property point 3607 is located. For example, intersection point 3657a (e.g., with elevation value of 198 m) between cross section 3605 and 500 year flood elevation surface 3603 may provide the elevation value at the corresponding 500 year flood frequency.

Intersection point 3657b (e.g., with elevation value of 184 m) between cross section 3605 and 100 year flood elevation surface 3601 may provide the elevation value at the corresponding 100 year flood frequency. Intersecting lines among these three surfaces may provide flood elevation line features at different flood frequencies. In some embodiments, the flood frequency elevation surfaces may be generated based on elevation line features (e.g., BFEs) and a digital elevation map using a Triangulated Irregular Network method (e.g., see FIG. 34). Other techniques for generating the flood frequency elevation surfaces are also contemplated.

As shown in the sample flood water surface profile in FIG. 37, in some embodiments, points of flood frequency versus flood elevation for the property point may be derived from geo-referenced discrete points, on the digital elevation map, for flood frequencies corresponding to a location on the flood source in a flood water surface profile that is on a line substantially perpendicular to the flood source line feature and the property point (e.g., line 1306c in FIG. 13). In some embodiments, the flood water surface profile may provide flood elevation for a flood source at given distances along the flood source (e.g., as determined through an HH study). The flood water surface profile may be a flood profile from a FEMA Flood Insurance Study developed by HH studies. Other sources of a flood water surface profile are also contemplated. In some embodiments, two flood elevations at different flood frequencies for the property point may be derived from point features or database records on the geo-referenced discrete points from the flood water surface profile. The discrete points on a cross-section in the flood water surface profile and the associated flood elevations may be geo-referenced and stored in a database. The database may also include additional discrete flood elevation points where a flood water surface meets the ground elevation of the digital elevation map. As shown in the sample flood water surface profile in FIG. 37, multiple elevation points with different flood frequencies at each cross section location may be determined. The flood elevation point database may be used to derive flood elevations for the property point based on distances between two closes elevation points to a cross section at the property point (e.g., cross section indicated on the flood water surface profile for the property point). A collective database may be used in the flood elevation search for the property point. These points may also be used as flood elevation versus flood frequency to generate a flood elevation versus flood frequency curve for the property point.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

I claim:

1. A computer-implemented method for predicting a flood elevation for a flood frequency for a property point, comprising:
    calculating with a processor at least two points of flood frequency versus flood elevation for the property point using a flood map;
    defining a relationship between flood frequency and flood elevation for the property point using the at least two points; and
    predicting with the processor at least one flood elevation at a flood frequency different from the flood frequency of one of the at least two points for the property point using the relationship;
    wherein the flood map comprises a map of flood zones, defined by flood boundaries, and a plurality of pre-existing flood elevation lines;
    wherein calculating with a processor at least two points of flood frequency versus flood elevation for the property point comprises:
        geographically aligning the flood map with a digital elevation map; and
        forming a substantially perpendicular line, on a digital elevation map, between the property point and a flood source line feature of a flood source in a same catchment area as the property point;
    wherein the at least two points of flood frequency versus flood elevation for the property point are derived from geo-referenced discrete points, on the digital elevation map, for flood frequencies corresponding to a location on the flood source in a flood water surface profile that is on the substantially perpendicular line; and
    wherein the flood water surface profile provides flood elevation for a flood source at given distances along the flood source;
    wherein the defined relationship between flood frequency and flood elevation for the property point is a logarithmic relationship;
    wherein the logarithmic relationship is defined by the equation:

Flood elevation=a Log(flood return period)+b where flood return period is 1/flood frequency, and
    wherein a and b are defined by solving the equation for the at least two calculated points.

2. The method of claim 1, wherein the relationship includes a distribution of flood frequency versus flood elevation.

3. The method of claim 1, further comprising calculating a distribution of flood frequency versus flood damage for the property point using the relationship and a flood damage versus flood elevation relationship.

4. The method of claim 3, further comprising calculating an average annual loss for the property point using the distribution of flood frequency versus flood damage.

5. The method of claim 1, wherein at least one of the at least two points of flood frequency versus flood elevation for the property point is determined by interpolating or extrapolating a flood elevation for a corresponding flood frequency based on a distance between the substantially perpendicular line and two adjacent pre-existing flood elevation lines on the flood map or two adjacent derived flood elevation lines on the flood map.

6. The method of claim 5, further comprising adjusting at least one of the flood elevation lines on the flood map prior to interpolating or extrapolating the flood elevation, wherein adjusting the at least one of the flood elevation lines comprises moving at least one endpoint of the at least one of the flood elevation lines to a nearest position on the flood map that is collinear with the at least one of the flood elevation lines and has substantially the same elevation as indicated by the at least one of the flood elevation lines.

7. The method of claim 5, further comprising deriving a flood elevation line, wherein deriving a flood elevation line comprises:
    aligning a flood boundary of the flood map on the digital elevation map;
    determining elevations for a plurality of points along at least two opposing lines of the flood boundary; and
    connecting a point of the plurality of points along one line of the at least two opposing lines with a point of the plurality of points on the opposing line; wherein the two connected points are approximately the same elevation.

8. The method of claim 1, wherein the at least two points of flood frequency versus flood elevation for the property point are derived from elevation values from the digital elevation map at points where a flood boundary on the aligned flood map intersects the substantially perpendicular line on the digital elevation map.

9. The method of claim 8, further comprising redefining at least a portion of the flood boundary, wherein redefining at least a portion of the flood boundary comprises:
    creating a first Triangulated Irregular Network (TIN) elevation surface that triangulates a plurality of flood elevation line points corresponding to the flood frequency;
    creating a second Triangulated Irregular Network (TIN) elevation surface that triangulates a plurality of digital ground elevation points; and
    redefining the at least a portion of the flood boundary at an intersection between the first TIN elevation surface and the second TIN elevation surface.

10. The method of claim 8, further comprising:
    forming a flood elevation line, on the digital elevation map, for flood boundary correction;
    correcting the flood boundary by redefining at least a portion of the flood boundary using the formed flood elevation line, wherein forming the flood elevation line comprises:
        creating a flood source line feature by accumulating lowest elevation points on the digital elevation map indicative of a flow path;
        creating a second line substantially perpendicular to the flood source line feature;
        intersecting the second substantially perpendicular line with a flood boundary on each side of the flood source line feature to create two intersection points;
        determining a point collinear with the second substantially perpendicular line on the opposite side of the flood source line feature that has substantially the same elevation as the intersected point of the at least two intersection points closest to the flood source line feature; and
        creating a flood elevation line by connecting the closest intersected point and the determined collinear point.

11. The method of claim 10, wherein correcting the flood boundary by redefining at least a portion of the flood boundary comprises:

forming a plurality of flood elevation lines;

creating a first Triangulated Irregular Network (TIN) elevation surface that triangulates a plurality of flood elevation line endpoints corresponding to a similar flood frequency;

creating a second Triangulated Irregular Network (TIN) elevation surface that triangulates a plurality of digital ground elevation points; and redefining the at least a portion of the flood boundary at an intersection between the first TIN elevation surface and the second TIN elevation surface.

12. The method of claim 1, wherein the defined relationship between flood frequency and flood elevation for the property point is a logarithmic relationship; and wherein the logarithm relationship is a Log Pearson Type III distribution, a Log-Normal distribution, or an Extreme Value Type I distribution.

13. The method of claim 12, further comprising calculating hydrological parameters for the Log Pearson Type III distribution, a Normal distribution, or an Extreme Value Type I distribution, wherein calculating the hydrological parameters comprises using an N-segment discrete hydrological data series derived from hydrologic gage station data.

14. The method of claim 1, further comprising:

defining a flood elevation versus percent damage relationship; and using the flood elevation versus percent damage relationship for the property point with the defined flood frequency versus flood elevation relationship to calculate an average annual loss for the property point.

15. The method of claim 1, wherein the property point is associated with a geocoded point.

16. A computer-implemented method for predicting a flood elevation for a flood frequency for a property point, comprising:

calculating with a processor at least two points of flood frequency versus flood elevation for the property point using a flood map;

defining a relationship between flood frequency and flood elevation for the property point using the at least two points; and predicting with the processor at least one flood elevation at a flood frequency different from the flood frequency of one of the at least two points for the property point using the relationship;

wherein the flood map comprises a map of flood zones, defined by flood boundaries, and a plurality of pre-existing flood elevation lines, wherein calculating with a processor at least two points of flood frequency versus flood elevation for the property point comprises:

geographically aligning the flood map with a digital elevation map; and forming a substantially perpendicular line, on a digital elevation map, between the property point and a flood source line feature of a flood source in a same catchment area as the property point;

wherein the defined relationship between flood frequency and flood elevation for the property point is a logarithmic relationship, wherein the logarithmic relationship is defined by the equation:

Flood elevation=a Log(flood return period)+b where flood return period is 1/flood frequency, and wherein a and b are defined by solving the equation for the at least two calculated points, wherein two or more of the at least two points of flood frequency versus flood elevation for the property point are derived from elevation values on an intersection of two flood-frequency elevation surfaces and a cross-section surface that passes through the property point and is substantially perpendicular to a flood source line feature; wherein the flood-frequency elevation surfaces are defined by respective elevation points of a water level during a flood at the respective frequency for the flood-frequency elevation surface.

17. A system, comprising:

a processor;

a memory coupled to the processor and configured to store program instructions executable by the processor to:

calculate at least two points of flood frequency versus flood elevation for the property point using a flood map;

define a relationship between flood frequency and flood elevation for the property point using the at least two points; and predict at least one flood elevation at a flood frequency different from the flood frequency of one of the at least two points for the property point using the relationship;

wherein the flood map comprises a map of flood zones, defined by flood boundaries, and a plurality of pre-existing flood elevation lines, wherein calculate at least two points of flood frequency versus flood elevation for the property point comprises:

geographically aligning the flood map with a digital elevation map; and forming a substantially perpendicular line, on a digital elevation map, between the property point and a flood source line feature of a flood source in a same catchment area as the property point;

wherein two or more of the at least two points of flood frequency versus flood elevation for the property point are derived from elevation values on an intersection of two flood-frequency elevation surfaces and a cross-section surface that passes through the property point and is substantially perpendicular to a flood source line feature; wherein the flood-frequency elevation surfaces are defined by respective elevation points of a water level during a flood at the respective frequency for the flood-frequency elevation surface;

wherein the defined relationship between flood frequency and flood elevation for the property point is a logarithmic relationship;

wherein the logarithmic relationship is defined by the equation:

Flood elevation=a Log(flood return period)+b where flood return period is 1/flood frequency, and wherein a and b are defined by solving the equation for the at least two calculated points.

18. The system of claim 17, wherein at least one of the at least two points of flood frequency versus flood elevation for the property point is determined by interpolating or extrapolating a flood elevation for a corresponding flood frequency based on a distance between the substantially perpendicular line and two adjacent pre-existing flood elevation lines on the flood map or two adjacent derived flood elevation lines on the flood map.

19. A non-transitory computer-readable storage medium, comprising program instructions, wherein the program instructions are computer-executable to:
- calculate at least two points of flood frequency versus flood elevation for the property point using a flood map;
- define a relationship between flood frequency and flood elevation for the property point using the at least two points; and
- predict at least one flood elevation at a flood frequency different from the flood frequency of one of the at least two points for the property point using the relationship;
- wherein the flood map comprises a map of flood zones, defined by flood boundaries, and a plurality of pre-existing flood elevation lines;
- wherein calculate at least two points of flood frequency versus flood elevation for the property point comprises:
- geographically aligning the flood map with a digital elevation map; and
- forming a substantially perpendicular line, on a digital elevation map, between the property point and a flood source line feature of a flood source in a same catchment area as the property point;
- wherein two or more of the at least two points of flood frequency versus flood elevation for the property point are derived from elevation values on an intersection of two flood-frequency elevation surfaces and a cross-section surface that passes through the property point and is substantially perpendicular to a flood source line feature; wherein the flood-frequency elevation surfaces are defined by respective elevation points of a water level during a flood at the respective frequency for the flood-frequency elevation surface;
- wherein the defined relationship between flood frequency and flood elevation for the property point is a logarithmic relationship;
- wherein the logarithmic relationship is defined by the equation:

Flood elevation=a Log(flood return period)+b where flood return period is 1/flood frequency, and
- wherein a and b are defined by solving the equation for the at least two calculated points.

20. The non-transitory computer-readable storage medium of claim 19, wherein at least one of the at least two points of flood frequency versus flood elevation for the property point is determined by interpolating or extrapolating a flood elevation for a corresponding flood frequency based on a distance between the substantially perpendicular line and two adjacent pre-existing flood elevation lines on the digital elevation map or two adjacent derived flood elevation lines on the digital elevation map.

* * * * *

UNITED STATES PATENT AND TRADEMARK OFFICE
CERTIFICATE OF CORRECTION

| | | |
|---|---|---|
| PATENT NO. | : 7,917,292 B1 | Page 1 of 1 |
| APPLICATION NO. | : 11/974911 | |
| DATED | : March 29, 2011 | |
| INVENTOR(S) | : Wei Du | |

It is certified that error appears in the above-identified patent and that said Letters Patent is hereby corrected as shown below:

On the title page, Item (73), the Assignee information is incorrect. Item (73) should read:

Item -- (73) Assignee: First American Real Estate Solutions LLC, Westlake (TX) --

Signed and Sealed this

Seventeenth Day of May, 2011

David J. Kappos
*Director of the United States Patent and Trademark Office*